US011297160B2

(12) United States Patent
Ando

(10) Patent No.: US 11,297,160 B2
(45) Date of Patent: Apr. 5, 2022

(54) INFORMATION PROCESSING SYSTEM, INFORMATION PROCESSING APPARATUS, AND INFORMATION PROCESSING METHOD

(71) Applicant: Ricoh Company, Ltd., Tokyo (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/105,872

(22) Filed: Nov. 27, 2020

(65) Prior Publication Data
US 2021/0168221 A1   Jun. 3, 2021

(30) Foreign Application Priority Data

Nov. 28, 2019   (JP) .............................. JP2019-214909
Sep. 29, 2020   (JP) .............................. JP2020-163833

(51) Int. Cl.
*H04L 29/08* (2006.01)
*H04L 29/06* (2006.01)
(Continued)

(52) U.S. Cl.
CPC .......... *H04L 67/306* (2013.01); *H04L 9/3213* (2013.01); *H04L 65/403* (2013.01); *H04L 67/1046* (2013.01)

(58) Field of Classification Search
CPC .............. H04L 67/306; H04L 67/1046; H04L 67/1044; H04L 9/3213; H04L 9/32; H04L 65/403
(Continued)

(56) References Cited

U.S. PATENT DOCUMENTS 9,116,596 B2   8/2015   Roman et al.
2012/0298744 A1   11/2012   Hung et al.
(Continued)

FOREIGN PATENT DOCUMENTS

JP   2009-253890 A   10/2009
JP   2014-149633      8/2014
(Continued)

OTHER PUBLICATIONS

Andrew Gehman, "How to Install Android Apps and Share Contacts Using QR Codes," Aug. 9, 2010, HowToGeek.com, www.howtogeek.com/howto/24921/how-to-install-android-apps-and-share-contacts-using-qr-codes/ (Year: 2010).*
(Continued)

*Primary Examiner* — Ruolei Zong
(74) *Attorney, Agent, or Firm* — Xsensus LLP

(57) ABSTRACT

An information processing apparatus provides a sharing service of enabling information to be shared by one or more terminal apparatuses, the information processing apparatus being capable of communicating with the one or more terminal apparatuses, and the one or more terminal apparatuses being associated with a group; receives first identification information from each of the one or more terminal apparatuses; and associates the first identification information with the sharing service. When having associated the first identification information with the sharing service, the information processing apparatus associates, with the group, the one or more terminal apparatuses having received the first identification information from outside and having transmitted the first identification information; and provides the sharing service of enabling information to be shared by the one or more terminal apparatuses that are associated with the group.

15 Claims, 57 Drawing Sheets

(51) Int. Cl.
*H04L 9/36* (2006.01)
*H04L 67/306* (2022.01)
*H04L 9/32* (2006.01)
*H04L 65/403* (2022.01)
*H04L 67/1042* (2022.01)

(58) Field of Classification Search
USPC .......................................................... 709/203
See application file for complete search history.

(56) References Cited

U.S. PATENT DOCUMENTS

| | | | | |
|---|---|---|---|---|
| 2013/0018960 | A1* | 1/2013 | Knysz | H04L 65/403 |
| | | | | 709/204 |
| 2013/0221083 | A1* | 8/2013 | Doss | H04W 12/04 |
| | | | | 235/375 |
| 2014/0317114 | A1* | 10/2014 | Alla | G06F 8/61 |
| | | | | 707/737 |
| 2014/0351335 | A1* | 11/2014 | Le Huerou | H04L 67/10 |
| | | | | 709/204 |
| 2015/0170164 | A1* | 6/2015 | Marsico | G06Q 30/0201 |
| | | | | 235/375 |
| 2016/0134669 | A1* | 5/2016 | Yuki | H04L 65/403 |
| | | | | 715/753 |
| 2017/0262294 | A1* | 9/2017 | Yakan | H04L 63/102 |
| 2017/0272588 | A1* | 9/2017 | Akiyoshi | H04N 1/32662 |
| 2020/0084291 | A1 | 3/2020 | Ando | |
| 2020/0106849 | A1 | 4/2020 | Ando | |
| 2020/0106900 | A1 | 4/2020 | Ando | |
| 2020/0169644 | A1 | 5/2020 | Ando | |
| 2020/0177743 | A1 | 6/2020 | Ando | |
| 2020/0177749 | A1 | 6/2020 | Ando | |
| 2020/0280671 | A1 | 9/2020 | Ando | |
| 2021/0112072 | A1* | 4/2021 | Kratzer | G06F 16/9554 |

FOREIGN PATENT DOCUMENTS

| | | |
|---|---|---|
| JP | 2015-527628 | 9/2015 |
| JP | 2019-153273 | 9/2019 |
| JP | 2020-087120 | 6/2020 |
| WO | WO 2015/039025 A1 | 3/2015 |
| WO | 2019/172199 | 9/2019 |

OTHER PUBLICATIONS

Extended European Search Report dated Feb. 25, 2021 in European Patent Application No. 20020566.4, 10 pages.
Anders Andersen, et al., "Experimenting with Instant Services Using NFC Technology", The First International Conference on Smart Systems, Devices and Technologies, XP055663764, (2012), pp. 73-78.

* cited by examiner

FIG.7

| APPLICATION ID | APPLICATION TYPE | URL | CORRESPONDING BROWSER |
|---|---|---|---|
| AP_QR | - | https://daas.com/ezQR | MobileBrowser |
| AP_Group | In/Out | https://daas.com/ezGroup | MobileBrowser |
| AP_Presen | In | https://daas.com/Presen | MobileBrowser |
| AP_PhotoShow | Out | https://daas.com/photoshow | MobileBrowser |

| TENANT ID | USER ID | TYPE | NAME | USABLE APPLICATION |
|---|---|---|---|---|
| T001 | guest1 | GUEST | "GUEST 1" | AP_Group |
| | guest2 | GUEST | "GUEST 2" | AP_Group |
| | tanaka@..... | USUAL | "TANAKA" | AP_QR, AP_Group, AP_Send, AP_Survey, AP_Roster, AP_Question, AP_Presen |

| FILE ID | FILE NAME | GROUP ID | USER ID | AUTHORITY | FILE LOCATION |
|---|---|---|---|---|---|
| FidPhoto1 | Photo1.jpeg | GroupUne | tanaka@..... | | /gp/une |
| FidPhoto2 | Photo2.jpeg | GroupUne | ando@..... | | /gp/une |

| REGISTERED ID | SUB-APPLICATION ID | CATEGORY | USER ID | USAGE START TIME | USAGE END TIME |
|---|---|---|---|---|---|
| Tag_QR01 | AP_Group | GroupUne | tanaka@..... | 2019/09/30.9:00 | 2019/09/30.19:00 |
| Tag_QR02 | AP_Group | GroupMath1 | sato@..... | 2019/09/30.9:00 | 2019/09/30.19:00 |

| SUB-APPLICATION ID | APPLICATION NAME | AP_QR |
|---|---|---|
| AP_Group | "GROUP" | ✓ |
| AP_Send | "SENDING" | ✓ |
| AP_Survey | "QUESTIONNAIRE SURVEY" | ✓ |
| AP_Roster | "ROSTER GENERATION" | ✓ |
| AP_Question | "QUESTION RECEIVING" | ✓ |

| GROUP ID | GROUP NAME | COUNTERSIGN | STORAGE LOCATION | USER ID | PARTICIPANT |
|---|---|---|---|---|---|
| GroupDev | "CUSTOMER DEVELOPMENT" | | /gp/dev | sato@.... | guest1, guest2 |
| GroupUne | "ARCHAEOLOGICAL DIGGING" | "Unearth" | /gp/une | tanaka@.... | guest1, guest2 |

267

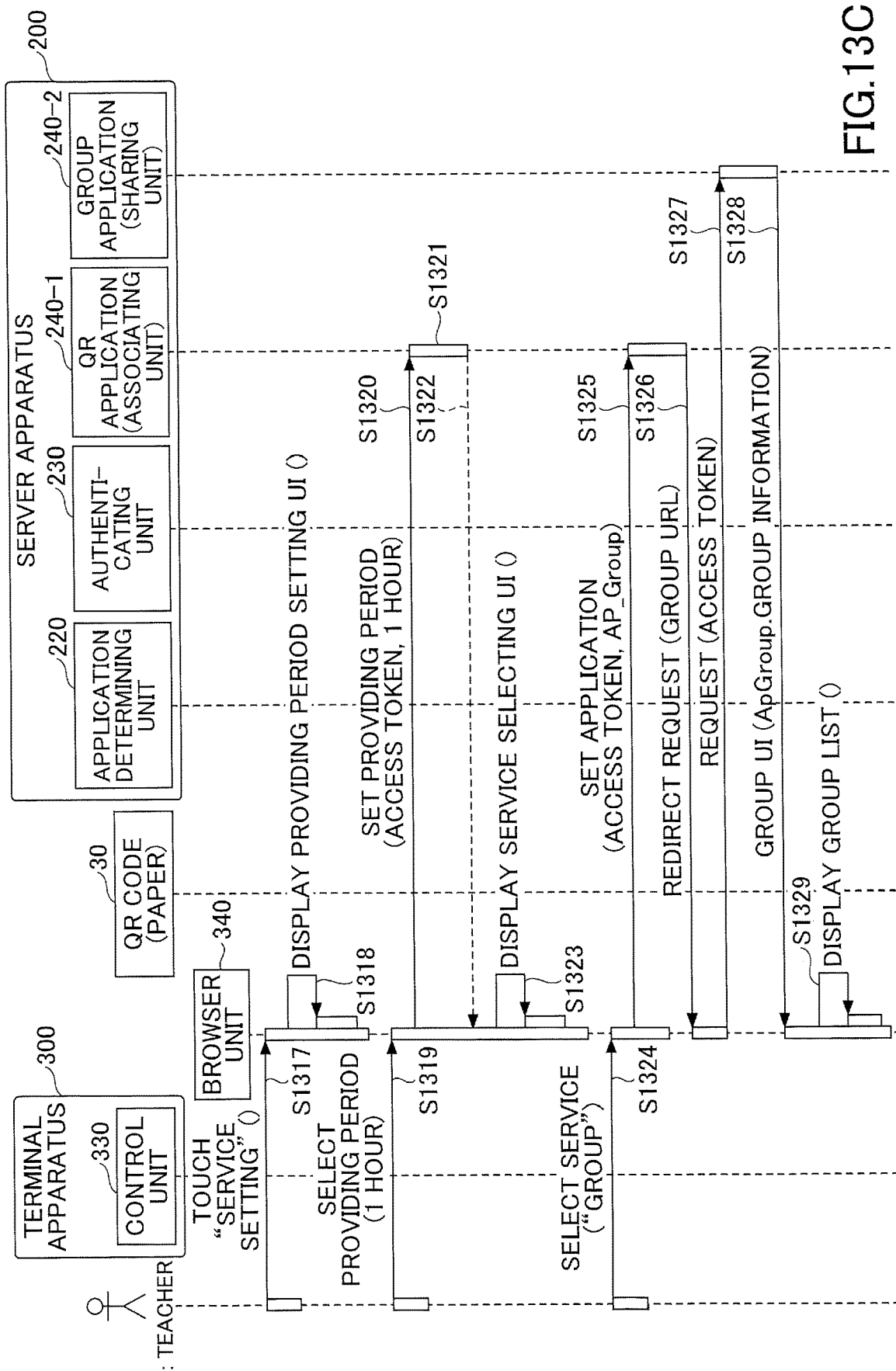

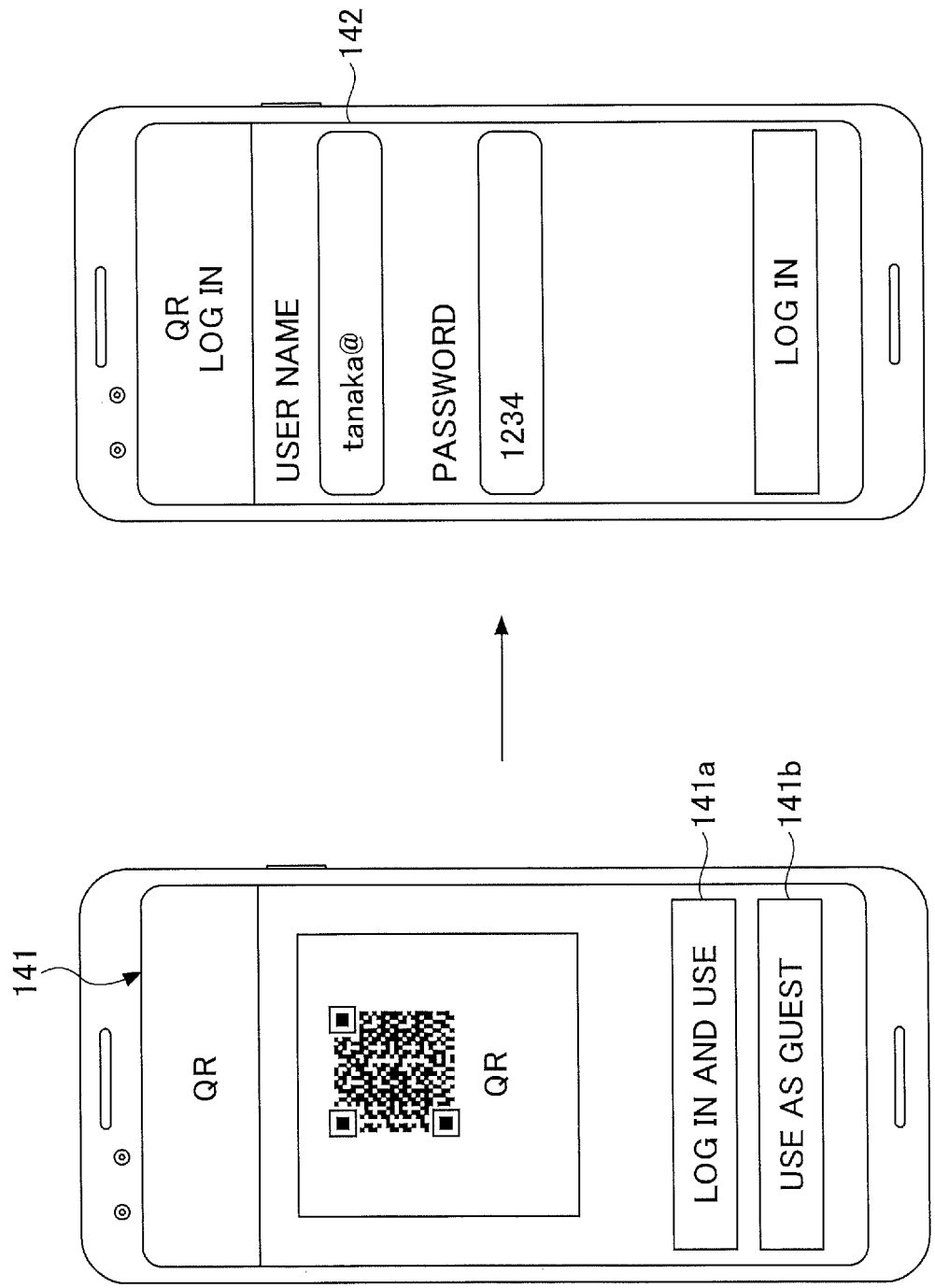

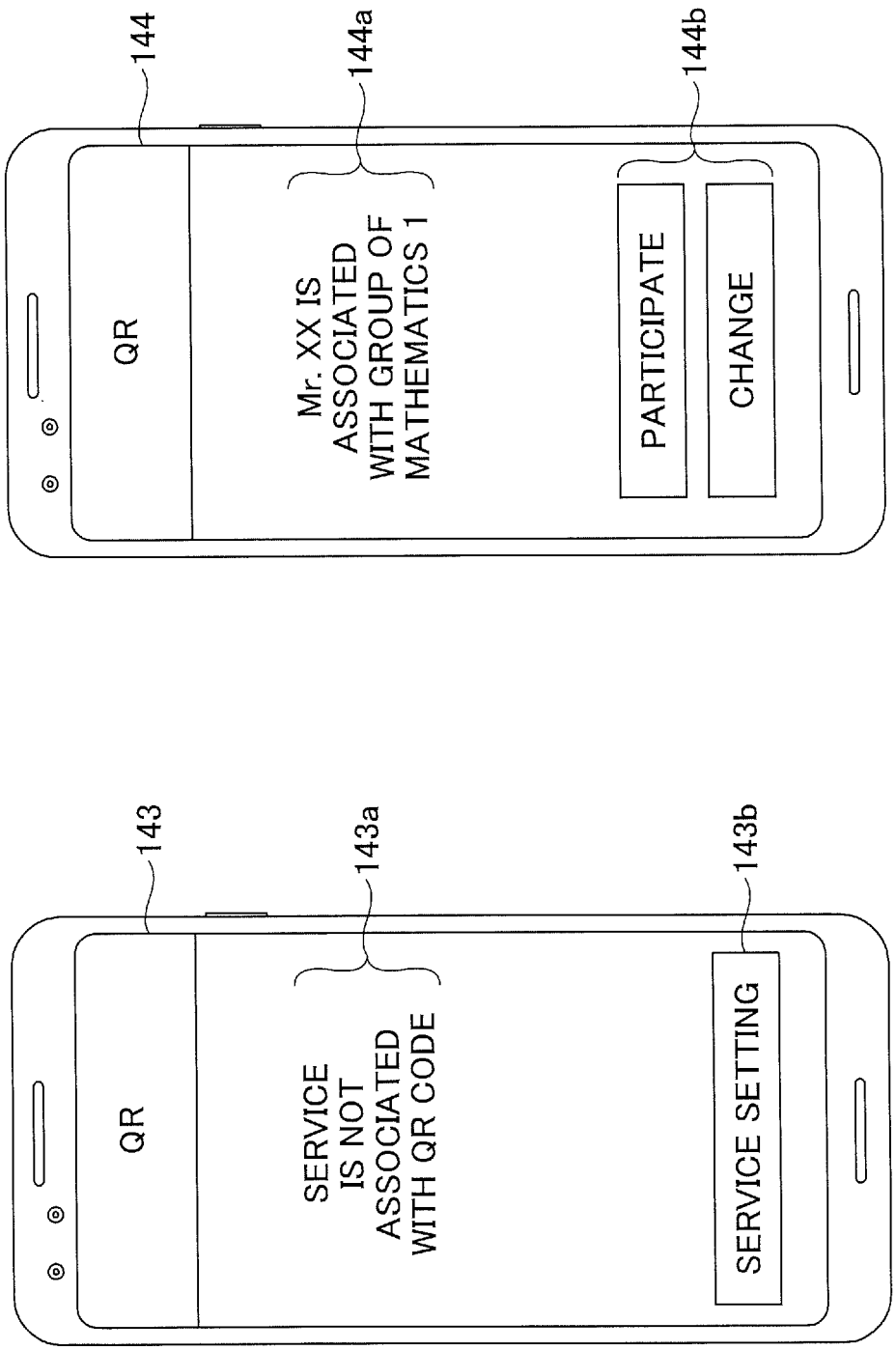

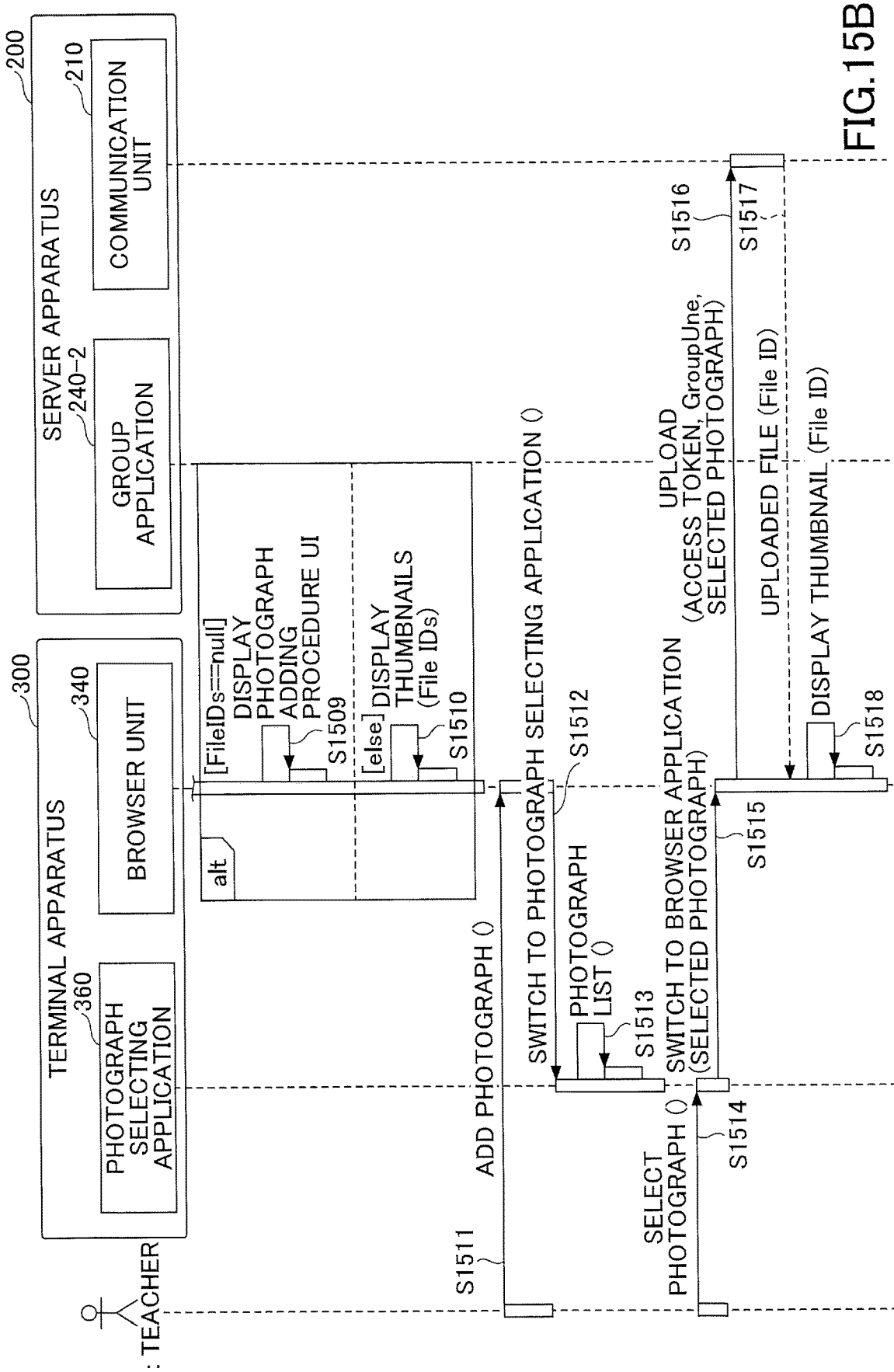

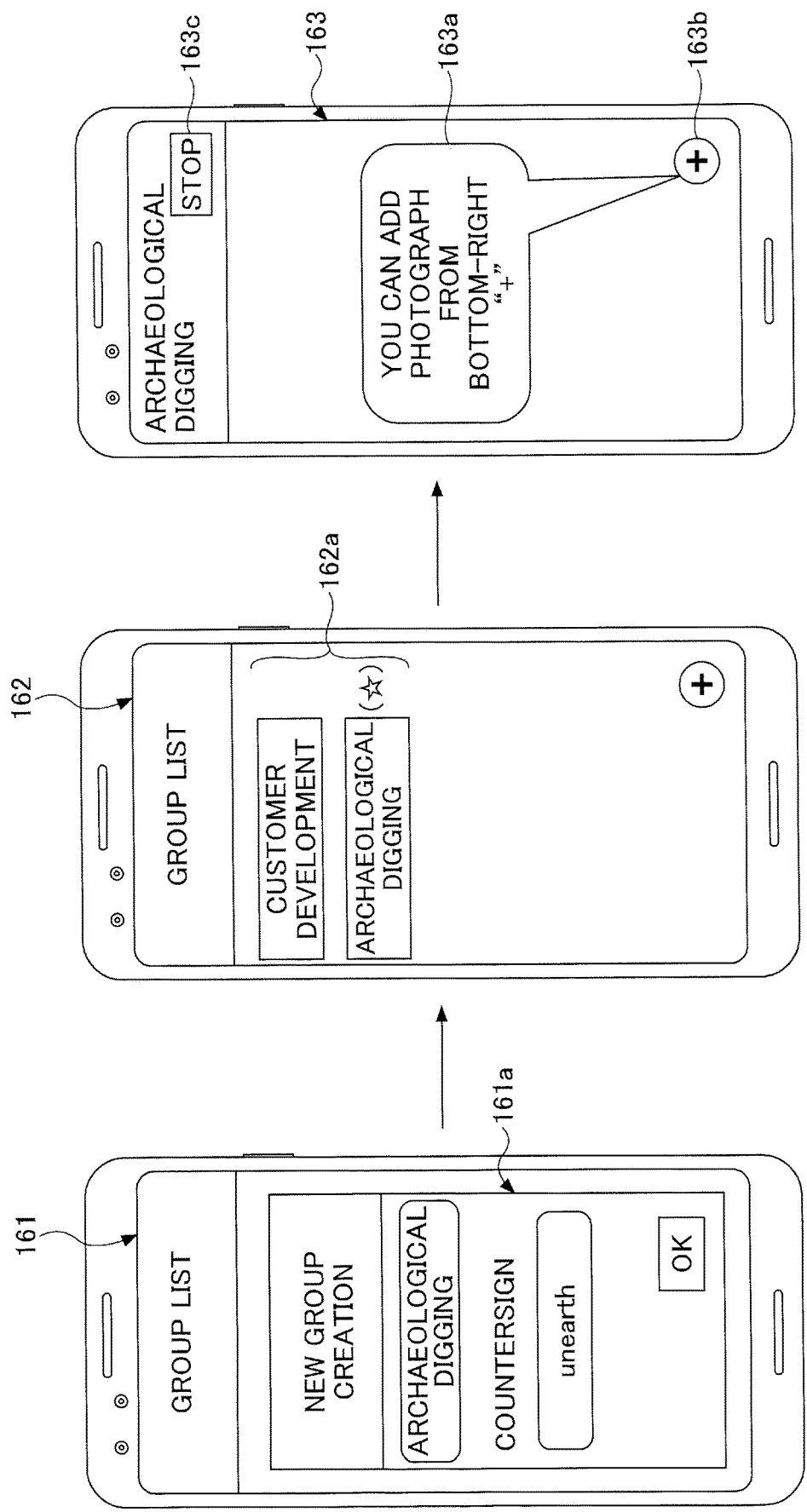

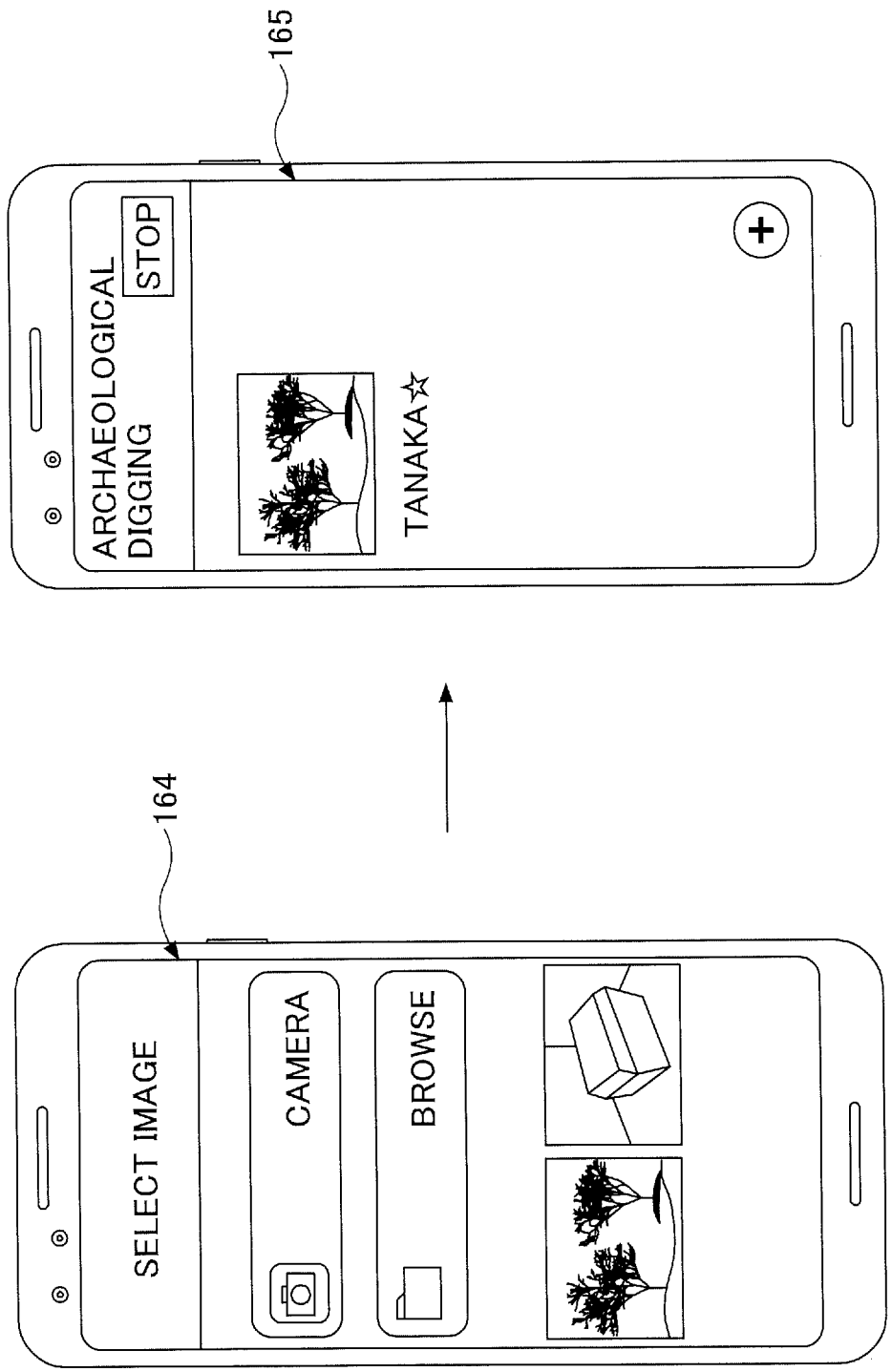

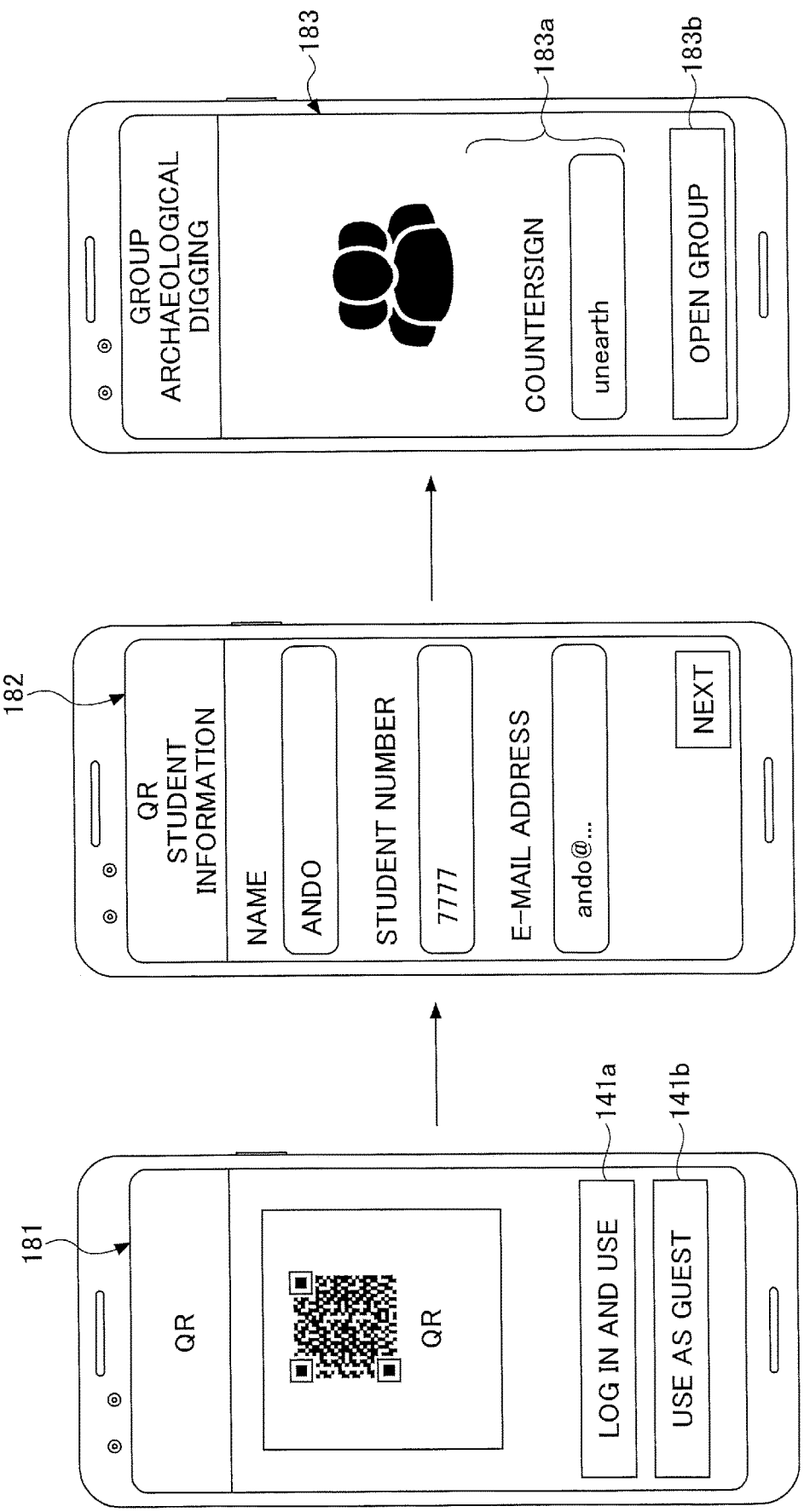

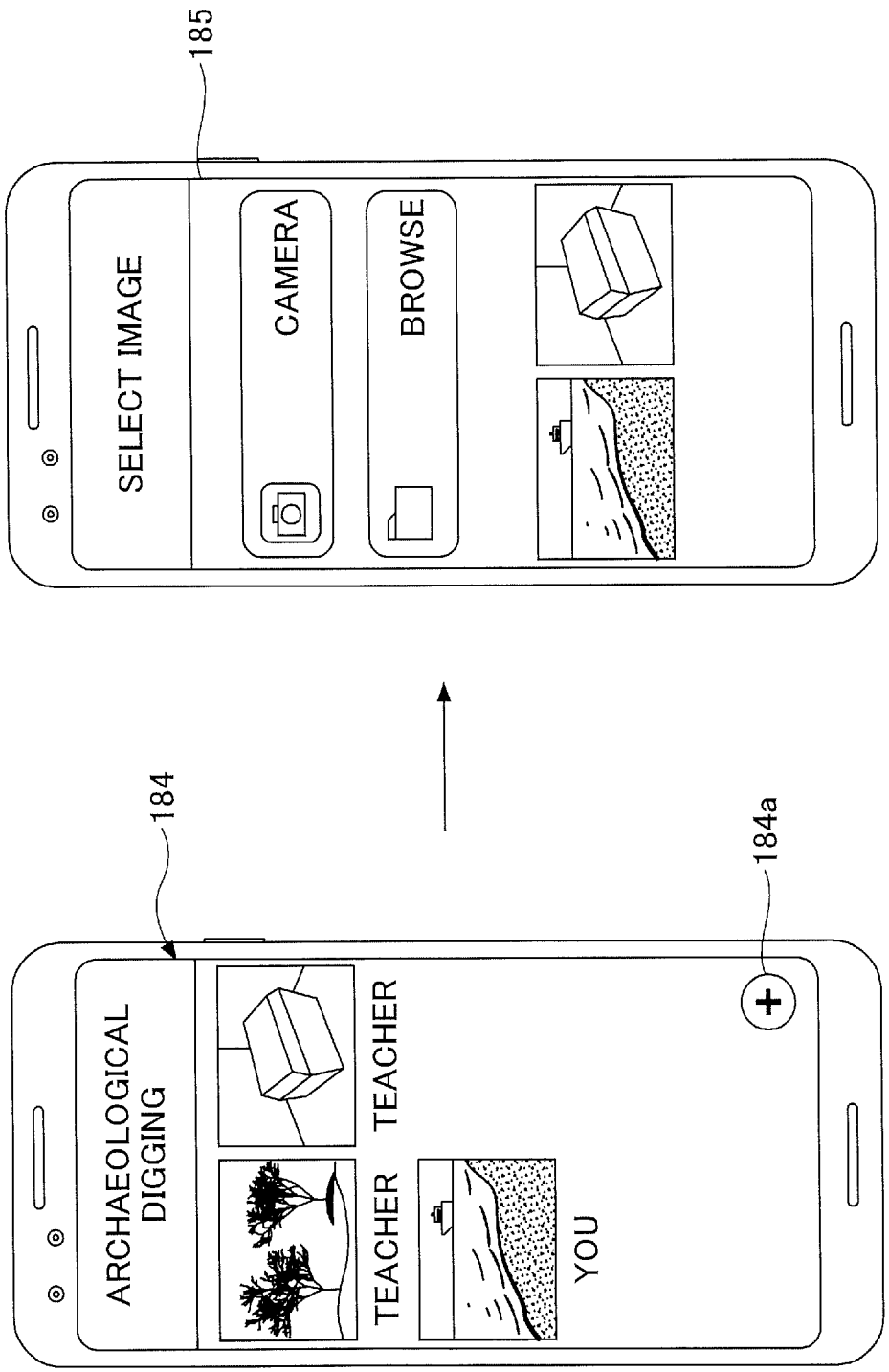

FIG.21C

| URL | ACCESS TOKEN | CONTENT |
|---|---|---|
| https://daas.com | {tanaka, REGISTERED ID} | Name="tanaka",No="1234",email="tanaka@..." |

350

| URL | ACCESS TOKEN | CONTENT |
|---|---|---|
| https://daas.com | {guest1, REGISTERED ID} | Name="guest",No="7777",email="tanaka@..." |

| REGISTERED ID | In APPLICATION ID | Out APPLICATION ID | BROWSER ID |
|---|---|---|---|
| Tag_QR01 | AP_QR | — | — |
| Tag_QR02 | AP_QR | — | — |
| Tag_Presen | AP_Presen | AP_PhotoDoc | BROWSER1 |
| Tag_Group | AP_Group | AP_PhotoDoc | BROWSER1 |

| APPLICATION ID | APPLICATION TYPE | URL | CORRESPONDING BROWSER |
|---|---|---|---|
| AP_QR | — | https://daas.com/ezQR | MobileBrowser |
| AP_Group | In/Out | https://daas.com/ezGroup | MobileBrowser |
| AP_Presen | In | https://daas.com/Presen | MobileBrowser |
| AP_PhotoShow | Out | https://daas.com/photoshow | KioskBrowser, MobileBrowser |

| TENANT ID | USER ID | TYPE | NAME | USABLE APPLICATION | USABLE BROWSER | CURRENTLY USED BROWSER |
|---|---|---|---|---|---|---|
| T001 | guest1 | GUEST | "GUEST 1" | AP_Group | BROWSER1 | BROWSER1 |
| | guest | GUEST | "GUEST 2" | AP_Group | BROWSER1 | BROWSER1 |
| | tanaka@..... | USUAL | "TANAKA" | AP_QR, AP_Group, AP_Send, AP_Survey, AP_Roster, AP_Question AP_Presen | BROWSER1, BROWSER2 | BROWSER1 |

| SUB-APPLICATION ID | APPLICATION NAME | AP_QR | AP_Presen |
|---|---|---|---|
| AP_Group | "GROUP" | ✓ | ✓ |
| AP_Send | "SENDING" | ✓ | ✓ |
| AP_Survey | "QUESTIONNAIRE SURVEY" | ✓ | ✓ |
| AP_Roster | "ROSTER GENERATION" | ✓ | ✓ |
| AP_Question | "QUESTION RECEIVING" | ✓ | ✓ |

| GROUP ID | GROUP NAME | COUNTERSIGN | STORAGE LOCATION | CORRESPONDING BROWSER | USER ID | PARTICIPANT |
|---|---|---|---|---|---|---|
| GroupDev | "CUSTOMER DEVELOPMENT" | | /gp/dev | | sato@.... | guest1, guest2 |
| GroupUne | "ARCHAEOLOGICAL DIGGING" | "Unearth" | /gp/une | BROWSER1 | tanaka@.... | guest1, guest2 |

| TENANT ID | COMMUNICATION ID | ADDRESS INFORMATION | CONNECTION CONDITION | BROWSER ID | BROWSER STATE | PASSCODE |
|---|---|---|---|---|---|---|
| T001 | Eg001-01 | 10.56.60.xx | CONNECTED | BROWSER1 | POWER ON | 1234 |
| | Eg001-02 | 192.168.0.xx | | BROWSER2 | ENERGY SAVING | 2293 |
| | | | NOT CONNECTED | BROWSER3 | POWER OFF | 8341 |

270

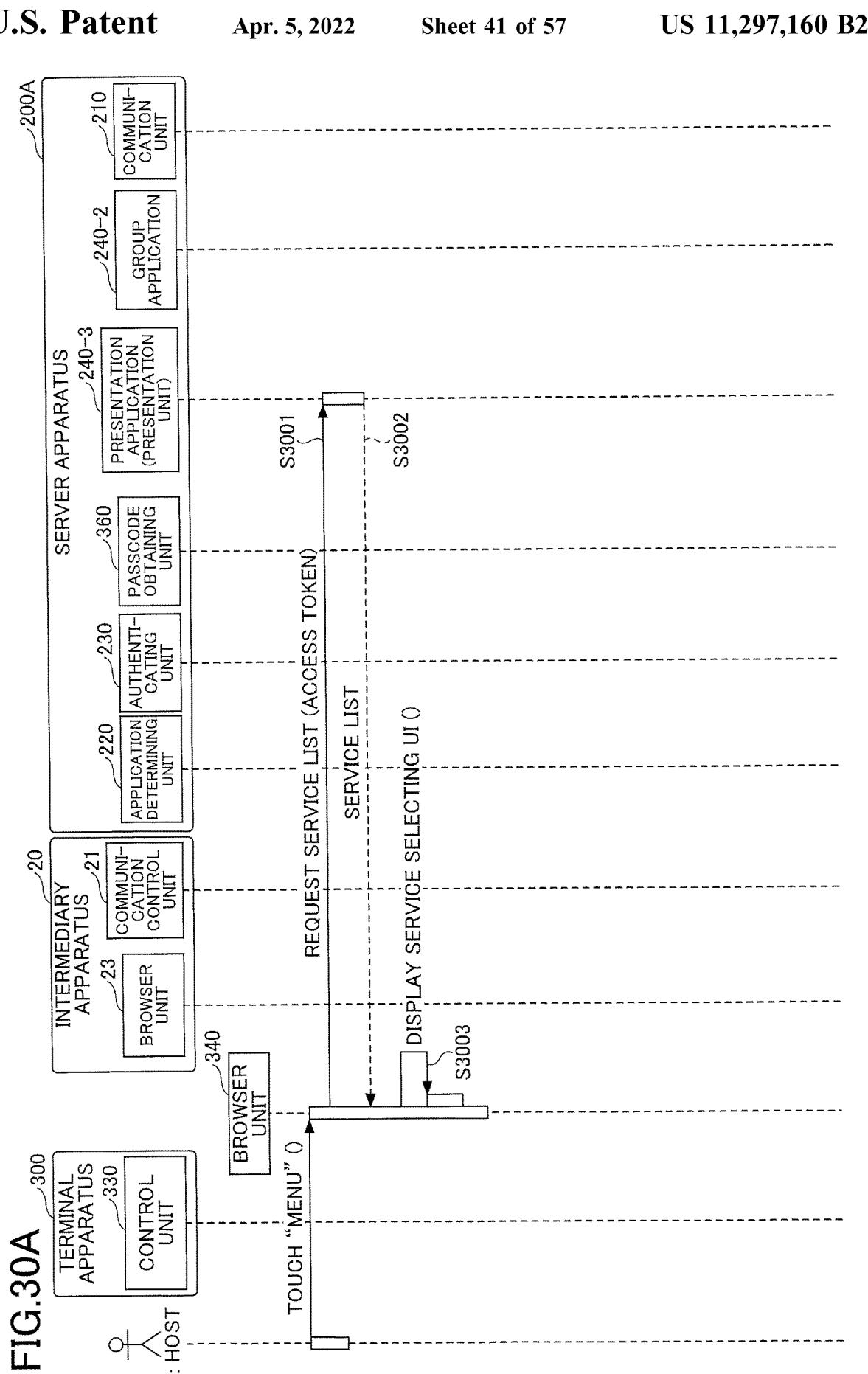

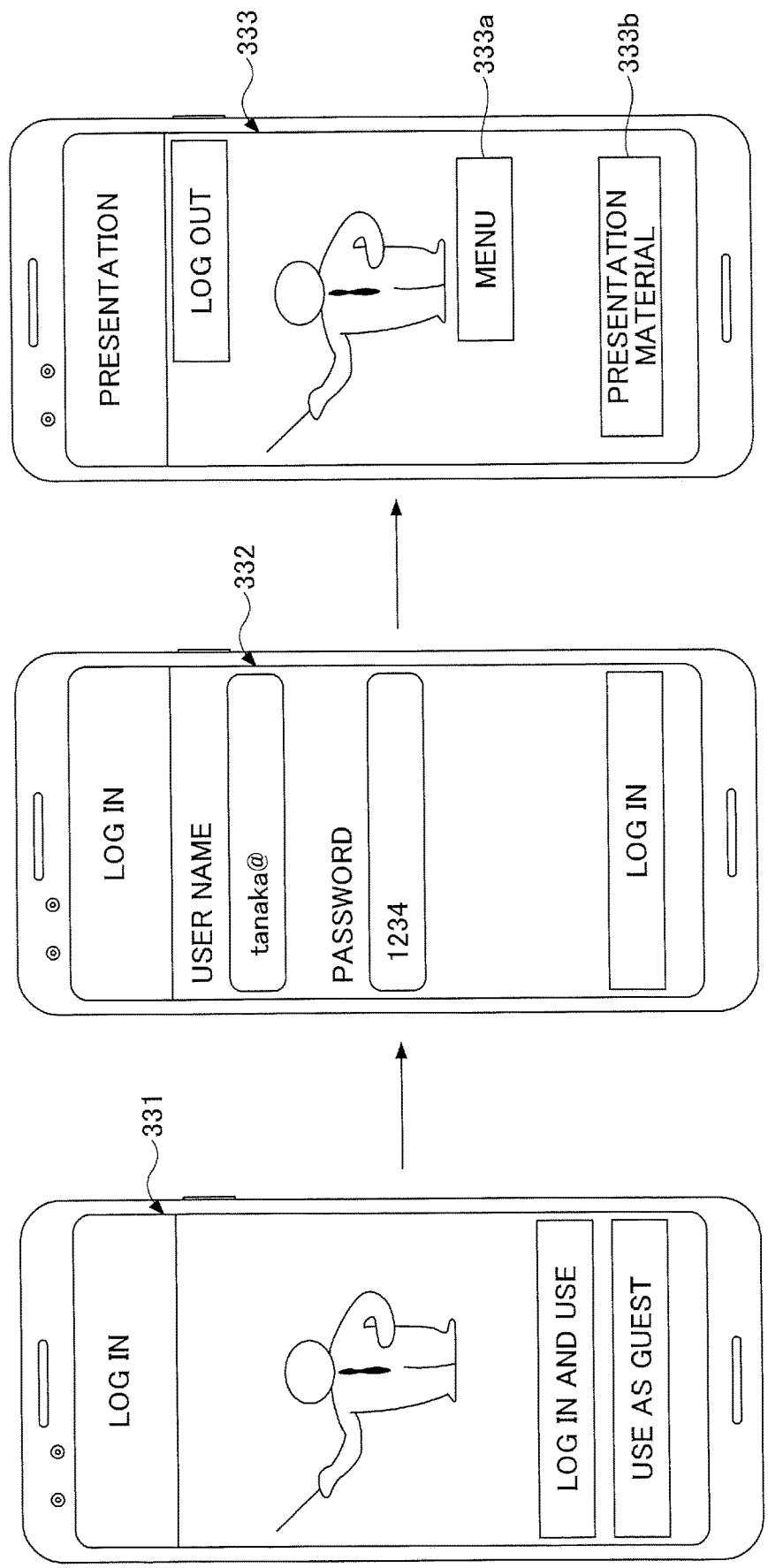

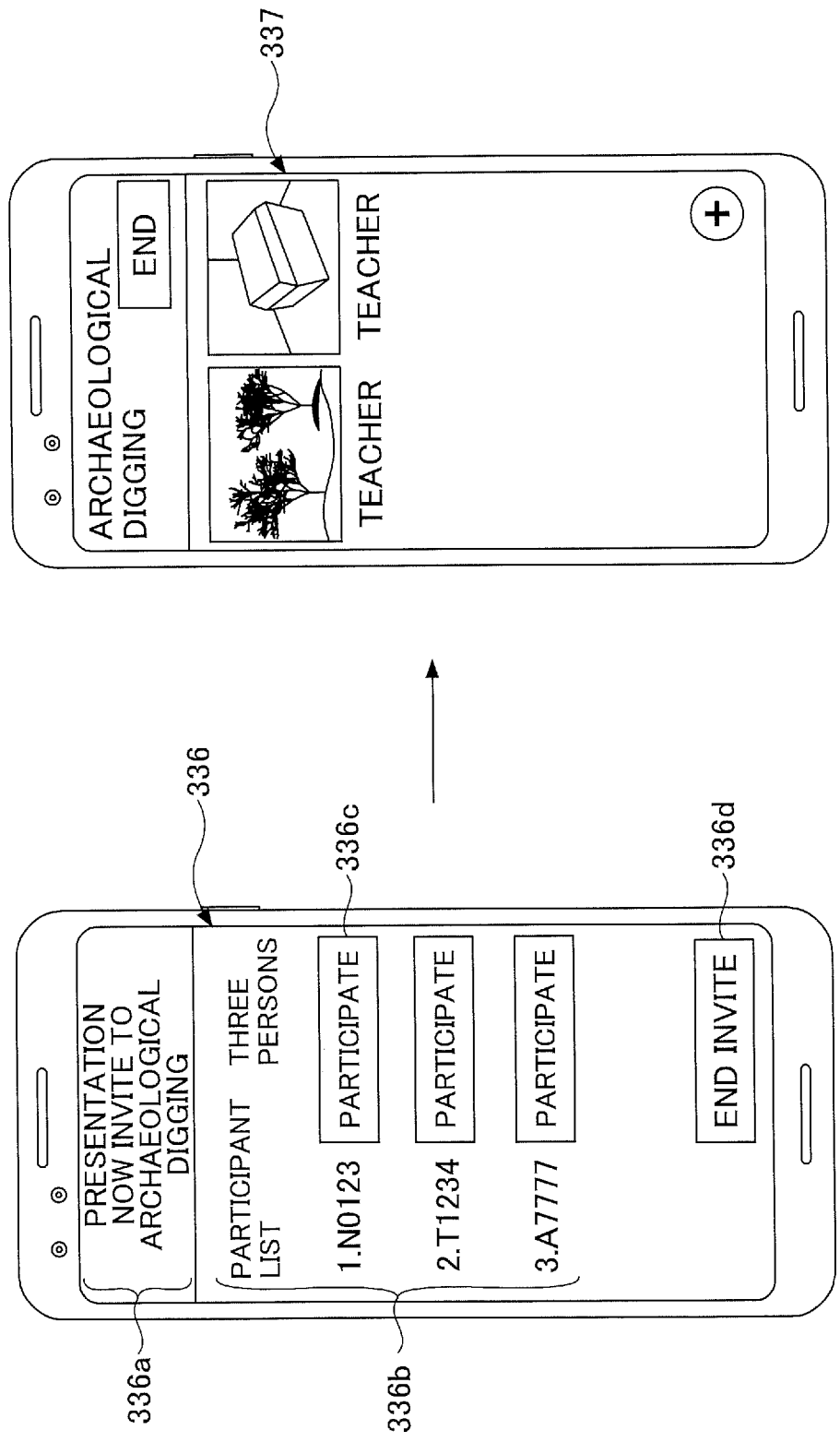

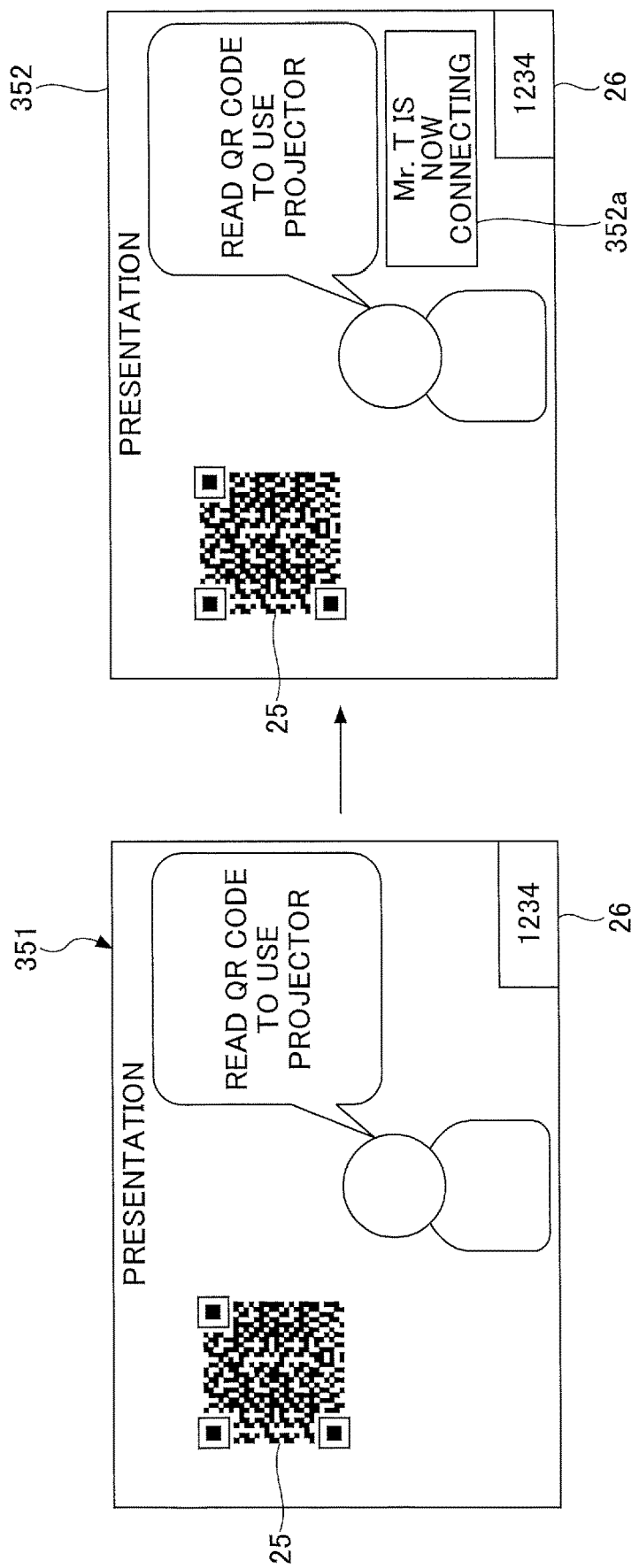

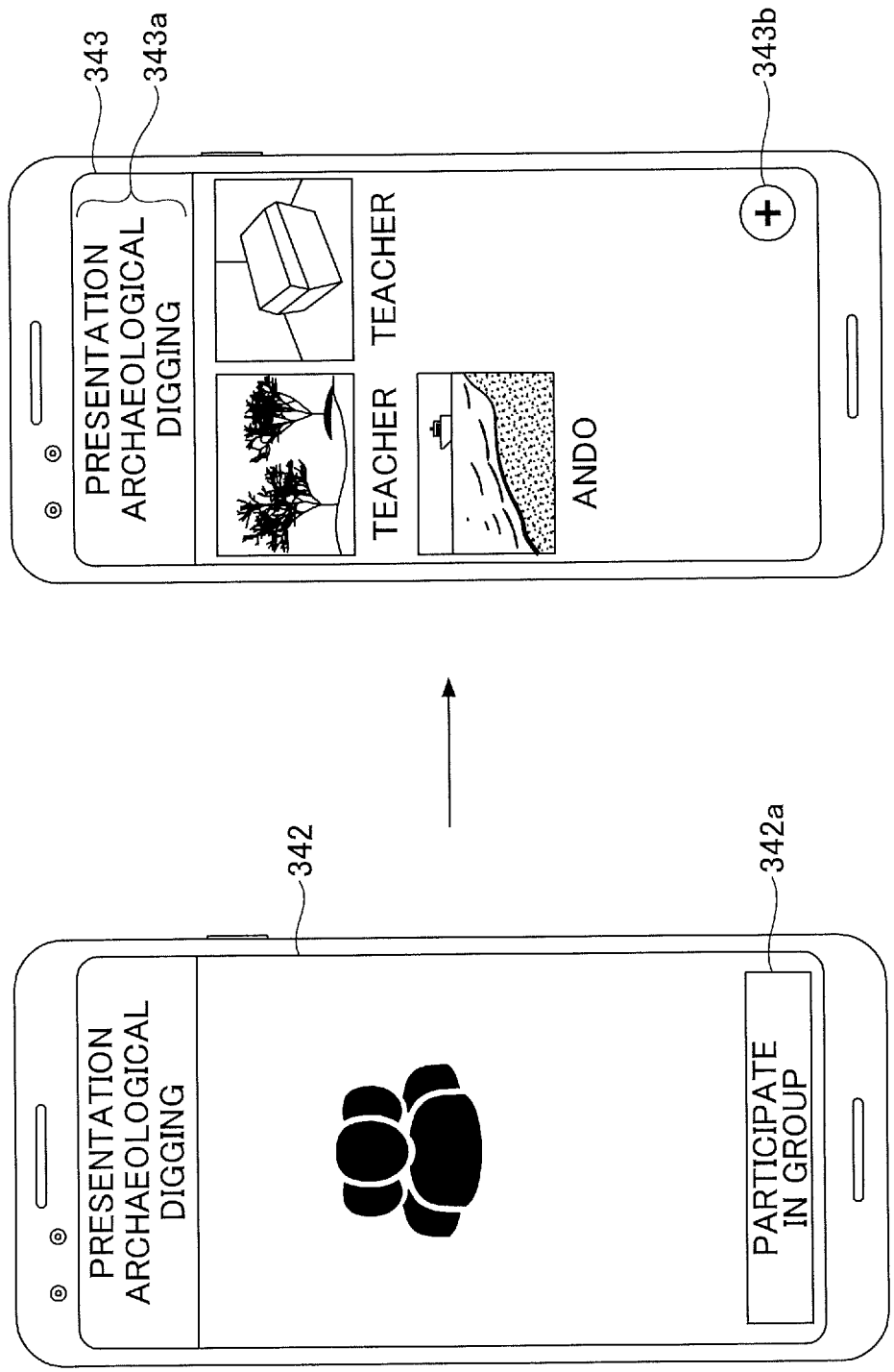

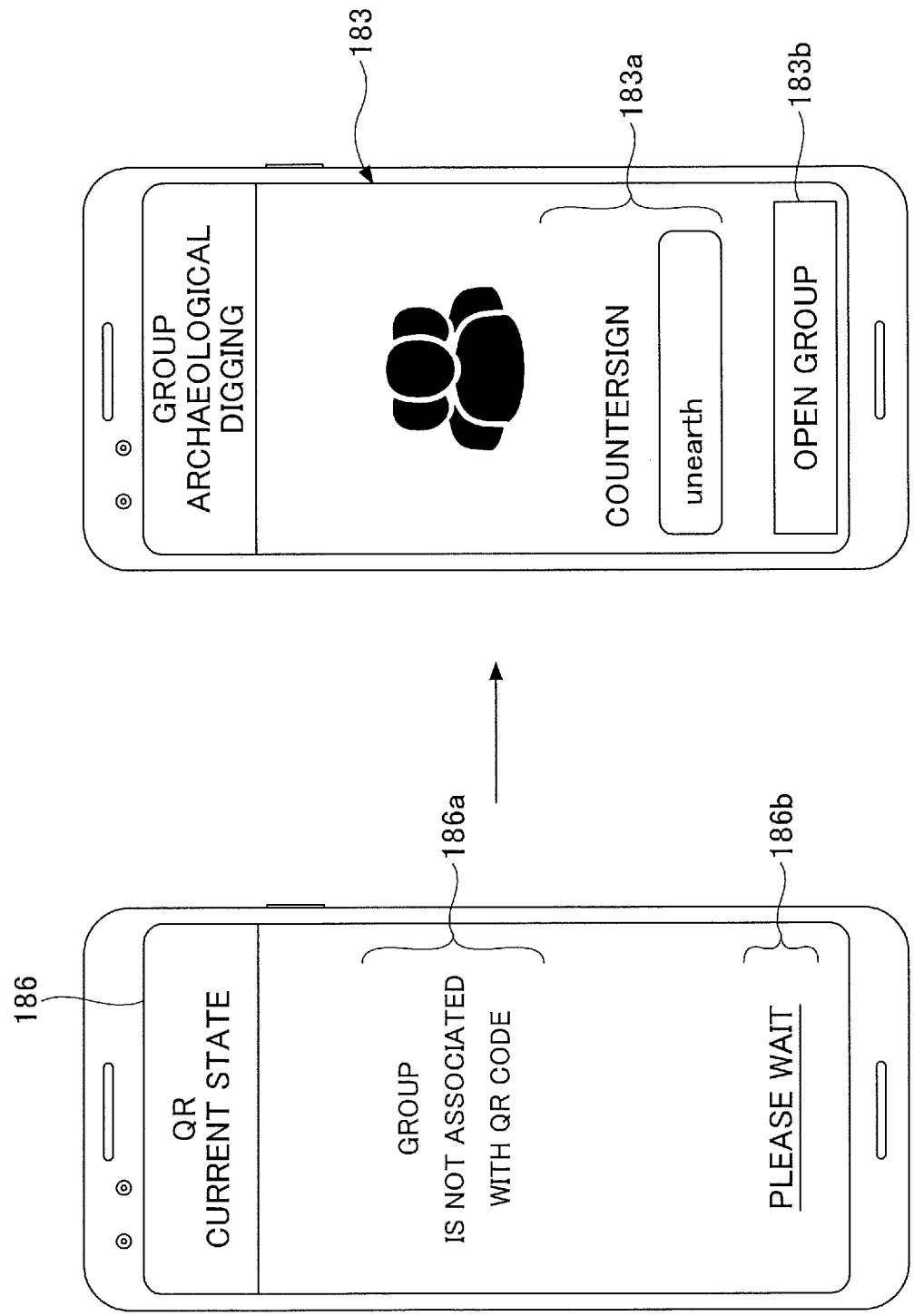

INFORMATION PROCESSING SYSTEM, INFORMATION PROCESSING APPARATUS, AND INFORMATION PROCESSING METHOD

CROSS-REFERENCE TO RELATED APPLICATIONS

The present application is based on and claims priority under 35 U.S.C. § 119 to Japanese Patent Application No. 2019-214909, filed Nov. 28, 2019, and Japanese Patent Application No. 2020-163833, filed Sep. 29, 2020. The contents of Japanese Patent Application No. 2019-214909 and Japanese Patent Application No. 2020-163833 are incorporated herein by reference in their entirety.

BACKGROUND OF THE INVENTION

1. Field of the Invention

The present invention relates to an information processing system, an information processing apparatus, and an information processing method.

2. Description of the Related Art

There are various techniques for sharing information, such as images. One known technique is to create a shared stream representing a set of shared content, invite participants, and stream the set of shared content to participants' apparatuses when the participants subscribe the shared stream. Publication No. 2015-527628 discloses related art.

SUMMARY OF THE INVENTION

The disclosed technique includes an information processing system including an information processing apparatus. The information processing apparatus includes circuitry configured to provide a sharing service of enabling information to be shared by one or more terminal apparatuses, the one or more terminal apparatuses being included in the information processing system, the information processing apparatus being capable of communicating with the one or more terminal apparatuses, and the one or more terminal apparatuses being associated with a group; receive first identification information from each of the one or more terminal apparatuses; and associate the first identification information with the sharing service. Each of the one or more terminal apparatuses includes circuitry configured to obtain the first identification information from outside and transmit the first identification information to the information processing apparatus. The circuitry of the information processing apparatus is further configured to, when having associated the first identification information with the sharing service, associate, with the group, the one or more terminal apparatuses having received the first identification information from outside and having transmitted the first identification information; and provide the sharing service of enabling information to be shared by the one or more terminal apparatuses that are associated with the group.

Other objects, features and advantages of the present invention will become more apparent from the following detailed description when read in conjunction with the accompanying drawings.

BRIEF DESCRIPTION OF THE DRAWINGS

FIG. 7 is a diagram illustrating an example of an application information storage unit according to the first embodiment;

FIG. 8 is a diagram illustrating an example of a user information storage unit according to the first embodiment;

FIG. 9 is a diagram illustrating an example of a file information storage unit according to the first embodiment;

FIG. 10 is a diagram illustrating an example of an associated application information storage unit according to the first embodiment;

FIG. 11 is a diagram illustrating an example of a sub-application list storage unit according to the first embodiment;

FIG. 12 is a diagram illustrating an example of a group information storage unit according to the first embodiment;

FIG. 13C is the first sequence diagram (a third section) illustrating an operation of the information processing system according to the first embodiment;

FIG. 14A is a first diagram (a first section) illustrating a screen transition of a teacher terminal according to the first embodiment;

FIG. 14B is the first diagram (a second section) illustrating another screen transition at the teacher terminal according to the first embodiment;

FIG. 15B is the second sequence diagram (a second section) illustrating an operation of the information processing system according to the first embodiment;

FIG. 16A is a second diagram (a first section) illustrating a screen transition at the teacher terminal according to the first embodiment;

FIG. 16B is the second diagram (a second section) illustrating another screen transition at the teacher terminal according to the first embodiment;

FIG. 18A is a diagram (a first section) illustrating a screen transition of a student terminal according to the first embodiment;

FIG. 18B is the diagram (a second section) illustrating another screen transition at the student terminal according to the first embodiment;

FIG. 21C is a diagram illustrating information stored in a storage unit of a terminal apparatus;

FIG. 22 is a diagram illustrating an example of a registered information storage unit according to the second embodiment;

FIG. 23 is a diagram illustrating an example of an application information storage unit according to the second embodiment;

FIG. 24 is a diagram illustrating an example of a user information storage unit according to the second embodiment;

FIG. 25 is a diagram illustrating an example of a sub-application information storage unit according to the second embodiment;

FIG. 26 is a diagram illustrating an example of a group information storage unit according to the second embodiment;

FIG. 27 is a diagram illustrating an example of an apparatus information storage unit according to the second embodiment;

FIG. 30A is a second sequence diagram (a first section) illustrating an operation of the information processing system according to the second embodiment;

FIG. 31A is a diagram (a first section) illustrating a screen transition at a terminal apparatus (host) according to the second embodiment;

FIG. 31C is a diagram (a third section) illustrating a yet other screen transition at the terminal apparatus (host) according to the second embodiment;

FIG. 32A is a diagram (a first section) illustrating a screen transition of an output apparatus according to a second embodiment;

FIG. 34B is the diagram (a second section) illustrating another screen transition at the terminal apparatus (participant) according to the second embodiment;

FIG. 36B is the diagram (a second section) illustrating another screen transition at the student terminal according to the third embodiment;

DESCRIPTION OF THE EMBODIMENTS

In the related art described above, prior preparation, which may be troublesome, such as creation of a shared stream and invitation of participants, are required to share information.

The embodiments have been devised in view of the above points and are intended to make it easier to share information.

According to the disclosed technique, information can be easily shared.

First Embodiment

Figure 1:
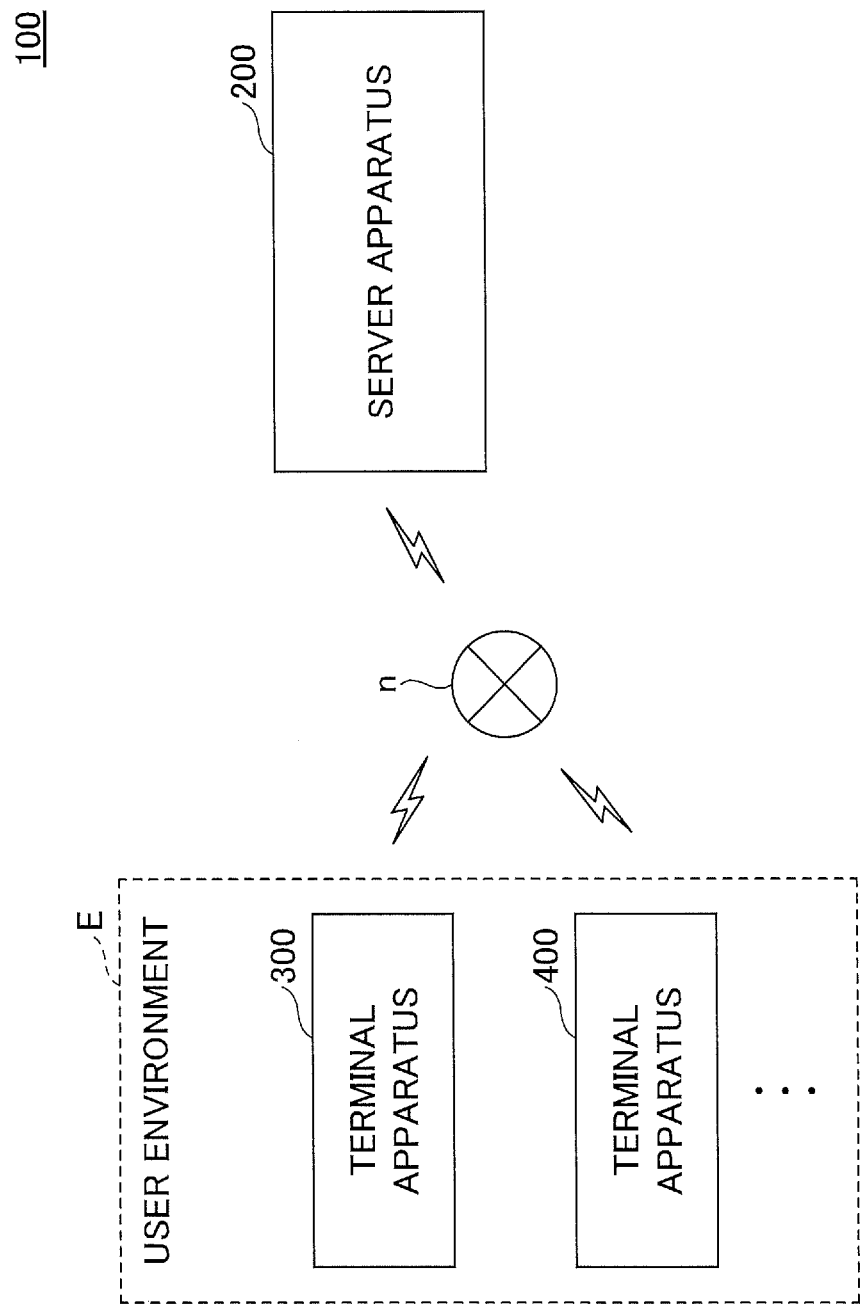
FIG. 1 is a diagram illustrating an example of a configuration of an information processing system according to a first embodiment.

A first embodiment will now be described with reference to the drawings. FIG. 1 is a diagram illustrating an example of a configuration of an information processing system.

In the information processing system 100 according to the present embodiment, a server apparatus 200 and a user environment E are capable of communicating via a wide-area network n, such as the Internet. However, the network n may be a network that can be accessed within a predetermined area, such as an intranet.

The user environment E is a system environment in an organization such as a company or an educational institution such as a school, including one or more terminal apparatuses 300, 400, . . . , N.

The terminal apparatuses 300, 400, . . . , N are information processing terminals carried or used by respective users in the user environment E. For example, a smartphone, a tablet terminal, a PC, or a cellular phone may be used as each of the terminal apparatuses 300, 400, . . . , N.

The terminal apparatuses 300 and 400 are information processing terminals carried by respective users in the user environment E. For example, a smartphone, a tablet terminal, a PC, or a cellular phone may be used as each of the terminal apparatuses 300 and 400. The terminal apparatuses 300 and 400 can be connected to the network n (for example, via a mobile communication network) without using a LAN or the like in the user environment E. However, the terminal apparatuses 300 and 400 may be capable of being connected to a network within the user environment E.

The server apparatus 200 according to the present embodiment provides a service, selected in the user environment E, to the user environment E.

Specifically, the server apparatus 200 according to the present embodiment displays a two-dimensional code and a list of services to be provided by the server apparatus 200 to the user environment E on the terminal apparatus 300 when the two-dimensional code is read by any terminal apparatus such as the terminal apparatus 300 in the user environment E. When a service is selected at the terminal apparatus 300, the server apparatus 200 associates the selected service with the two-dimensional code.

When the two-dimensional code is read by the terminal apparatus 400 after the two-dimensional code is associated with the service, the server apparatus 200 provides the terminal apparatus 400 with the service associated with the two-dimensional code.

Figure 2:
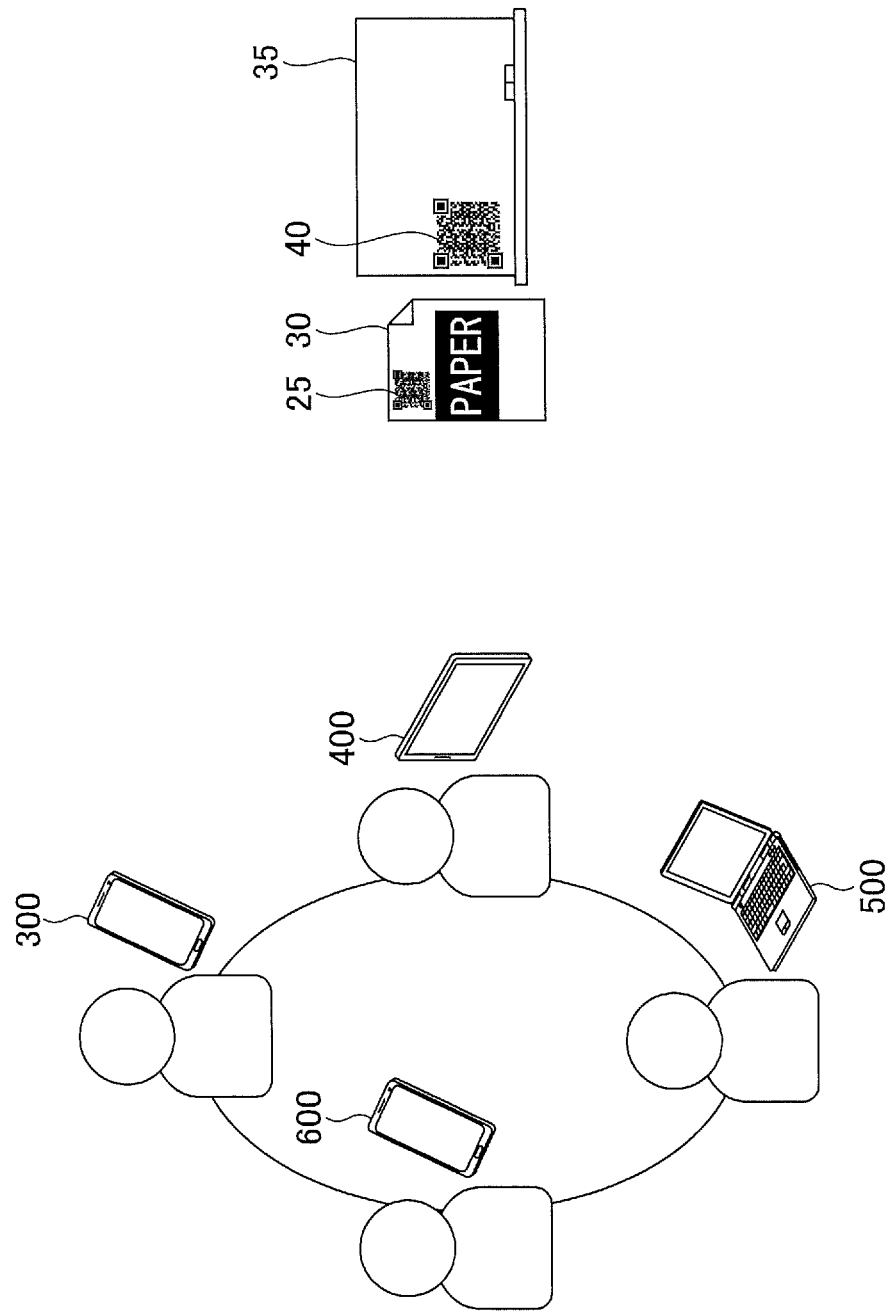
FIG. 2 is a diagram illustrating an outline of an operation of the information processing system according to the first embodiment.

A service associated with a two-dimensional code will be described below with reference to FIG. 2. FIG. 2 is a diagram illustrating a service associated with a two-dimensional code.

In the example of FIG. 2, a two-dimensional code 25 is printed on a paper sheet 30 or on a card 40 affixed to a blackboard 35.

In a two-dimensional code 25 according to the present embodiment, identification information (a registered ID) for identifying a service to be associated with the two-dimensional code 25, and an initial access uniform resource locator (URL) to be accessed first by a terminal apparatus that reads the two-dimensional code 25 are embedded.

For example, when the terminal apparatus 300 reads the two-dimensional code 25, the terminal apparatus 300 accesses the initial access URL. The terminal apparatus 300 displays a list of services that can be associated with the two-dimensional code 25. At this time, the two-dimensional code 25 has not been associated with the service. In the following description, an application that associates a two-dimensional code 25 with a service may be referred to as a QR application.

When a service to be associated with the two-dimensional code 25 is selected by the user from the list of services, the terminal apparatus 300 causes the server apparatus 200 to associate the selected service with the two-dimensional code 25. In the example of FIG. 2, a service of enabling information to be shared by specific users is associated with the two-dimensional code 25.

Next, each of the terminal apparatus 400, the terminal apparatus 500, and the terminal apparatus 600 reads the two-dimensional code 25. At this time, the two-dimensional code 25 has been associated with the service of enabling information to be shared by specific users. Thus, according to the present embodiment, the service of enabling information to be shared is provided to the terminal apparatuses 300, 400, 500, and 600. In other words, information comes to be able to be shared by the terminal apparatuses 300, 400, 500, and 600.

In the following description, a service of enabling information to be shared may be referred to as a sharing service. A sharing service is a service that uploads information to a predetermined storage location and enables the information to be shared by multiple terminals via a network.

In a sharing service, a specific method of enabling information to be shared may be, for example, a method of delivering a link to reach an uploaded storage location to a plurality of terminals, or a method of delivering uploaded information itself to a plurality of terminals via a network. Information enabled by a sharing service to be shared is electronic data, such as an image, a text, a video, a sound, or a document.

More specifically, when the terminal apparatus 300 reads the two-dimensional code 25, resulting in the two-dimensional code 25 being associated with the service of enabling information to be shared by specific users, a storage area (a folder or the like) associated with the two-dimensional code 25 is prepared at the server apparatus 200.

When each of the terminal apparatuses 300, 400, 500, and 600 reads the two-dimensional code 25, each of the terminal apparatuses 300, 400, 500, and 600 is allowed to access the storage area associated with the two-dimensional code 25.

At this time, according to the present embodiment, access to the storage area associated with the two-dimensional code 25 may be permitted only for a terminal apparatus that reads the two-dimensional code 25 within a predetermined time after the two-dimensional code 25 is associated with the service. In other words, in the present embodiment, information sharing is permitted only for a terminal apparatus that has read the two-dimensional code 25 within a validity period of the two-dimensional code 25.

In the present embodiment, a time span in which access to the storage area associated with the two-dimensional code 25 is permitted may be limited. In other words, in the present embodiment, a period for holding the information in the storage area associated with the two-dimensional code 25 may be previously determined.

In the present embodiment, when this period has elapsed, the information stored in the storage area associated with the two-dimensional code 25 may be copied and stored in another storage device, etc., and the information stored in the storage area associated with the two-dimensional code 25 may be deleted.

In the present embodiment, by associating the two-dimensional code 25 with a service as described above, information can be shared by a plurality of terminal apparatuses that read the two-dimensional code 25 as a result of simply the two-dimensional code 25 being read. In the present embodiment, as a result of thus setting the validity period to the two-dimensional code 25, it is possible to guarantee the confidentiality of shared information.

A two-dimensional code according to the present embodiment is, for example, a QR code (registered trademark), but is not limited to a QR code. In the present embodiment, a service and a two-dimensional code are to be associated with each other, but such a manner need not be used. In the present embodiment, a one-dimensional code, such as a bar code, may be associated with a service.

In the present embodiment, a method of obtaining information (first identification information) included in a code may be other than a method of reading the code. For example, the information may be obtained as a result of a beacon signal including the same information as the information included in a code being received from a beacon transmitter; or as a result of the information being received from a communication tag through a near field communication (NFC). In addition, for example, the information may be obtained in such a manner that a sound wave including the same information as the information included in a code is received from an acoustic wave generator.

Figure 3:
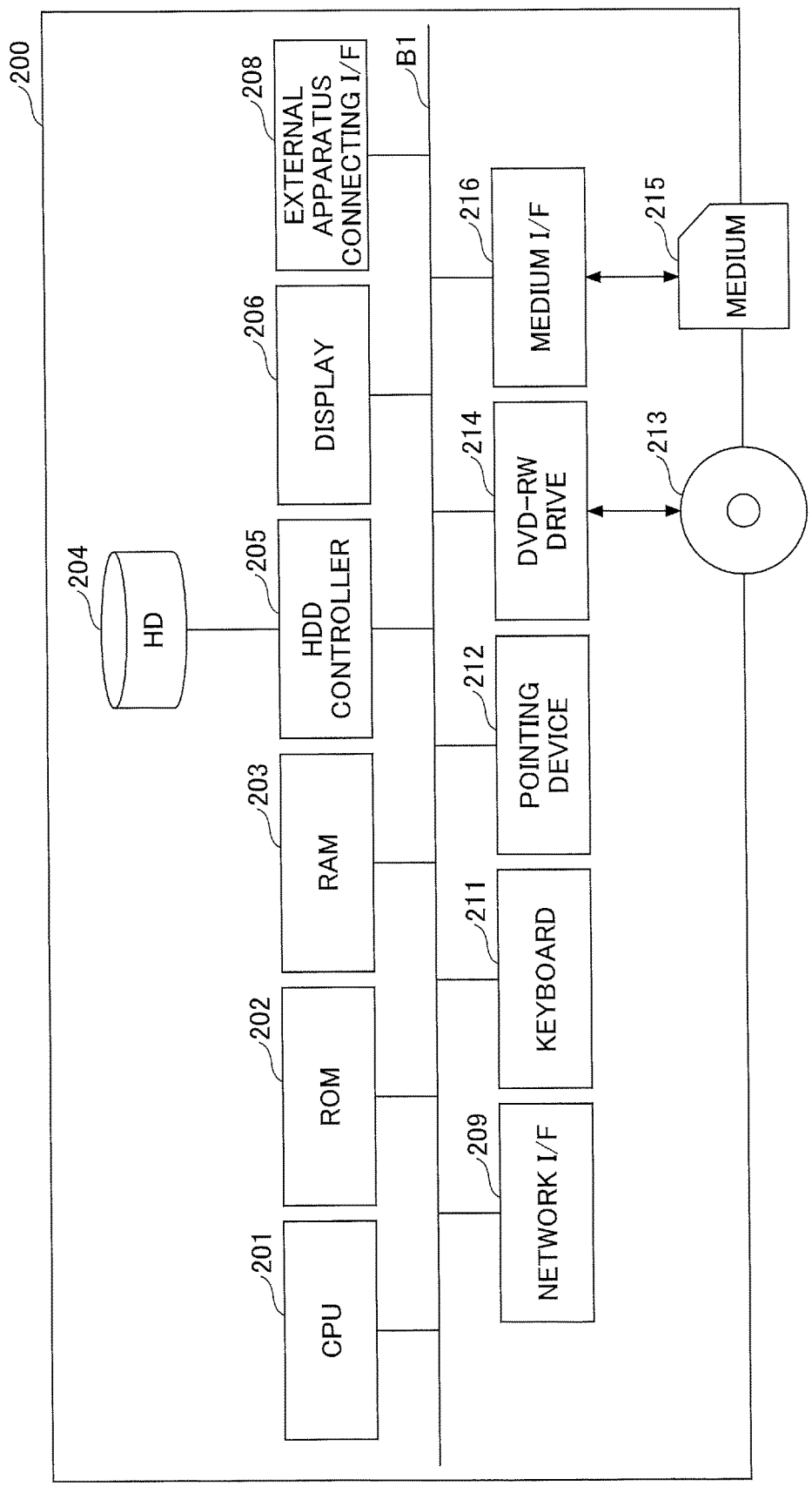
FIG. 3 is a diagram illustrating an example of a hardware configuration of a server apparatus.
Figure 4:
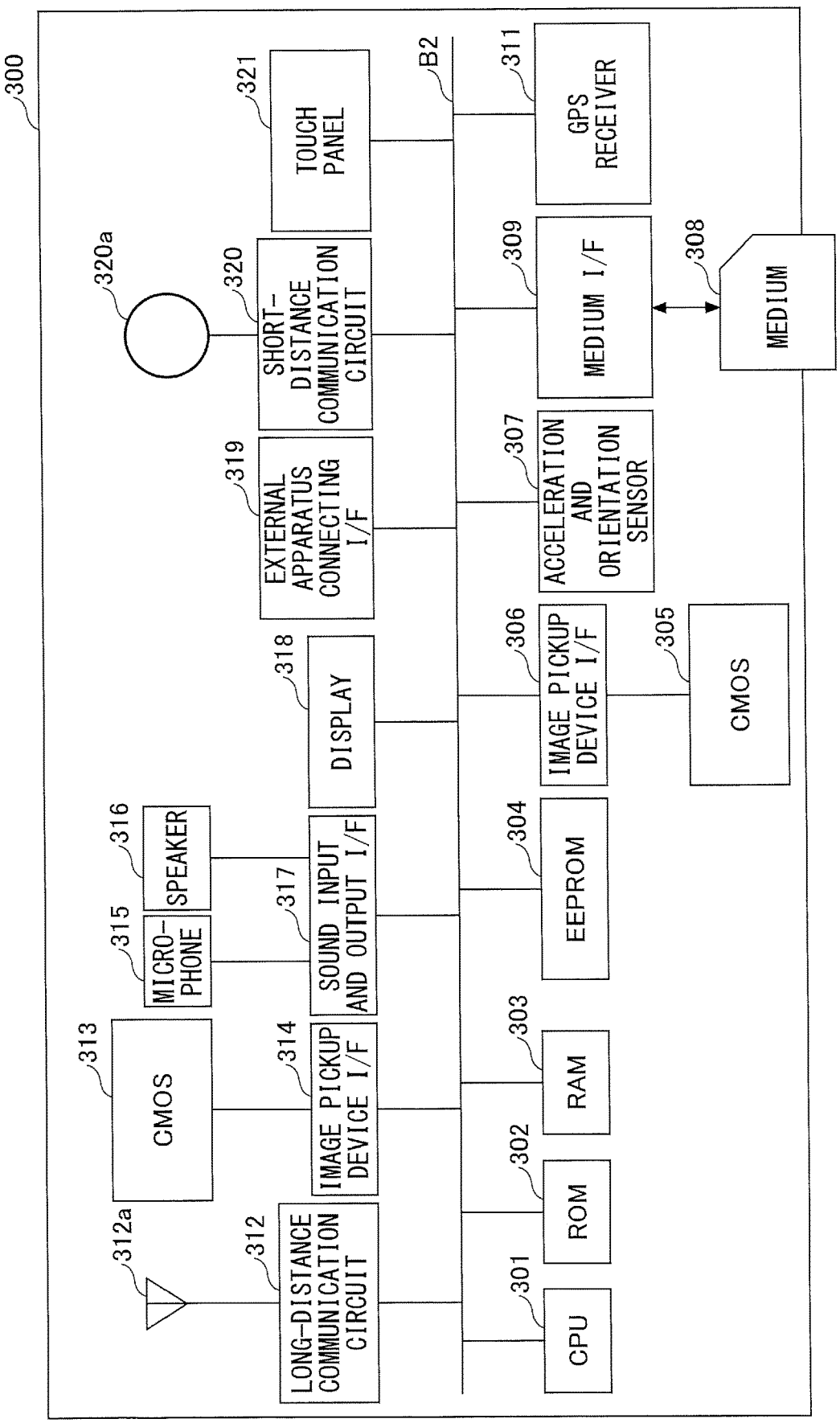
FIG. 4 is a diagram illustrating an example of a hardware configuration of a terminal apparatus.

Hereinafter, a hardware configuration of each apparatus included in the information processing system 100 according to the present embodiment will be described with reference to FIGS. 3 and 4. FIG. 3 is a diagram illustrating an example of a hardware configuration of the server apparatus.

The server apparatus 200 of the present embodiment is a computer and includes a CPU 201, a ROM 202, a RAM 203, a HD 204, a hard disk drive (HDD) controller 205, a display 206, an external apparatus connecting interface (I/F) 208, a network I/F 209, a data bus B1, a keyboard 211, a pointing device 212, a digital versatile disk rewritable (DVD-RW) drive 214, and a medium I/F 216, as illustrated in FIG. 3.

The CPU 201 controls operations of the entire server apparatus 200. The ROM 202 stores a program used to drive the CPU 201, such as an IPL. The RAM 203 is used as a work area of the CPU 201. The HD 204 stores various data such as a program. The HDD controller 205 controls reading or writing of various data with respect to the HD 204 under the control of the CPU 201. The display 206 displays various information such as a cursor, a menu, a window (screen page), characters, or an image. The external apparatus connecting I/F 208 is an interface for connecting various external apparatuses/devices. For example, the external apparatus/device may be, for example, a universal serial bus (USB) memory or a printer. The network I/F 209 is an interface for performing data communication using the communication network N. The data bus B1 includes an address bus and a data bus for electrically connecting components such as the CPU 201 illustrated in FIG. 3.

The keyboard 211 is a type of input device having a plurality of keys for inputting characters, numbers, various indications, and the like. The pointing device 212 is a type of input device for selecting and executing various instructions, selecting a processing target, moving a cursor, and the like. The DVD-RW drive 214 controls reading or writing of various data with respect to a DVD-RW 213 as an example of a removable recording medium. A disk/disc recording medium may be not only a DVD-RW but also a DVD-R, etc. The medium I/F 216 controls reading or writing (storing) of data with respect to a recording medium 215, such as a flash memory.

The server apparatus 200 according to the present embodiment may be, for example, a smartphone, a tablet terminal, a personal digital assistant (PDA), a wearable PC, or the like.

Next, a hardware configuration of each of the terminal apparatuses 300, 400, . . . , N will be described with reference to FIG. 4. Hereinafter, a hardware configuration of the terminal apparatus 300 will be described as an example of the terminal apparatuses 300, 400, . . . , and N. FIG. 4 is a diagram illustrating an example of a hardware configuration of the terminal apparatus.

The terminal apparatus 300 according to the present embodiment includes a CPU 301, a ROM 302, a RAM 303, an EEPROM 304, a complementary metal oxide semiconductor (CMOS) sensor 305, an image pickup device I/F 306, an acceleration and orientation sensor 307, a medium I/F 309, and a GPS receiver 311.

The CPU 301 is an arithmetic and logic processing device that controls operations of the entire terminal apparatus 300. The ROM 302 stores a program used for driving the CPU 301, such as an IPL. The RAM 303 is used as a work area of the CPU 301. The EEPROM 304 is used to read out or write various data such as a smartphone program under the control of the CPU 301. The ROM 302, RAM 303, and EEPROM 304 are examples of storage devices of the terminal apparatus 300.

The CMOS sensor 305 is a type of a built-in image pickup device that captures an image of a subject (mainly a self-image) under the control of the CPU 301 and obtains image data. Instead of a CMOS sensor, an image pickup device such as a charge coupled device (CCD) sensor may be used.

The image pickup device I/F 306 is a circuit that controls drive of the CMOS sensor 405. The acceleration and orientation sensor 307 is a variety of sensors such as an electromagnetic compass, a gyrocompass, and an acceleration sensor for detecting a geomagnetic field. The medium I/F 309 controls reading or writing (storing) of data with respect to a recording medium 308, such as a flash memory. The GPS receiver 311 receives GPS signals from GPS satellites.

The terminal apparatus 300 includes a long-distance communication circuit 312, an antenna 312a of the long-distance communication circuit 312, a CMOS sensor 313, an image pickup device I/F 314, a microphone 315, a speaker 316, a sound input and output I/F 317, a display 318, an external apparatus connecting I/F 319, a short-distance communication circuit 320, an antenna 320a of the short-distance communication circuit 320, and a touch panel 321.

The long-distance communication circuit 312 is a circuit that communicates with other apparatuses via a communication network. The CMOS sensor 313 is a type of a built-in imaging device that captures an image of a subject under the control of the CPU 301 and obtains image data. The image pickup device I/F 314 is a circuit that controls drive of the CMOS sensor 313. The microphone 315 is a built-in circuit that converts sound to an electrical signal. The speaker 316 is a built-in circuit that converts an electrical signal to a physical vibration to produce sound, such as a music or a voice. The sound input and output I/F 317 is a circuit that processes input and output sound signals with respect to the microphone 315 and the speaker 316 under the control of the CPU 301.

The display 318 is a type of a display device such as a liquid crystal device or an organic electro luminescence (EL) device for displaying an image of a subject or various icons. The external apparatus connecting I/F 319 is an interface for connecting various external apparatuses/devices. The short-distance communication circuit 320 is a communication circuit such as a near field communication (NFC) circuit or a Bluetooth (registered trademark) circuit. The touch panel 321 is a type of an input device for the user to operate the terminal apparatus 300 by touching the display 318. The display 318 is an example of a display device of the terminal apparatus 300.

Figure 5:
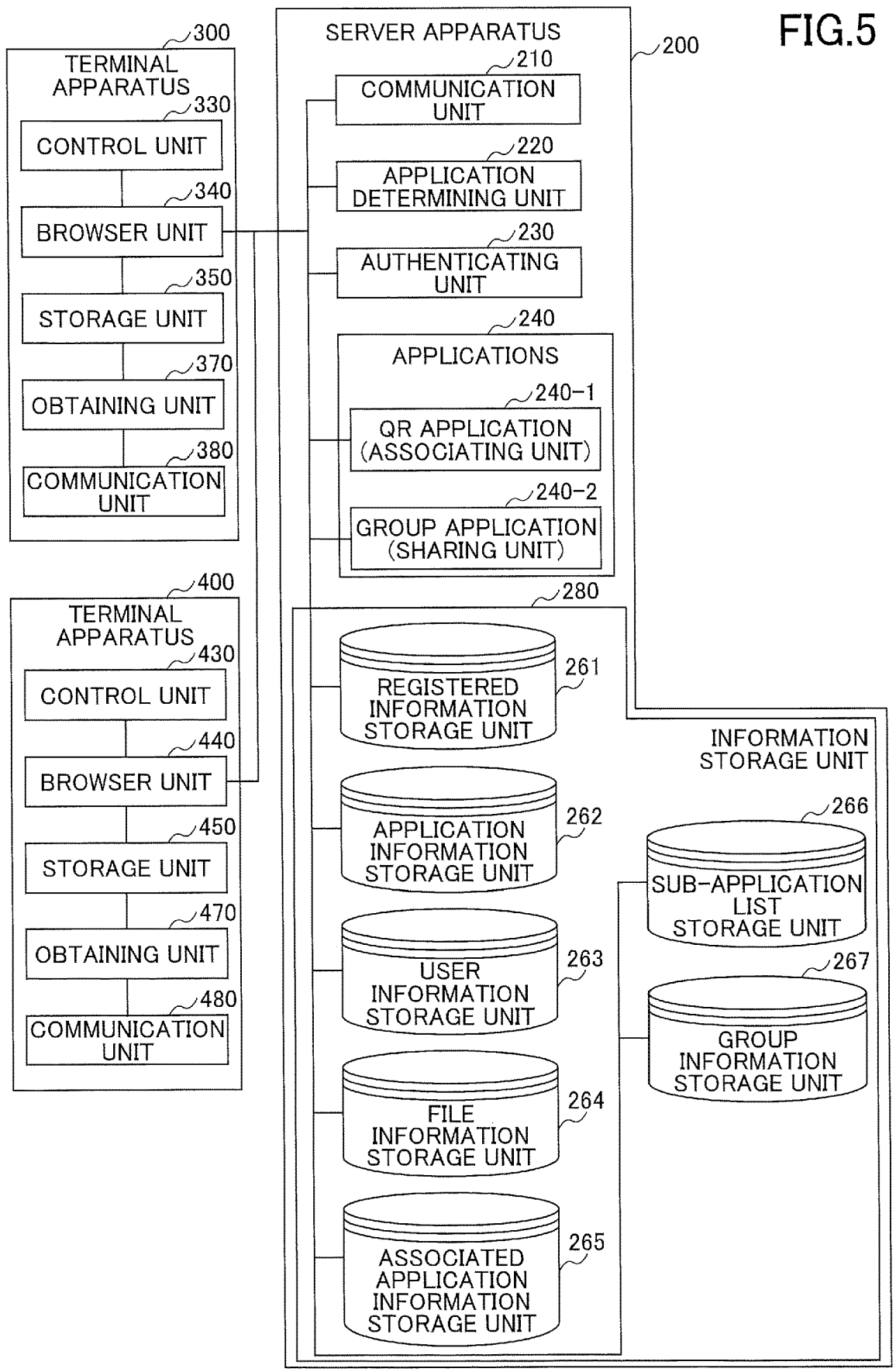
FIG. 5 is a diagram illustrating a functional configuration of each apparatus according to the first embodiment.

Next, functions of each apparatus included in the information processing system 100 according to the present embodiment will be described with reference to FIG. 5. FIG. 5 is a diagram illustrating an example of a functional configuration of each apparatus according to the first embodiment. In the following description, as an example, the information processing system 100 is implemented in an educational site such as a school, the terminal apparatus 300 is mainly used by a teacher, and the terminal apparatus 400 is mainly used by a student. In the following description, the terminal apparatus 300 is referred to as a teacher terminal 300 and the terminal apparatus 400 is referred to as a student terminal 400.

The teacher terminal 300 according to the present embodiment includes a control unit 330, a browser unit 340, a storage unit 350, an obtaining unit 370, and a communication unit 380. Each of these units is implemented by a process in which one or more programs installed in the teacher terminal 300 are executed by the CPU 301. The control unit 330 may be implemented by, for example, an operating system or may be implemented by software such as an application. The control unit 330 starts the browser unit 340 in response to an operation of a user of the teacher terminal 300.

For example, the browser unit 340 is a typical web browser and performs processing according to hypertext markup language (HTML) data, scripts (for example, JavaScript (registered trademark)), or the like. The browser unit 340 starts from reading a two-dimensional code. When a two-dimensional code is read, the browser unit 340 according to the present embodiment accesses the server apparatus 200 based on the initial access URL included in the two-dimensional code and executes an application corresponding to a registered ID included in the two-dimensional code.

The registered ID is identification information that identifies a service and is previously associated with an application that implements the service. A registered ID of the present embodiment is an example of first identification information. The initial access URL denotes a URL to be first accessed when the teacher terminal 300 first accesses the server apparatus 200.

Specifically, the browser unit 340 accesses an application of the server apparatus 200 associated with the registered ID in accordance with a redirect request from the server apparatus 200 performed in response to an access to the initial access URL. The redirect request is a response from the server apparatus 200 in response to an access to the initial access URL.

The browser unit 340 obtains data (HTML data, scripts, etc.), indicating a request for execution of a process to the teacher terminal 300, from the application that has been thus accessed. The obtaining unit 370 obtains information including the registered ID and the initial access URL from the outside. Specifically, for example, the obtaining unit 370 reads the two-dimensional code through the CMOS sensor 313 and the image pickup device I/F 314 to obtain an image including the two-dimensional code in which the registered ID and the initial access URL are embedded.

The obtaining unit 370 may obtain the image including the two-dimensional code in a method other than reading the two-dimensional code. For example, the obtaining unit 370 may receive information including the registered ID and the initial access URL from the outside through communication circuitry such as the long-distance communication circuit 312 or the short-distance communication circuit 320.

The communication unit 380 transmits information, to be sent from the browser unit 340 to the server apparatus 200, to the server apparatus 200 and receives information, to be sent from the server apparatus 200 to the browser unit 340, from the server apparatus 200. The information transmitted by the communication unit 380 includes the registered ID (the first identification information) obtained by the obtaining unit 370.

The information transmitted by the communication unit 380 is received by the communication unit 210 of the server apparatus 200. Thus, the communication unit 380 is an example of a first communication unit that transmits first identification information to the server apparatus 200, and the communication unit 210 is an example of a second communication unit that receives the first identification information from the terminal apparatus 300.

The student terminal 400 according to the present embodiment includes a control unit (operating system unit) 430, a browser unit 440, a storage unit 450, an obtaining unit 470, and a communication unit 480. Each of these units is implemented by a process in which one or more programs installed in the student terminal 400 are executed by the CPU of the student terminal 400. Because the functions of each unit of the student terminal 400 are the same as the functions of the teacher terminal 300, the description thereof will not be repeated.

The server apparatus 200 according to the present embodiment includes a communication unit 210, an application determining unit 220, an authenticating unit 230, an application group 240, and an information storage unit 280. Each of these units is implemented by a process in which one or more programs installed in the server apparatus 200 is executed by the CPU 201.

The storage unit 280 of the present embodiment includes a registered information storage unit 261, an application information storage unit 262, a user information storage unit 263, a file information storage unit 264, an associated application information storage unit 265, a sub-application list storage unit 266, and a group information storage unit 267. Each of these storage units may be implemented using, for example, the HD 204, or a storage device or the like capable of connecting to the server apparatus 200 via a network. Details of each storage unit will be described later.

The communication unit 210 transmits requested information from among the information stored in the file information storage unit 264 to a destination. In the present embodiment, the destination is the terminal apparatus 300, 400, or the like. The information stored in the file information storage unit 264 includes document data and image data. In the following description, the information stored in the file information storage unit 264 is referred to as document image data.

The application determining unit 220 corresponds to the initial access URL. The application determining unit 220 determines an application corresponding to the registered ID (option information) attached to the initial access URL in response to an access to the initial access URL by reading the registered information storage unit 261.

When the application determining unit 220 determines the application corresponding to the registered ID, the application determining unit 220 transmits a response including a redirect request including a URL for the application to the source that has accessed the initial access URL.

According to the present embodiment, the URL for the application included in the application group 240 is determined as the application corresponding to the registered ID in response to the access from the teacher terminal 300.

The authenticating unit 230 compares account information input from the teacher terminal 300 or the student terminal 400 with the user information stored in the user information storage unit 263 to authenticate the user (the account information) based on the comparison result.

The application group 240 is an example of applications that the server apparatus 200 has.

The application group 240 includes an input application and an output application. An input application is, for example, an application for executing a process for a purpose. Each application transmits HTML data and scripts, etc. for executing a process for a purpose to the teacher terminal 300 or the student terminal 400. An output application is an application for obtaining (downloading) document image data stored in the file information storage unit 264 and implementing a corresponding rendering process.

The application group 240 according to the present embodiment includes various applications that implement services to be provided by the server apparatus 200, for example. The application group 240 according to the present embodiment includes, for example, a QR application 240-1 and a group application 240-2.

The QR application 240-1 is an application (an input application) causing the teacher terminal 300 to execute a process of associating a service with a two-dimensional code read by the teacher terminal 300. In other words, the QR application 240-1 is an example of an associating unit that associates identification information (a registered ID) read from a two-dimensional code with a service of enabling information to be shared by a plurality of terminal apparatuses.

The group application 240-2 is an application for executing a process of determining terminal apparatuses (the teacher terminal 300 and the student terminal 400) that share information to be included in one group. The group application 240-2 is an application for causing each of terminal apparatuses determined to be included in one group to obtain document image data and implement a rendering process with respect to the document image data. In other words, the group application 240-2 is an application that implements both an input application and an output application. In other words, the group application 240-2 is an example of a sharing unit that enables information to be shared by terminal apparatuses that read a two-dimensional code including identification information.

Next, each storage unit of the server apparatus 200 will be described with reference to FIGS. 6-12.

Figure 6:
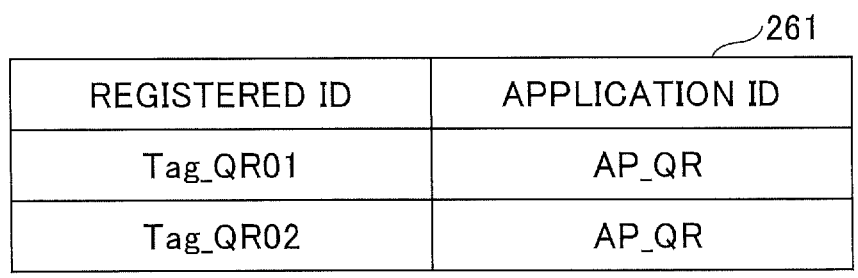
FIG. 6 is a diagram illustrating an example of a registered information storage unit according to the first embodiment.

FIG. 6 is a diagram illustrating an example of the registered information storage unit according to the first embodiment. The registered information stored in the registered information storage unit 261 according to the present embodiment is information that is provided before an operation of the information processing system 100 described later is performed.

The registered information storage unit 261 has a registered ID and an application ID as items of information, and both types of IDs are associated with each other.

The value of the item "registered ID" indicates identification information for identifying a service provided by the information processing system 100. The value of the item "registered ID" according to the present embodiment is embedded in a two-dimensional code. The value of the item "application ID" indicates identification information for identifying an application. An application ID of the present embodiment is an example of second identification information.

In the present embodiment, in the registered information storage unit 261, information including the value of the item "registered ID" and the value of the item "application ID" are referred to as registered information. Registered information associates a service with an application.

In the example of FIG. 6, the registered ID "Tag_QR01" is associated with the application ID "AP_QR".

The registered ID "Tag_QR01" according to the present embodiment is identification information for identifying a service of associating a two-dimensional code with a service, and the application ID "AP_QR" is identification information for identifying a QR application that implements a process of associating a two-dimensional code with a service.

FIG. 7 is a diagram illustrating an example of an application information storage unit according to the first embodiment. The application information stored in the application information storage unit 262 according to the present embodiment is information provided before the operation of the information processing system 100 described later is performed.

The application information storage unit 262 includes an application ID, an application type, a URL, and a corresponding browser as items of information, and the item "application ID" is associated with the other items.

The value of the item "application type" indicates a type based on a relationship with document image data for the application identified by the application ID. When the value of the item "application type" is "In", the value indicates that the corresponding application is an application that controls input of document image data. In other words, when the value of the item "application type" is "In", the value indicates that the corresponding application is an input application included in the application group 240.

When the value of the item "application type" is "Out", the value indicates that the corresponding application is an application that controls output of document image data.

The value of the item "URL" is an URL of the application identified by the application ID.

The value of the item "corresponding browser" indicates a type of a browser that operates the application identified by the application ID. In the example of FIG. 7, a type of a browser indicates a browser for a terminal apparatus, i.e., a browser unit included in the teacher terminal 300 or the student terminal 400.

In the following description, information including the value of each item in the application information storage unit 262 is referred to as application information. Application information according to the present embodiment is previously provided information.

FIG. 8 is a diagram illustrating an example of the user information storage unit according to the first embodiment. The user information stored in the user information storage unit 263 is information that is provided before the operation of the information processing system 10, which will be described later, is performed.

The user information storage unit 263 includes a tenant ID, a user ID, a type, a name, and a usable application as items of information, and the item "user ID" is associated with the other items.

The value of the item "tenant ID" is identification information of a contractor (tenant) of a service usage contract for services provided by the server apparatus 200. For example, the user environment E may correspond to one tenant.

The value of the item "user ID" is identification information for identifying a user of a terminal apparatus. Specifically, the value of the item "user ID" is identification information for identifying the teacher who is the user of the teacher terminal 300 and identification information for identifying the student who is the user of the student terminal 400. In the present embodiment, a user ID is given to each of individuals including teachers and students.

The value of the item "type" indicates a type of a user ID. Specifically, when the value of the item "type" is "guest", the value indicates that the user ID of the corresponding user is not stored in the user information storage unit 263. When the value of the item "type" is "usual", the value indicates that the user ID of the corresponding user is stored in the user information storage unit 263.

The value of the item "name" indicates the name of the user. The value of the item "usable application" is identification information of an application which the corresponding user is permitted to use.

In the following description, information including the values of each item of the user information storage unit 263 is referred to as user information.

In the example of FIG. 8, it can be seen that the user identified as guret1 of the tenant ID "T001" is permitted to use the application identified by the identification information "AP_Group".

FIG. 9 is a diagram illustrating an example of a file information storage unit according to the first embodiment. The file information stored in the file information storage unit 264 according to the present embodiment is information generated when sharing of information starts, and is information generated in the operation of the information processing system 100 which will be described later.

The file information storage unit 264 has a tenant ID, a file name, a group ID, a user ID, an authority, and a file location as items of information.

The value of the item "file name" indicates a file name of document image data to be shared. The value of the item "Group ID" indicates identification information for identifying a group that shares the document image data indicated by the corresponding file name.

The value of the item "user ID" is information for identifying the owner of the document image data indicated by the file name. In the present embodiment, the owner of the document image data means the group creator who created the group that shares the document image data.

The value of the item "authority" indicates whether the document image data indicated by the file name is permitted to be modified. The value of the item "file location" indicates the location of the storage area where the document image data indicated by the file name is stored.

In the following description, information including the values of each item in the file information storage unit 264 is referred to as file information.

FIG. 10 is a diagram illustrating an example of the associated application information storage unit according to the first embodiment. The associated application information stored in the associated application information storage unit 265 according to the present embodiment is information generated when a service is associated with a two-dimensional code, and is information generated in the operation of the information processing system 100 as will be described later.

The associated application information storage unit 265 includes a registered ID, a sub-application ID, a category, a user ID, a usage start time, and a usage end time as items of information.

The value of the item "sub-application ID" is identification information for identifying the application that is subordinately associated with the application ID associated with the registered ID. In the following description, an application identified by a sub-application ID may be referred to as a sub-application.

A sub-application according to the present embodiment is an example of a functional unit that provides a service. In the present embodiment, the QR application 240-1 is associated with a plurality of sub-applications. That is, in the associated application information storage unit 265, the QR application 240-1 is associated with functional units that provide different services, respectively.

The value of the item "category" is information managed for each sub-application. The value of the item "usage start time" indicates the start time of the service identified by the registered ID. The value of the item "usage end time" indicates the usage end time of the service identified by the registered ID.

More specifically, the value of the item "usage start time" indicates the time when associating of a two-dimensional code with the service identified by the registered ID starts, and the value of the item "usage end time" indicates the time when associating of a two-dimensional code with the service identified by the registered ID ends.

According to the present embodiment, for example, the time span during which the service specified by the registered ID can be used is determined, and when usage of the service starts, the usage end time may be determined automatically.

In the following description, in the associated application information storage unit 265, information including the values of each item is referred to as associated application information.

In the example of FIG. 10, the service identified by the registered ID "Tag_QR01" is associated with a sub-application identified by "AP_Group". The information managed by the sub-application "AP_Group" is identified by "Group_Une".

FIG. 11 is a diagram illustrating an example of the sub-application list storage unit according to the first embodiment. The sub-application list storage unit 266 according to the present embodiment stores information indicating a relationship between a QR application identified by an application ID "AP_QR" and a sub-application.

The sub-application list storage unit 266 includes a sub-application ID, an application name, and an "AP_QR" as items of information.

In the example illustrated in FIG. 11, the name of a sub-application identified by "AP_Group" is a "group" and is subordinate to an application identified by an application ID "AP_QR". In other words, the application identified by the application ID "AP_QR" and the sub-application identified by the sub-application ID "AP_Group" are associated with each other.

In the following description, information including the values of each item in the sub-application list storage unit 266 is referred to as sub-application list information.

FIG. 12 is a diagram illustrating an example of the group information storage unit according to the first embodiment. The group information stored in the group information storage unit 267 is information generated when a group is created, and is information generated in the operation of the information processing system 100 to be described later.

The group information storage unit 267 includes a group ID, a group name, a countersign, a storage location, a user ID, and a participant as items of information.

The value of the item "group name" indicates the name of the group identified by the group ID. The value of the item "countersign" indicates a countersign for each group. The value of the item "storage location" indicates the storage location of the information shared by the group. The value of the item "participant" indicates the users participating in the group. The users participating in the group are, in other words, the users who share the information.

Figure 13A:
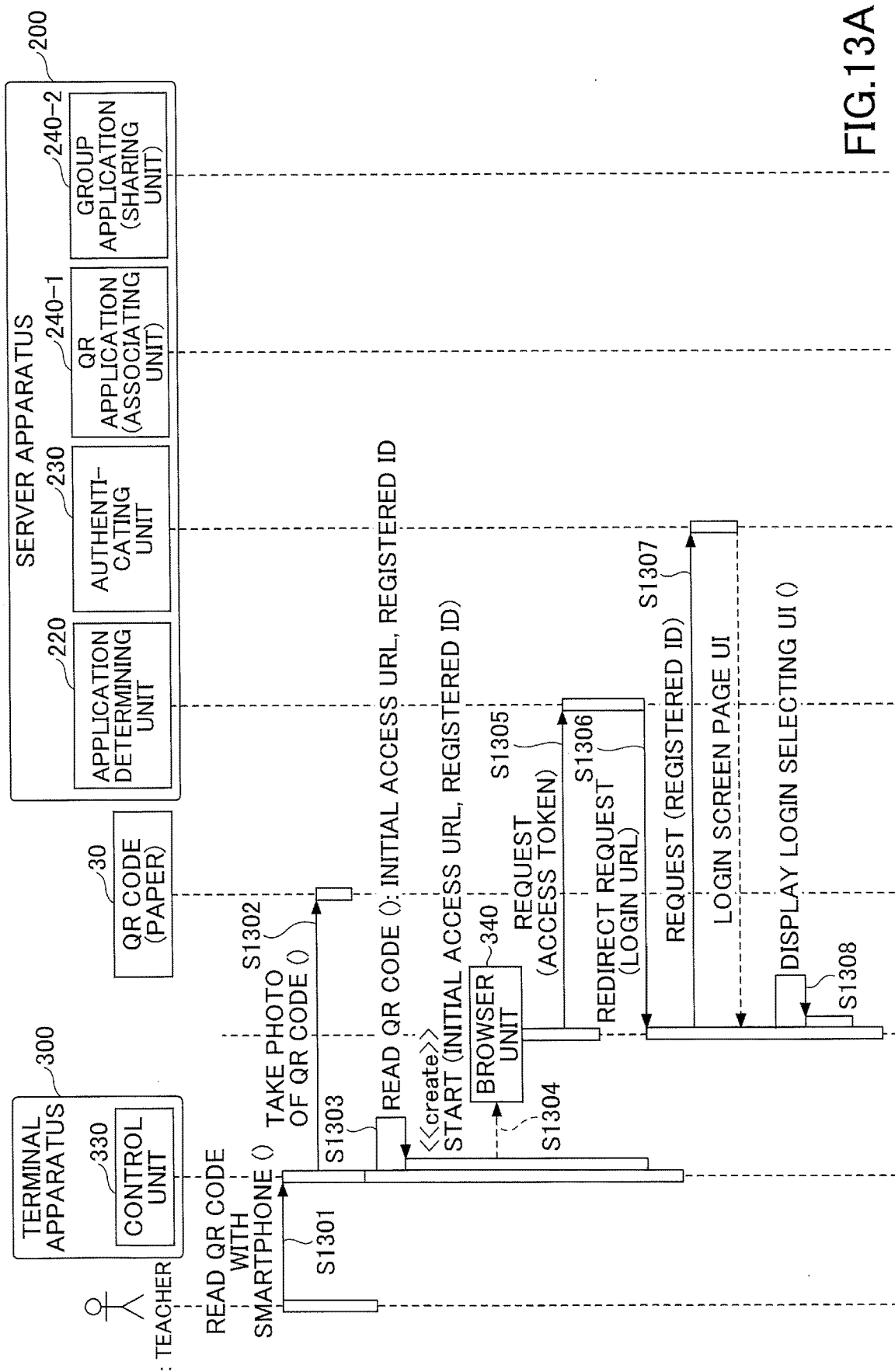
FIG. 13A is a first sequence diagram (a first section) illustrating an operation of the information processing system according to the first embodiment.
Figure 13B:
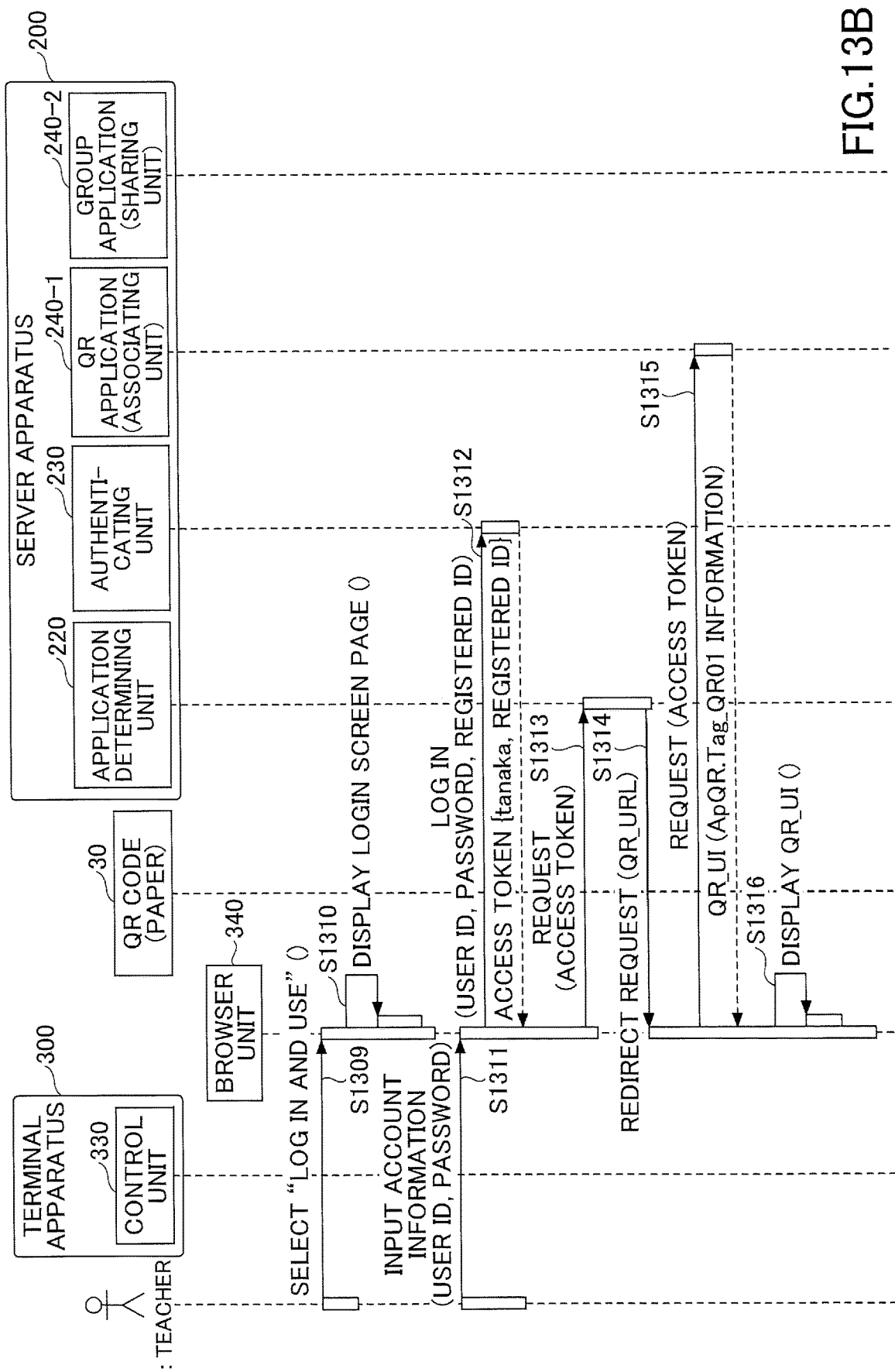
FIG. 13B is the first sequence diagram (a second section) illustrating an operation of the information processing system according to the first embodiment.

Next, an operation of the information processing system 100 according to the present embodiment will be described with reference to FIGS. 13A, 13B, and 13C. FIG. 13A is a first sequence diagram (a first section) illustrating an operation of the information processing system according to the first embodiment. FIG. 13B is the first sequence diagram (a second section) illustrating an operation of the information processing system according to the first embodiment. FIG. 13C is the first sequence diagram (a third section) illustrating an operation of the information processing system according to the first embodiment.

With reference to FIGS. 13A, 13B, and 13C, a procedure for associating a two-dimensional code 25 with a service by the teacher terminal 300 is described. In the following description, a two-dimensional code 25 is a QR code.

In FIG. 13A, in step S1301, the teacher terminal 300 of the information processing system 100 according to the present embodiment receives an instruction to read a QR code from the user (the teacher) and captures an image of the QR code by the control unit 330 with the image pickup device (step S1302). When the teacher terminal 300 detects that the teacher terminal 300 has been brought close to the QR code, the teacher terminal 300 may automatically activate the image pickup device and capture an image of the QR code.

Subsequently, the teacher terminal 300 notifies the user that the QR code has been read by the control unit 330. In step S1303, the registered ID "Tag_QR01" and the initial access URL are obtained from the QR code.

Subsequently, in step S1304, the terminal apparatus 300 activates the browser unit 340. In step S1305, the browser unit 340 attaches an access token to an HTTP request, and automatically transmits the HTTP request to the application determining unit 220 of the server apparatus 200 corresponding to the initial access URL in response to thus being activated. The HTTP request to which the access token is attached is transmitted by the communication unit 380 to the application determining unit 220 of the server apparatus 200.

The access token according to the present embodiment includes the registered ID "Tag_QR01" obtained from the QR code and the user ID of the teacher terminal 300.

In the server apparatus 200, the application determining unit 220 sends a redirect request directed to a login screen page to the teacher terminal 300 for authenticating the user, when the validity period of the access token has elapsed (step S1306).

In step S1307, the browser unit 340 of the teacher terminal 300 receives the redirect request, then requests the URL of the login screen page from the authenticating unit 230 of the server apparatus 200, and obtains the login screen page. At this time, the browser unit 340 transmits the registered ID to the control unit 330 as a request to obtain the URL of the login screen page.

Subsequently, in step S1308, the browser unit 340 displays a selecting screen page for selecting one of a method of logging in and using the information processing system 100 and a method of using the information processing system 100 as a guest. In FIG. 13A, for example, the method of logging in and using the information processing system 100 is selected to associate a QR code with a service.

Then, in FIG. 13B, in step S1310, the browser unit 340 of the teacher terminal 300 displays a login screen page in response to the method of logging in and using the information processing system 100 being selected from the selecting screen page (step S1309).

In step S1312, the browser unit 340 of the teacher terminal 300 receives an input of account information from the login screen page (step S1311) and transmits a login request including the account information to the authenticating unit 230 of the server apparatus 200.

The account information according to the present embodiment is a user ID, a password, or the like. The login request includes the account information and the registered ID obtained from the QR code.

The authenticating unit 230 of the server apparatus 200 reads the user information storage unit 263 and determines whether the same user ID as the user ID included in the account information exists in the user information storage unit 263 and whether an application associated with the registered ID is included in the usable applications corresponding to the user ID.

Specifically, for example, the user ID input to the teacher terminal 300 is "tanaka@ . . . ".

In this case, it is determined that there is a user ID associated with "tanaka@ . . . " in the user information storage unit 263 (see FIG. 8). The application associated with the registered ID "Tag_QR01" in the registered information storage unit 261 is a QR application identified by the application ID "AP_QR" (see FIG. 6).

Therefore, the authenticating unit 230 determines whether the application ID "AP_QR" is included in the usable applications corresponding to "tanaka@ . . . ". In the present embodiment, the application ID "AP_QR" is included in the usable applications corresponding to the user ID "tanaka@ . . . " in the user information storage unit 263. Therefore, the authenticating unit 230 permits the user to use the QR application identified by the application ID "AP_QR".

Specifically, the authenticating unit 230 generates an access token for accessing the user information of the user ID "tanaka@ . . . " and returns the access token to the browser unit 340. The access token includes the registered ID which is the argument of the login request. The browser unit 340 stores the obtained access token.

Subsequently, in step S1313, the browser unit 340 transmits a connection request, to which the obtained access token is attached, to the application determining unit 220 of the server apparatus 200.

In step S1314, the application determining unit 220 transmits a redirect request, directed to the URL of the QR application identified by the application ID "AP_QR" associated with the registered ID "Tag_QR01" included in the access token, to the browser unit 340.

In step S1315, the browser unit 340 receives the redirect request and transmits a connection request, directed to the QR application 240-1, to the server apparatus 200; and receives from the server apparatus 200 the URL of the QR application 240-1 and the associated application information including the registered ID "Tag_QR01" included in the associated application information storage unit 265.

In step S1316, the browser unit 340 reads the received associated application information and displays a screen page indicated by the URL of the QR application 240-1. The screen page that is thus displayed will now be described.

The browser unit 340 according to the present embodiment determines, when the sub-application ID associated with the registered ID is not present in the associated application information including the registered ID "Tag_QR01", that the QR code is not associated with a service (see FIG. 10). In this case, the browser unit 340 displays a screen page including a message indicating that the QR code is not associated with a service and a button for the user to input an instruction to associate the QR code with a service.

When the sub-application ID associated with the registered ID exists in the associated application information including the registered ID "Tag_QR01", the browser unit 340 determines that the QR code is already associated with a service. In this case, the browser unit 340 displays a screen page including a message indicating that the QR code is already associated with a service and a button for selecting whether or not to use the associated service.

The following description of FIG. 13C illustrates the case where the QR code is not associated with a service.

In step S1318, the browser unit 340 displays a screen page for setting a period for providing the QR code upon receiving an instruction to associate the QR code with a service (step S1317).

Subsequently, in step S1320, when the browser unit 340 receives an input of the period (step S1319), the browser unit 340 transmits the set period and the access token to the QR application 240-1.

In step S1321, the QR application 240-1 associates the registered ID "Tag_QR01" included in the access token and the user ID "tanaka@ . . . " with the usage start time and the usage end time, in the associated application information storage unit 265.

Subsequently, in step S1322, the QR application 240-1 reads the user information storage unit 263 and the sub-application list storage unit 266, and transmits a list of sub-applications subordinate to the QR application 240-1 to the browser unit 340.

Specifically, the QR application 240-1 transmits, to the browser unit 340, a list of sub-applications included in the usable applications of the user ID "tanaka@ . . . " in the user information storage unit 263 and subordinate to the application ID "AP_QR" in the sub-application list storage unit 266.

That is, in this case, the application name "group" of the application ID "AP_Group", the application name "sending" of the application ID "AP_Send", the application name "questionnaire survey" of the application ID "AP_Survey", the application name "roster generation" of the application ID "AP_Roster", and the application name "question receiving" of the application ID "AP_Question" are transmitted to the browser unit 340 (see FIGS. 8 and 11).

In step S1323, the browser unit 340 displays a service selecting screen page in response to receiving the list.

Subsequently, in step S1325, when the browser unit 340 receives the user's selection of a service (step S1324), the browser unit 340 transmits a request for associating of the selected service and the access token to the QR application 240-1. It is assumed that the application name "group" is thus selected.

In response to this request, the QR application 240-1 stores the application ID "AP_Group" as the value of the item "sub-application ID" of the associated application information including the registered ID "Tag_QR01" and the user ID "tanaka@ . . . " in the associated application information storage unit 265. In step S1326, the QR application 240-1 reads the application information storage unit 262 and transmits a redirect request including the URL of the application ID "AP_Group" to the browser unit 340 (see FIG. 7).

According to the present embodiment, in the associated application information storage unit 265, a registered ID is associated with a sub-application ID, so that a QR code in which the registered ID is embedded is associated with a service implemented by the application identified by the sub-application ID.

According to the present embodiment, the QR application 240-1 associates the group application 240-2 identified by the application ID "AP_Group" with the QR code. In other words, the QR application 240-1 is an application that implements a service in which a plurality of terminal apparatuses that share information constitute one group.

As described above, the QR application 240-1 according to the present embodiment functions as an associating unit that associates identification information (a registered ID) read from a two-dimensional code with a service of enabling information to be shared by a plurality of terminal apparatuses.

In step S1327, the browser unit 340 receives the redirect request and then transmits the access token and a connection request to the group application 240-2 identified by the application ID "AP_Group".

In step S1328, the group application 240-2 receives the connection request and then transmits the group information, associated with the access token in the group information storage unit 267, to the browser unit 340.

Specifically, in the present embodiment, in the group information storage unit 267, a list of the group names associated with the user ID included in the access token is returned to the browser unit 340 (see FIG. 12).

In the present embodiment, the group name associated with the user ID "tanaka@ . . . " included in the access token is "archaeological digging". Accordingly, the group application 240-2 returns "archaeological digging" to the browser unit 340.

A group whose group name is stored in the group information storage unit 267 is a group created by a user identified by a corresponding user ID. Accordingly, the group having the group name "archaeological digging" is a group created in the past by the teacher having the user ID "tanaka@ . . . ".

In step S1329, the browser unit 340 receives the list of group names and then displays the list.

Figure 14C:
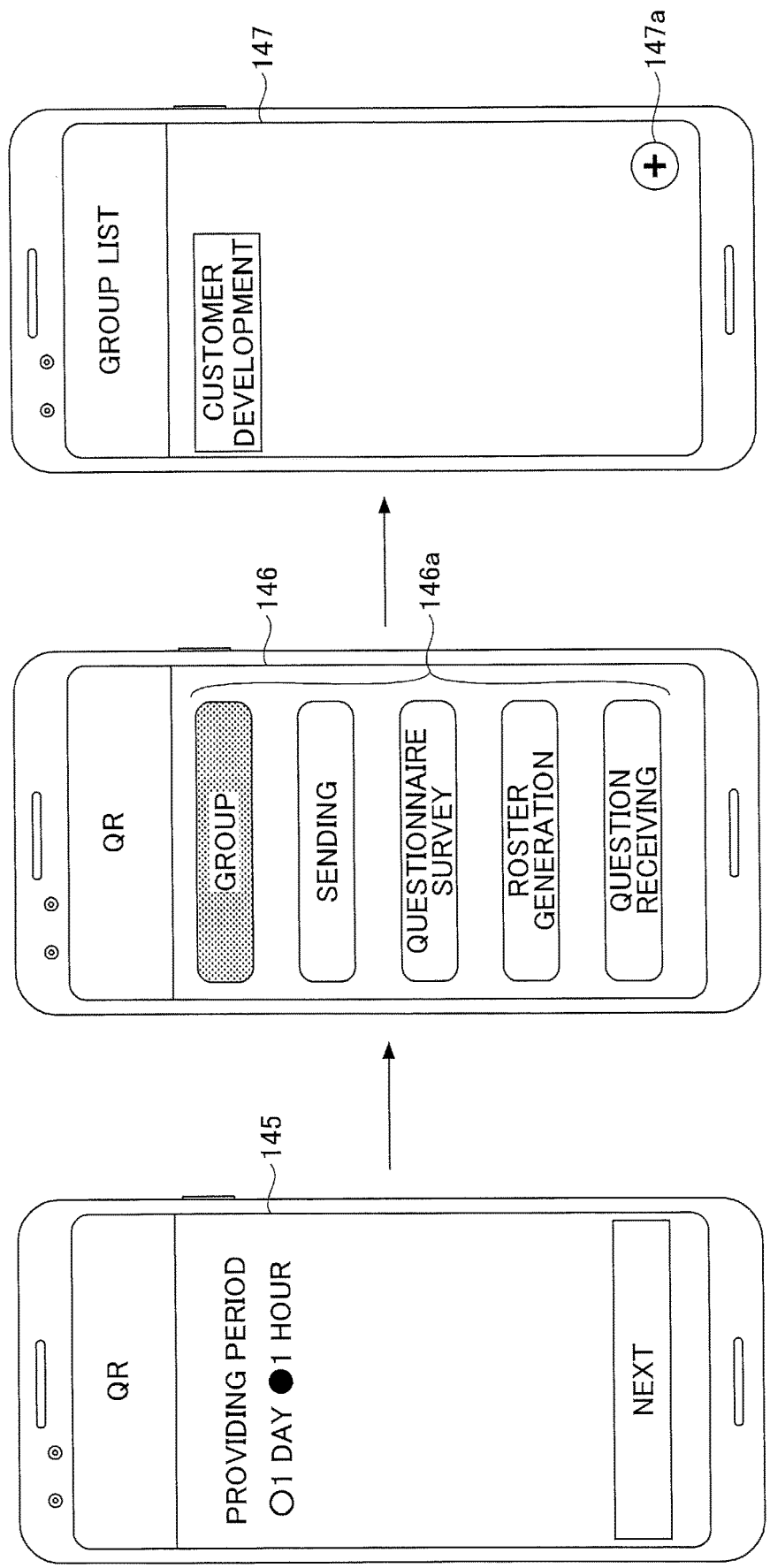
FIG. 14C is the first diagram (a third section) illustrating yet another screen transition at the teacher terminal according to the first embodiment.

Thus, the QR code is associated with the service. Screen page transitions at the teacher terminal 300 in the procedure illustrated in FIGS. 13A, 13B, and 13C will now be described with reference to FIGS. 14A, 14B, and 14C. FIG. 14A is a first diagram (a first section) illustrating a screen page transition at the teacher terminal according to the first embodiment. FIG. 14B is the first diagram (a second section) illustrating a screen page transition at the teacher terminal according to the first embodiment. FIG. 14C is the first diagram (a third section) illustrating a screen page transition at the teacher terminal according to the first embodiment.

A screen page 141 and a screen page 142 at FIG. 14A, a screen page 143 and a screen page 144 at FIG. 14B, and a screen page 145, a screen page 146, and a screen page 147 at FIG. 14C are displayed on the display 318 of the teacher terminal 300 according to the present embodiment.

The screen page 141 is an example of a selecting screen page displayed in step S1308 of FIG. 13A, and a button 141a for selecting a method of logging in and using the information processing system 100, and a button 141b for selecting a method of using the information processing system 100 as a guest are displayed. Further, although the read QR code is displayed in the screen page 141, the QR code may be omitted from being displayed.

The screen page 141 is changed to the screen page 142 when the button 141a is operated. The screen page 142 is an example of a login screen page displayed in step S1310 of FIG. 13B, and an input field for account information (user ID and password) is displayed. When account information is input and an operation to request a login is performed, the screen page 142 is changed to the screen page 143 or the screen page 144 illustrated in FIG. 14B.

The screen page 143 is an example of a screen page displayed when a QR code is not associated with a service in step S1316 of FIG. 13B. The message 143a indicating that the QR code is not associated with a service and a button 143b for the user to input an instruction to associate the QR code with a service are displayed in the screen page 143.

The screen page 144 is an example of a screen page displayed when the QR code is associated with a service in step S1316 of FIG. 13B. A message 143a indicating that the QR code is associated with a service and a button 144*b* for selecting whether or not to use the associated service are displayed in the screen page 144.

When the button 143*b* is operated, the screen page 143 is changed to the screen page 145 illustrated in FIG. 14C. The screen page 145 is an example of a screen page displayed in step S1318 of FIG. 13C. The screen page 145 includes choices for a period for which the QR code is to be provided.

In the example of FIG. 14C, "1 hour" has been selected as the QR code providing period. Accordingly, in this case, only the terminal apparatus that has read the QR code within one hour can use the service associated with this QR code.

When the providing period is thus set, the screen page 145 is changed to the screen page 146. The screen page 146 is an example of a screen page displayed in step S1323 of FIG. 13C. A providing period means a validity period during which a QR code is a valid two-dimensional code for being associated with a service.

In the screen page 146, a list 146*a* of names of sub-applications that can be associated with the QR code and that are permitted to be used by the logged-in user is displayed.

When a sub-application is selected from the list 146*a*, the screen page 146 is changed to the screen page 147. In the example of FIG. 14C, the sub-application "group" is selected and the screen page 146 is changed to the screen page 147.

The screen page 147 displays a list of names of groups created by the logged-in user. Further, a button 147*a* for initiating a procedure to create a new group is displayed in the screen page 147.

When the button 147*a* is operated at the screen page 147, the teacher terminal 300 comes to display a screen page for creating a new group.

Figure 15A:
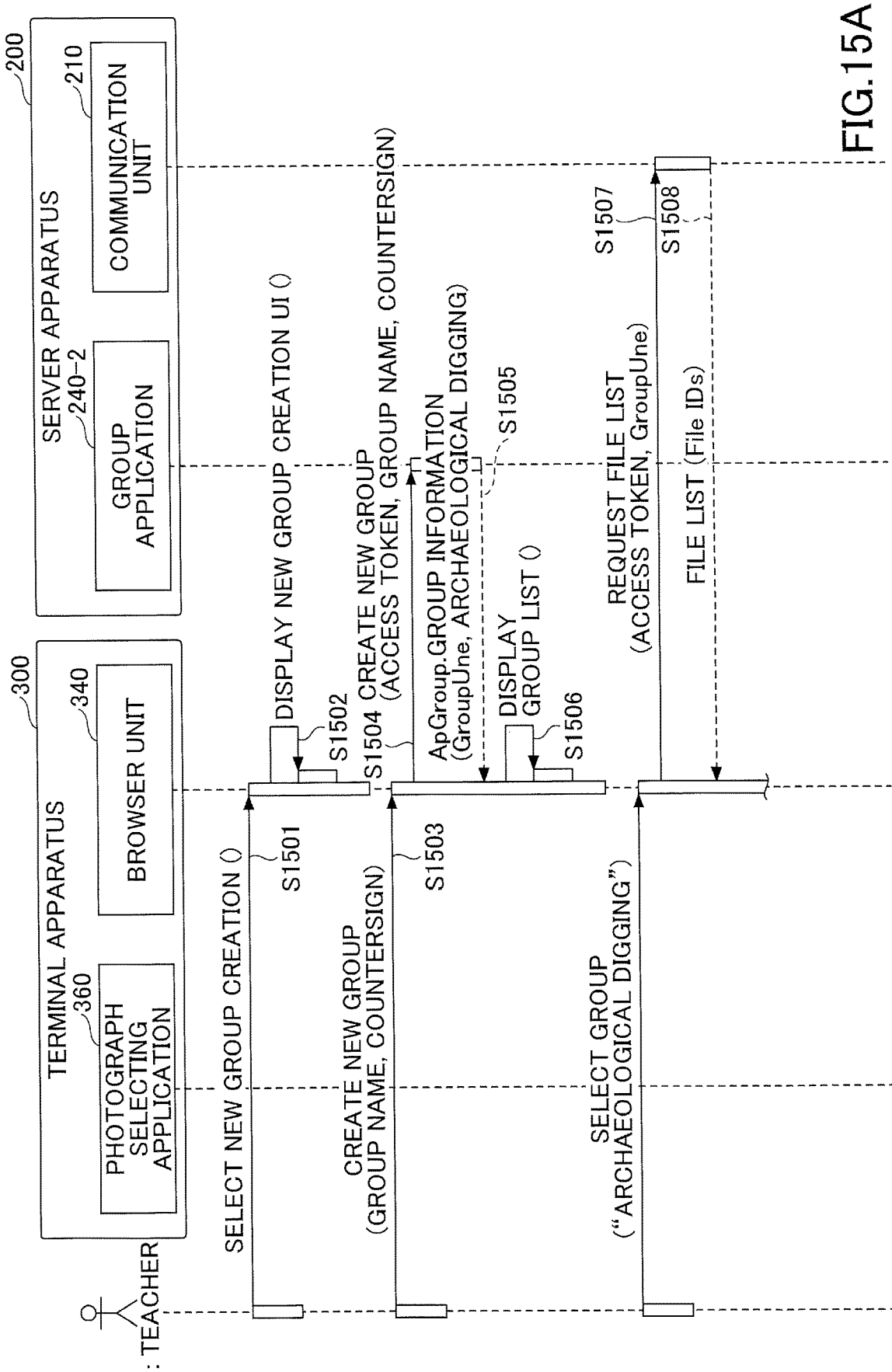
FIG. 15A is a second sequence diagram (a first section) illustrating an operation of the information processing system according to the first embodiment.

Next, a procedure for creating a group will be described with reference to FIGS. 15A and 15B. FIG. 15A is a second sequence diagram (a first section) illustrating an operation of the information processing system according to the first embodiment. FIG. 15B is the second sequence diagram (a second section) illustrating an operation of the information processing system according to the first embodiment.

In FIG. 15A, in step S1502, the teacher terminal 300 in the information processing system 100 displays a screen page for creating a new group when the button 147*a* is operated at the screen page 147 in step S1501.

Subsequently, when information concerning a new group is input (step S1503), the browser unit 340 transmits this information and the access token to the group application 240-2 in step S1504.

The information concerning the new group is a group name, a countersign, and so forth, and is a part of a set of group information to be stored in the group information storage unit 267.

In step S1505, the group application 240-2 attaches a group ID to the information concerning the new group to form the set of group information, and stores the set of group information in the group information storage unit 267, and transmits the set of group information to the browser unit 340.

More specifically, the group application 240-2 generates a group ID that is unique with respect to the other groups, and associates the group name, the countersign, and the user ID included in the access token together to form the set of group information.

According to the present embodiment, a creation of a group may be permitted only to a user for whom account information is stored in the user information storage unit 263. In this case, whether to permit the user to create a group may be determined from determining whether the group information storage unit 267 includes the user ID included in the access token transmitted from the browser unit 340 in step S1503.

In step S1506, when the set of group information is received, the browser unit 340 adds the newly created group name to the list of group names and displays the list of group names.

Next, in step S1507, in response to receiving the user's selection of a group, the browser unit 340 transmits the access token and a request for obtaining a list of document image data stored in the storage location corresponding to the selected group name to the communication unit 210 of the server apparatus 200.

In step S1508, the communication unit 210 transmits a list of file IDs of document image data for accessing the storage location corresponding to the selected group name to the browser unit 340.

Subsequently, in FIG. 15B, the browser unit 340 displays a screen page explaining a procedure to add document image data when document image data is not stored in the storage location (step S1509). A case where document image data is not stored is a case where the group is created newly.

In step S1510, the browser unit 340 displays a thumbnail list screen page of the stored document image data when the document image data is stored in the storage location.

In step S1511, the browser unit 340 receives an operation to instruct an addition of document image data. For example, it is now be assumed that an instruction to add a photograph is input.

In response to the instruction, in step S1512, the browser unit 340 invokes a photograph selecting application 360 installed in the teacher terminal 300. The photograph selecting application 360 displays a list of photographs (step S1513).

Subsequently, in step S1514, in response to receiving the user's selection of a photograph, the photograph selecting application 360 is switched to the browser unit 340 that has invoked the photograph selecting application 360, and notifies the browser unit 340 of document image data that is the selected photograph (step S1515).

In step S1516, the browser unit 340 transmits a upload request with respect to the document image data of the selected photograph to the communication unit 210 of the server apparatus 200 together with the access token and the group ID.

In the server apparatus 200, in step S1517, the communication unit 210 stores the document image data in the storage location corresponding to the group ID and transmits a corresponding file ID to the browser unit 340. This allows the newly added photograph that is the document image data to be shared by the users included in the group. In other words, according to the present embodiment, the document image data is stored at the storage location associated with the group application 240-2, so that the document image data is shared by the users within the group.

That is, the group application 240-2 according to the present embodiment functions as a sharing unit causing a terminal apparatus which reads the two-dimensional code including the registered ID "Tag_QR01" to share information with another terminal apparatus that reads the registered ID "Tag_QR01".

In other words, when a registered ID is associated with the group application 240-2 by the QR application 240-1, the group application 240-2 associates one or more terminal apparatuses 300 each of which transmits the registered ID to the server apparatus 200 with the same group. The group application 240-2 provides a sharing service that enables information to be shared by one or more terminal apparatuses associated with the same group.

In step S1518, the browser unit 340 obtains a thumbnail image of the added document image data based on the received file ID and displays the thumbnail image.

Thus, the new group is created. Hereinafter, screen page transitions at the teacher terminal 300 in the procedure illustrated in FIGS. 15A and 15B will be described with reference to FIGS. 16A and 16B. FIG. 16A is a second diagram (a first section) illustrating a screen page transition at the teacher terminal according to the first embodiment. FIG. 16B is the second diagram (a second section) illustrating a screen page transition at the teacher terminal according to the first embodiment.

The display 318 of the teacher terminal 300 displays a screen page 161, a screen page 162, and a screen page 163 illustrated in FIG. 16A, and a screen page 164 and a screen page 165 illustrated in FIG. 16B.

The screen page 161 is an example of a screen page displayed in step S1502 of FIG. 15A, and an input field 161a for information concerning a new group is displayed. In the present embodiment, a countersign is input. However, a countersign need not be included in group information. Instead of a countersign, a common password or the like may be used.

When a group name and a countersign are input to the input field, the screen page 161 is changed to the screen page 162. The screen page 162 is an example of a screen page displayed in step S1506 of FIG. 15.

The list of group names 162a is displayed in the screen page 162. In the screen page 162, "archaeological digging" is added as a newly added group name. In the screen page 162, a previously created group name and a newly input group name are displayed in different manners. Specifically, for example, a newly input group name is displayed in a different color from the other group names, or a mark is provided in the vicinity of a newly input group name.

In the example illustrated in FIG. 16A, the group name "archaeological digging" is provided with a mark in the vicinity, indicating that the group name has been newly added.

In the screen page 162, when the group name "archaeological digging" is selected from the list 162a, the screen page is changed to the screen page 163. The screen page 163 is an example of a screen page displayed in step S1508 of FIG. 15A.

In the screen page 163, a message 163a indicating how to add a photograph, a button 163b for the user to input an instruction to add a photograph, and a button 163c for canceling the association between the QR code and the group application 240-2 are displayed. When the button 163b is operated, the screen page 163 is changed to the screen page 164 illustrated in FIG. 16B. When the button 163c is operated at the screen page 163, the relationship between the group application 240-2 and the QR code is canceled.

Thus, the user of the teacher terminal 300 may operate the button 163c, for example, when the number of participants in the group reaches a fixed number or when the user does not want to increase the number of participants of the group. Thus, according to the present embodiment, provision of a service with respect to a QR code can be stopped before the set providing period for the QR code has elapsed.

The screen page 164 illustrated in FIG. 16B is an example of a screen page displayed in step S1512 of FIG. 15B.

The screen page 164 displays a list of photographs stored in the teacher terminal 300. When a photograph is selected from the list, the screen page 164 is changed to the screen page 165.

The screen page 165 is an example of a screen page displayed in step S1516 of FIG. 15B. In the screen page 165, a thumbnail image of the newly added photograph is displayed. In addition, in the screen page 165, the name of the user who has added the document image data corresponding to the thumbnail image and a mark indicating that the document image data corresponding to the thumbnail image has been newly added are provided to the vicinity of the thumbnail image.

Thus, the teacher terminal 300 according to the present embodiment can create a new group or add document image data.

Figure 17A:
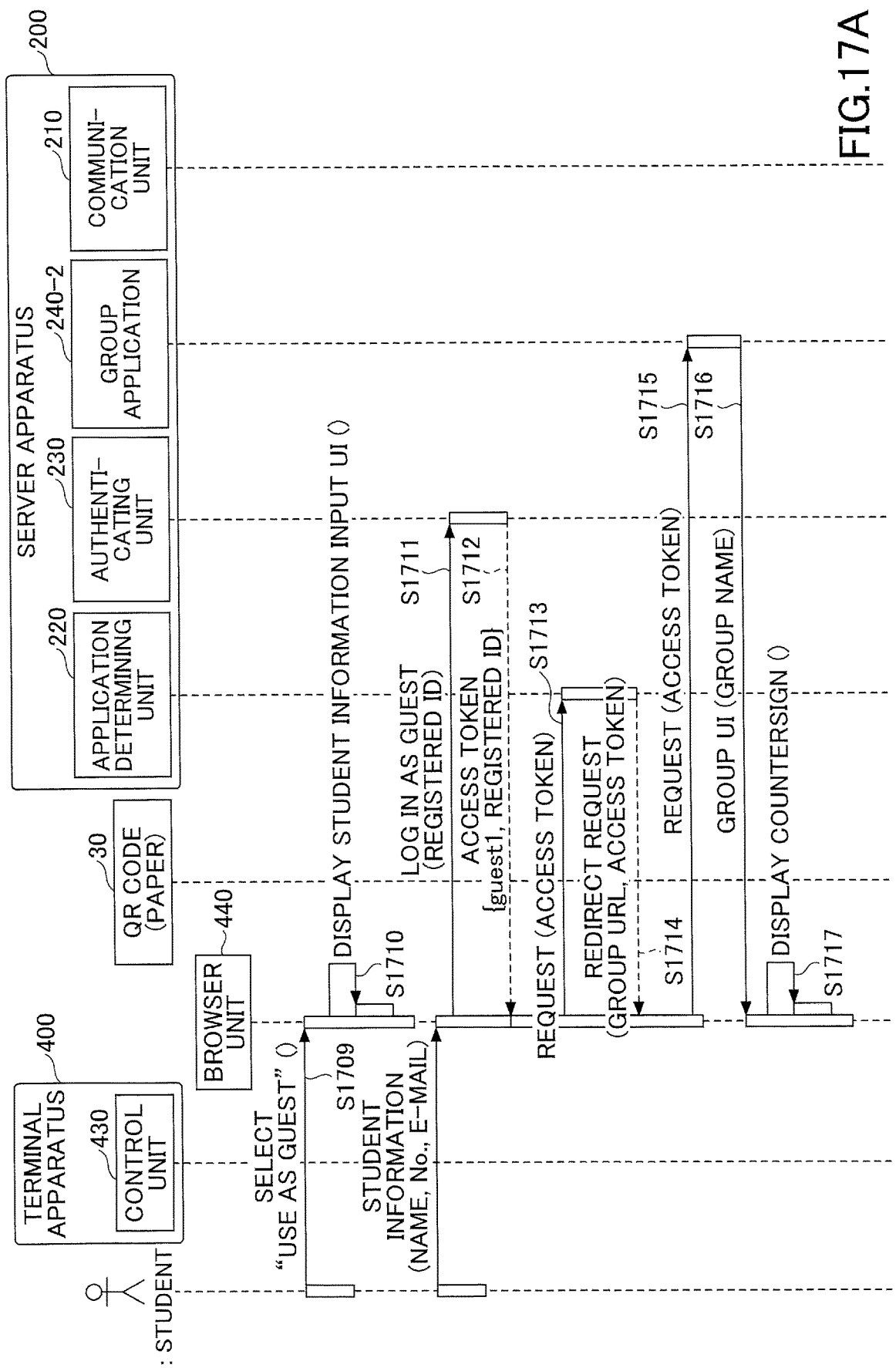
FIG. 17A is a third sequence diagram (a first section) illustrating an operation of the information processing system according to the first embodiment.
Figure 17B:
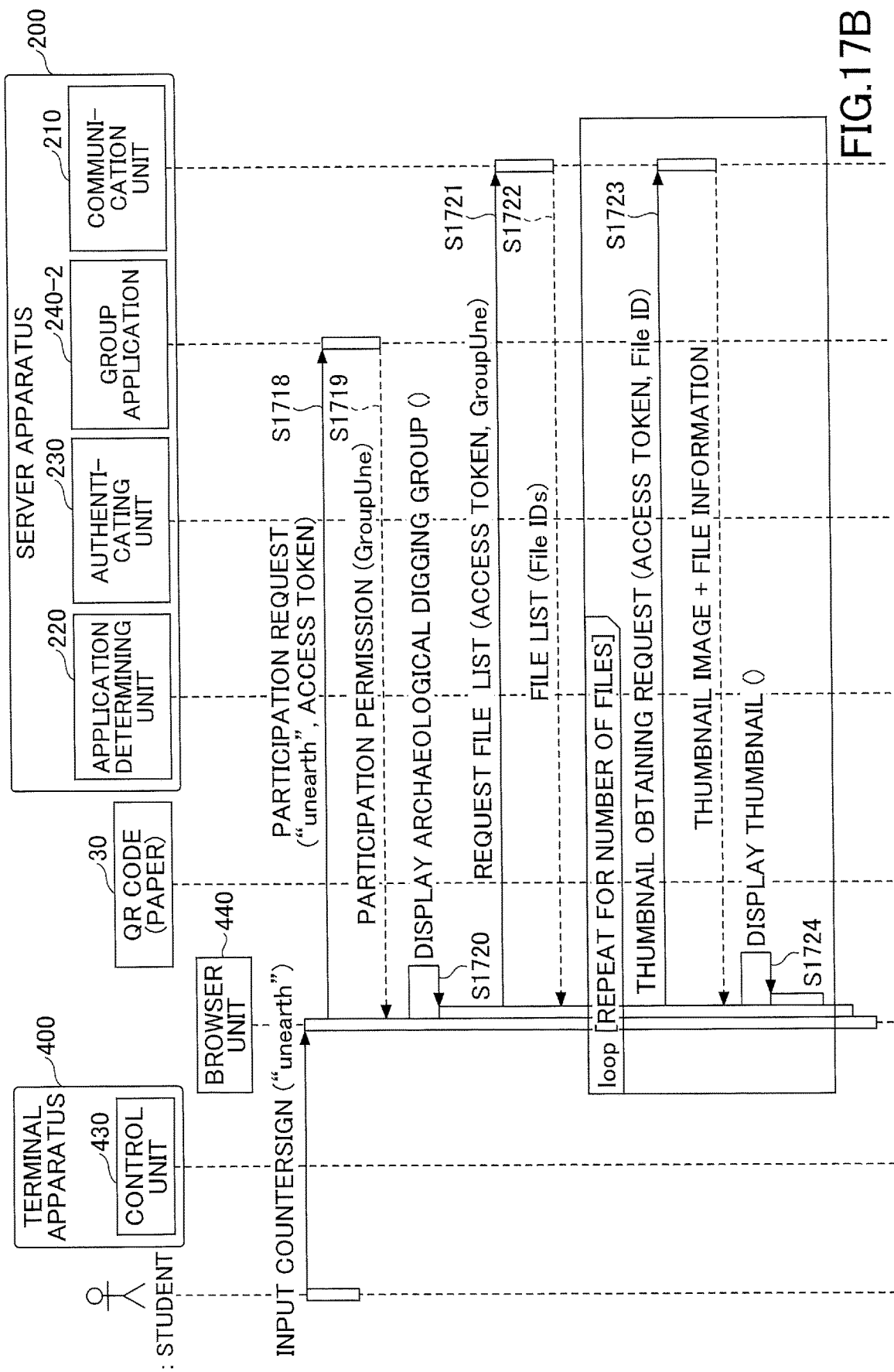
FIG. 17B is the third sequence diagram (a second section) illustrating an operation of the information processing system according to the first embodiment.

Referring now to FIGS. 17A and 17B, a procedure in which the student terminal 400 participates in a group will be described. FIG. 17A is a third sequence diagram (a first section) illustrating an operation of the information processing system according to the first embodiment. FIG. 17B is the third sequence diagram (a second section) illustrating an operation of the information processing system according to the first embodiment.

Step S1709 of FIG. 17A is a process that follows step S1308 of FIG. 13A. That is, in the procedure in which the student terminal 400 participates in a group, steps S1301-S1308 of FIG. 13A are executed, and then the process proceeds to step S1709.

In FIG. 17A, in the selecting screen page displayed in step S1308, a method of using the information processing system 100 as a guest is selected.

The browser unit 440 of the student terminal 400 receives the user's selection of usage as a guest (step S1709) and then displays an input screen page for student information in step S1710. The student information of the present embodiment includes a name, a student number, an e-mail address, etc.

In step S1711, the browser unit 440 of the student terminal 400 receives the user's input of student information and then transmits a guest login request to the authenticating unit 230 of the server apparatus 200.

In step S1712, the authenticating unit 230 of the server apparatus 200 creates user information where a value of the item "name" is "guest 1", creates an access token for accessing the user information, and transmits the access token to the browser unit 440. The access token includes the registered ID, which is an argument of the guest's login request. The access token is then stored in the browser unit 440.

Subsequently, in step S1713, the browser unit 440 transmits a connection request to the application determining unit 220 together with the access token.

In step S1714, the application determining unit 220 sends a redirect request to the group application 240-2 for implementing a service associated with the registered ID included in the access token. Specifically, the application determining unit 220 reads the associated application information storage unit 265, identifies the group application 240-2 associated with the registered ID "Tag_QR01", and sends the redirect request.

In step S1715, the browser unit 440 receives the redirect request from the application determining unit 220 and transmits a redirect request together with the access token to the group application 240-2.

In step S1716, the group application 240-2 reads the associated application information storage unit 265 and the group information storage unit 267, obtains the group name associated with the sub-application ID of the group application 240-2, and transmits the group name to the browser unit 440.

In step S1717, the browser unit 440 displays an invitation screen page including the group name and an input field for a countersign.

Subsequently, in step S1718, the browser unit 440 receives the user's input of a countersign and transmits a request for participation in the group to the group application 240-2 together with the input countersign and the access token.

The group application 240-2 reads the group information storage unit 267 and determines whether the input countersign is the same as the countersign corresponding to the group ID. When the input countersign is the same as the countersign corresponding to the group ID, then, in step S1719, the group application 240-2 stores the user ID included in the access token in the group information storage unit 267, associates the stored user ID with the group ID, and transmits an access token, permitting participation in the group, and the group ID to the browser unit 440.

In the present embodiment, the fact that the group ID is associated with the user ID (the user information) obtained from the student terminal 400 in the group information storage unit 267 means that the user of the student terminal 400 participates in the group. In other words, the student terminal 400 comes to be able to access the storage location corresponding to the group ID, and thus, sharing of information starts.

In step S1721, the browser unit 440 displays a screen page of the archaeological digging group in response to the participation being permitted, and transmits a request for obtaining the file list with respect to the archaeological digging group together with the access token and the group ID to the communication unit 210 of the server apparatus 200.

In step S1722, the communication unit 210 transmits the list of file IDs of document image data, for accessing the storage location corresponding to the group name "archaeological digging" in the group information storage unit 267, to the browser unit 440.

In step S1723, the browser unit 440 requests the communication unit 210 to send a thumbnail for each file on the basis of the obtained information of the list of file IDs, and, obtains from the communication unit 210 thumbnail image data and file information associated with the thumbnail image data. In this regard, the user IDs associated with the thumbnail image data may be obtained as the file information.

Subsequently, in step S1724, the browser unit 440 displays a list of thumbnail images based on the obtained thumbnail image data.

Thus, the student terminal 400 participates in the group. Screen page transitions at the student terminal 400 in the procedure illustrated in FIGS. 17A and 17B will now be described with reference to FIGS. 18A and 18B. FIG. 18A is a first diagram illustrating a screen page transition at the student terminal according to the first embodiment. FIG. 18B is a second diagram illustrating the screen page transition at the student terminal according to the first embodiment.

A screen page 181, a screen page 182, and a screen page 183 illustrated in FIG. 18A, and a screen page 184 and a screen page 185 illustrated in FIG. 18B are displayed on the display of the student terminal 400.

The screen page 141 is an example of a screen page displayed in step S1308 of FIG. 13A. When a button 141b is operated, the screen page 141 is changed to the screen page 182. The screen page 182 is an example of a login screen page displayed in step S1710 of FIG. 17A, and an input field for student information is displayed. The screen page 182 is changed to the screen page 183 when student information is input and a login request is input by the user.

The screen page 183 is an example of an invitation screen page displayed in step S1717 of FIG. 17A. The screen page 183 displays a countersign input field 183a and a button 183b for requesting participation in the group. When a countersign is input by the user to the input field 183a, the button 183b is operated, and the input countersign is the same as the countersign stored in the group information storage unit 267, the screen page 183 is changed to the screen page 184 illustrated in FIG. 18B.

In FIG. 18B, the screen page 184 is an example of a screen page displayed in step S1720 of FIG. 17B. In the screen page 184, the list of thumbnail images of images (photographs) indicated by the document image data stored in the storage location corresponding to the group name "archaeological digging" is displayed. When the button 184a is operated, the screen page 184 is changed to the screen page 185. The screen page 185 is the same screen page as the screen page 164 of FIG. 16B. The screen page is for the user to select, from the document image data stored in the student terminal 400, document image data to be uploaded to the storage location corresponding to the group name "archeological digging".

As described above, according to the present embodiment, a service can be associated with a two-dimensional code. Further, according to the present embodiment, information can be shared by a plurality of terminal apparatuses from simply reading of a two-dimensional code. Accordingly, according to the present embodiment, prior preparations for sharing information are not required, and information can be easily shared by a plurality of terminal apparatuses.

In the present embodiment, the group is created by the user (the teacher) of the teacher terminal 300, but an embodiment is not limited to such a manner. Instead, a group may be created by the student who is the user of the student terminal 400.

For example, the present embodiment may be applied to a lesson where students form groups and make presentations on a group-by-group basis. In that case, if a two-dimensional code is prepared for each group, the students in each group can share information within the group by simply reading the two-dimensional code 25 with respect to the group from their student terminals 400.

Second Embodiment

A second embodiment will be described below with reference to the drawings. The second embodiment differs from the first embodiment in that a service is newly associated with a two-dimensional code that is already associated with another service. The following description of the second embodiment describes the differences between the first embodiment and the second embodiment. For the elements having the functional configurations similar to the functional configurations of the first embodiment, the same reference numerals as the reference numerals used for the first embodiment are used, and the duplicate description is omitted.

Figure 19:
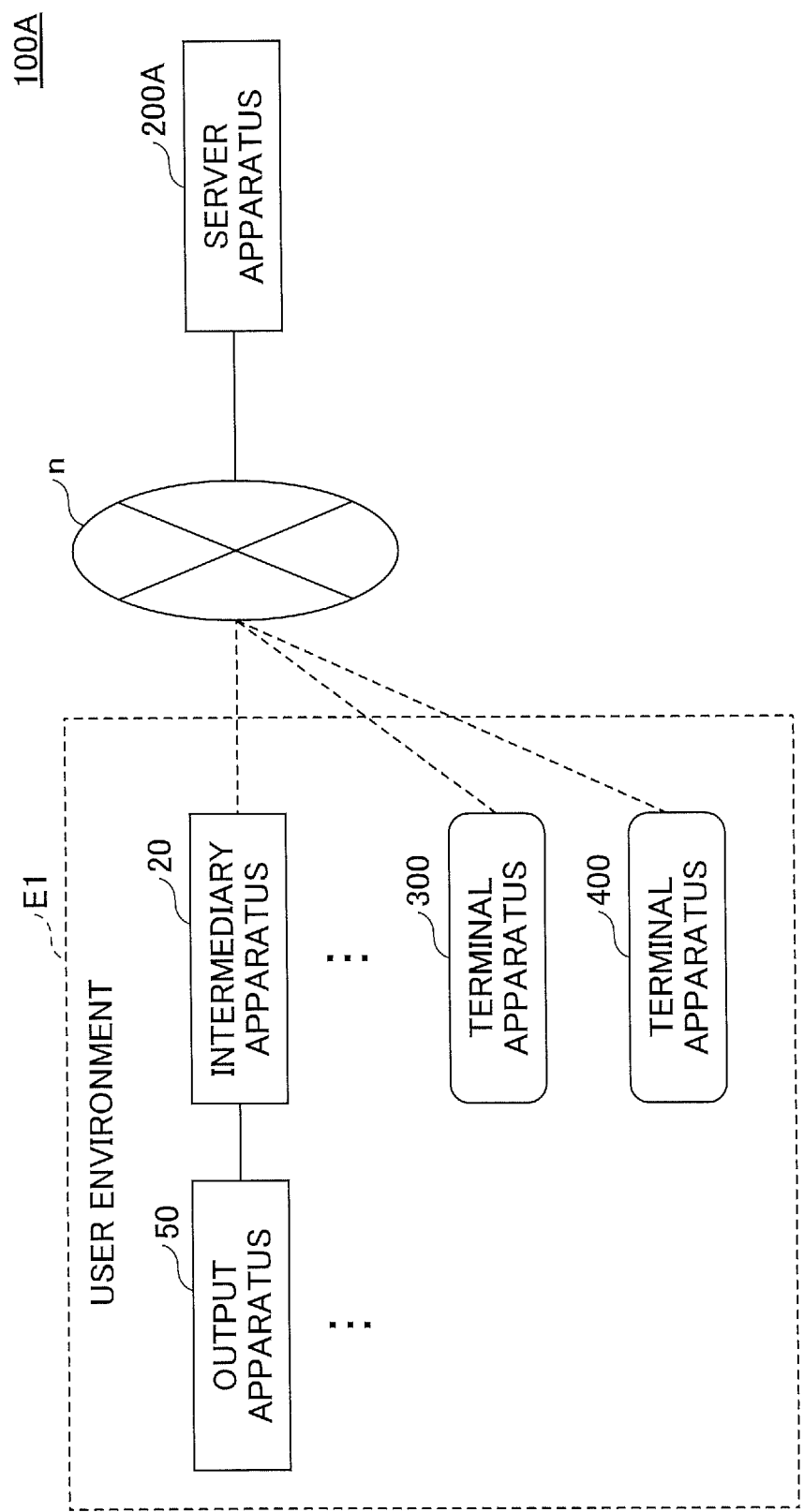
FIG. 19 is a diagram illustrating an example of a configuration of an information processing system according to a second embodiment.

FIG. 19 is a diagram illustrating an example of a configuration of an information processing system according to the second embodiment. In the information processing system 100A according to the present embodiment, a server apparatus 200A and a user environment E1 are capable of communicating via a wide-area network n, such as the Internet.

The user environment E1 is an organization, in which one or more output apparatuses 50 and one or more intermediary apparatuses 20 are installed, such as a company or a system environment in an educational institution such as a school. Each output apparatus 50 is an apparatus for displaying an input image to a display unit and may be, for example, a projector or an electronic blackboard. In the user environment E1, each output apparatus 50 is connected to a corresponding intermediary apparatus 20. That is, the output apparatuses 50 correspond to the intermediary apparatuses 20 on a one-to-one basis. The output apparatuses 50 and the intermediary apparatuses 20 are connected via interfaces conforming to standards capable of transmitting images, such as, for example, HDMI (High-Definition Multimedia Interface).

For example, the output apparatuses 50 and the intermediary apparatuses 20 may be connected by cables corresponding to the interfaces (e.g., HDMI (registered trademark) cables, etc.). Alternatively, connectors corresponding to the interfaces provided by the intermediary apparatuses 20 and connectors corresponding to the interfaces provided by the output apparatuses 50 may be directly connected.

For example, the intermediary apparatuses 20 may be inserted into the connectors of the output apparatuses 50 to connect together. Alternatively, the intermediary apparatuses 20 and the output apparatuses 50 may be wirelessly connected or connected via a network.

When the output apparatuses 50 and the intermediary apparatuses 20 are connected as described above, the intermediary apparatuses 20 can transmit images to be displayed to the output apparatuses 50.

The intermediary apparatuses 20 are connected to the network n through a LAN or the like in the user environment E1. The intermediary apparatuses 20 may be wirelessly connected to a LAN or the like in the user environment E1. Each of the intermediary apparatuses 20 includes a web browser therein and performs a process according to a request for executing a process with respect to image data or document data transmitted from the server apparatus 200A though the web browser to control the corresponding output apparatus 50 (outputting an execution result of the process to the corresponding output apparatus 50).

Specifically, according to the present embodiment, each intermediary apparatus 20 performs an output (display) of image data, document data or the like through the corresponding output apparatus 50. That is, each intermediary apparatus 20 relays a process of outputting (displaying) an image to the corresponding output apparatus 50 with respect to data transmitted from the server apparatus 200A. For example, a computer such as an HDMI dongle or a stick PC may be used as each of the intermediary apparatuses 20. In the following description, data including image data or document data displayed on each of the output apparatuses 50 may be referred to as document image data.

In the present embodiment, for example, when document image data uploaded to the server apparatus 200A via the network n from the terminal apparatus 300 is designated by the terminal apparatus 300, the designated document image data may be displayed on an output apparatus 50 through an intermediary apparatus 20.

The server apparatus 200A is one or more computers that execute a process for implementing an output of document image data, designated by the terminal apparatus 300 or 400, by an output apparatus 50 through a simple operation using the terminal apparatus 300 or 400. The server apparatus 200A may be installed in the user environment E1.

Figure 20:
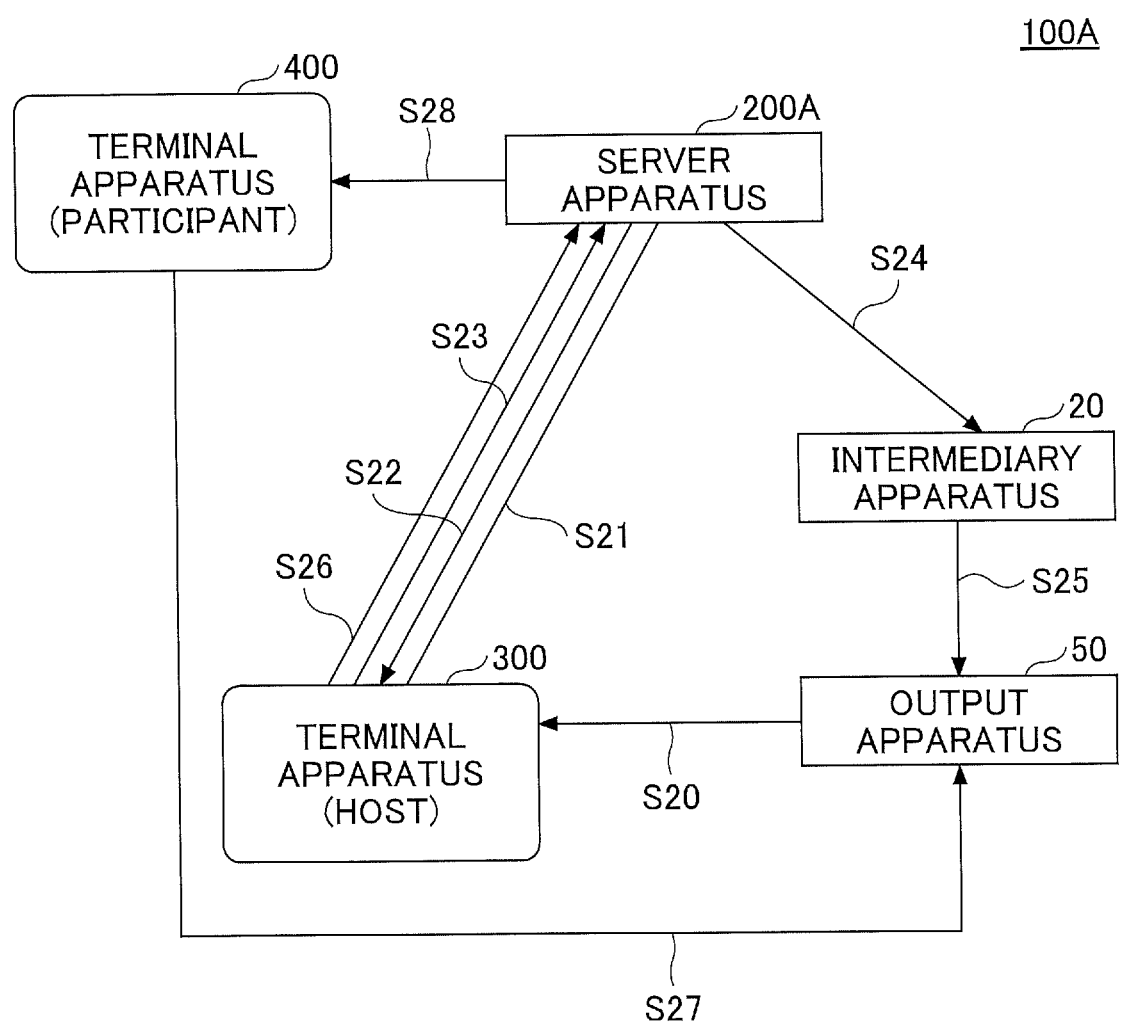
FIG. 20 is a diagram illustrating an outline of an operation of the information processing system according to the second embodiment.

FIG. 20 is a diagram illustrating an outline of an operation of the information processing system according to the second embodiment. In FIG. 20, the information processing system 100A is introduced to a conference of a company or the like, and the terminal apparatus 300 is a terminal apparatus that is mainly used as a host of the conference in which an output apparatus 50 is used for a presentation or the like. The terminal apparatus 400 is mainly a terminal apparatus used by a participant participating in the conference.

In the present embodiment, an output apparatus 50 is a display device installed in a conference room or the like of a company, and may be, for example, an electronic blackboard or a projector. In the present embodiment, the server apparatus 200A previously displays a two-dimensional code including identifying information on the output apparatus 50. The two-dimensional code is, for example, a QR code. The QR code displayed on the output apparatus 50 is read by the terminal apparatus 300 of the host who performs a presentation (step S20).

The identifying information is information used to associate the terminal apparatus 300 having accessed the server apparatus 200A with the output apparatus 50 and is generated by the server apparatus 200A.

When the terminal apparatus 300 reads the QR code, in step S21, the terminal apparatus 300 accesses the server apparatus 200A based on the URL included in the QR code, and obtains an application for performing a presentation (step S22). In the following description, an application for providing a service for performing a presentation may be referred to as a presentation application.

When the presentation application is started, the terminal apparatus 300 notifies the server apparatus 200A of the identifying information included in the QR code (step S23). In step S24, when the identifying information is thus notified, the server apparatus 200A notifies the intermediary apparatus 20 associated with the output apparatus 50 of a connection with the terminal apparatus 300 based on the identifying information.

In the present embodiment, through such a procedure, information comes to be able to be output from the terminal apparatus 300 to the output apparatus 50 through the intermediary apparatus 20. Therefore, when a document file, etc. is uploaded from the terminal apparatus 300 to the server apparatus 200A, the intermediary apparatus 20 outputs the document file, etc. to the output apparatus 50 (step S25). That is, the terminal apparatus 300 is associated with the output apparatus 50 and is in a state in which the output apparatus 50 can be used by the terminal apparatus 300. The terminal apparatus 300 is thus associated with the output apparatus 50, and therefore, when a state where a session with the server apparatus 200A is established continues, the document file can be output to the output apparatus 50 through the server apparatus 200A and the intermediary apparatus 20 without reading the QR code again.

In the present embodiment, a QR code displayed on the output apparatus 50 can be associated with an application other than a presentation application. In other words, according to the present embodiment, a service other than a service for a user to perform a presentation can be associated with a QR code displayed on the output apparatus 50.

Specifically, in step S26, when an operation is performed by the user to select a service to be associated with a QR code displayed on the output apparatus 50, the terminal apparatus 300 requests the server apparatus 200A to associate the QR code with the thus added service. The server apparatus 200A associates the new service with the QR code in response to this request.

When the terminal apparatus 400 reads the QR code with which the new service is associated (step S27), the server apparatus 200A provides the newly added service to the terminal apparatus 400 (step S28).

Thus, according to the present embodiment, a service can be newly associated with a QR code with which another service is already associated.

Figure 21A:
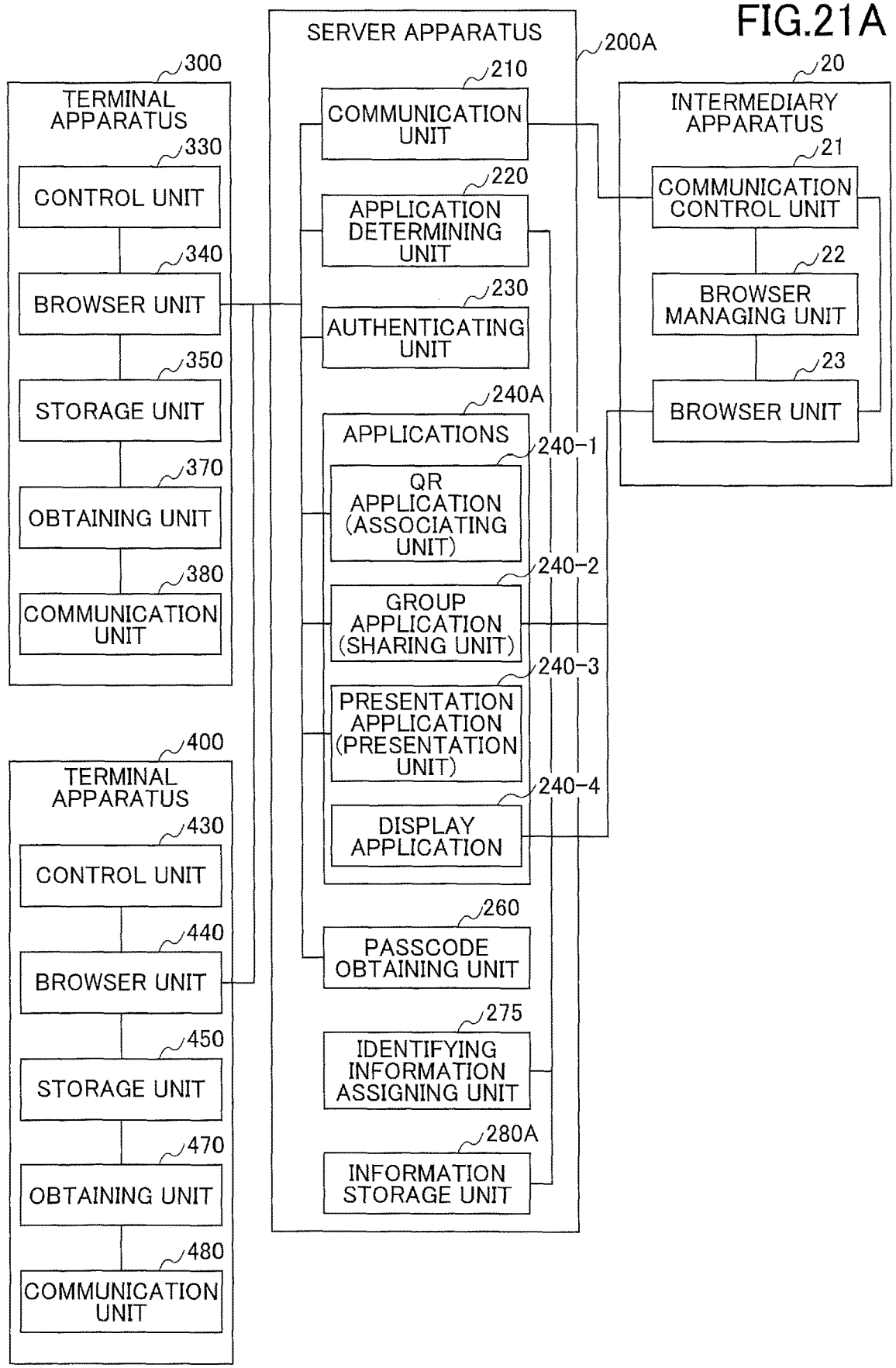
FIG. 21A is a diagram illustrating a functional configuration of each apparatus according to the second embodiment.

FIG. 21A is a diagram illustrating a functional configuration example of each apparatus according to the second embodiment. The server apparatus 200A according to the present embodiment includes a communication unit 210, an application determining unit 220, an authenticating unit 230, an application group 240A, a passcode obtaining unit 260, an identifying information assigning unit 275, and an information storage unit 280A.

The application group 240A according to the present embodiment includes, for example, a QR application 240-1, a group application 240-2, a presentation application 240-3, and a display application 240-4.

The presentation application 240-3 is an application (input application) to cause the terminal apparatus 300 or 400 to execute a process of assisting the user in performing a presentation (transmission of information).

The display application 240-4 is an application (output application) to cause the browser unit 23 of an intermediary apparatus 20 associated with the server apparatus 200A to obtain (download) document image data selected through the presentation application 240-3 and implement a rendering process with respect to the document image data. Specifically, for example, in FIG. 23, the display application 240-4 may be an application identified by an application ID "AP_PhotoShow", or the like.

When a request for a process is input by the user to the terminal apparatus 300, the passcode obtaining unit 260 accesses a URL indicating a screen page for the user to input a passcode. That is, the passcode obtaining unit 260 corresponds to a URL displaying a passcode input screen page.

The passcode obtaining unit 260 identifies a browser, to which a result of an execution of the process requested in the terminal apparatus 300 is output, based on the passcode input to the terminal apparatus 300 and an application for executing the requested process.

In other words, the passcode obtaining unit 260 according to the present embodiment is an identifying unit that obtains the passcode input to the terminal apparatus 300 and the request to execute the process associated with the passcode; and, from the passcode and the request to execute the process, identifies an intermediary apparatus 20 to be associated with the terminal apparatus 300.

The identifying information assigning unit 275 generates a passcode and causes the output apparatus 50 to display the passcode via the intermediary apparatus 20. The identifying information assigning unit 275 according to the present embodiment generates a passcode different each time to be displayed on the output apparatus 50. Details of the information storage unit 280A will be described later.

Each intermediary apparatus 20 according to the present embodiment includes a communication control unit 21, a browser managing unit 22, and a browser unit 23. Each of these units is implemented by a process performed as a result of one or more programs installed in the intermediary apparatus 20 being executed by the CPU.

The communication control unit 21 provides a two-way communication path (establishes a communication session) to the communication unit 210 of the server apparatus 200A and functions as a terminal point of the communication path (the communication session) at the side of the intermediary apparatus 20. Through communication using the communication path (the communication session), the state of the intermediary apparatus 20 can be notified to the server apparatus 200A; and the notification indicating that document image data to be displayed by the intermediary apparatus 20 on the output apparatus 50 has been input to the server apparatus 200A can be received from the server apparatus 200A. Document image data being input to the server apparatus 200A means that the document image data is uploaded to the server apparatus 200A from the terminal apparatus 300 or the terminal apparatus 400.

The browser managing unit 22 starts the browser unit 23 in a kiosk mode. The kiosk mode is a mode in which the use of the intermediary apparatus 20 is restricted to a display of a web page. The kiosk mode is only an example. As long as a mode is a mode in which a web page can be displayed, the mode other than the kiosk mode may be used.

For example, the browser unit 23 is a general web browser and performs a process according to HTML data, scripts, or the like.

The browser unit 23 accesses the initial access URL in response to being started. At this time, in the server apparatus 200, identification information (hereinafter, referred to as a "browser ID") of the browser unit 23 is attached to the initial access URL as option information.

Figure 21B:
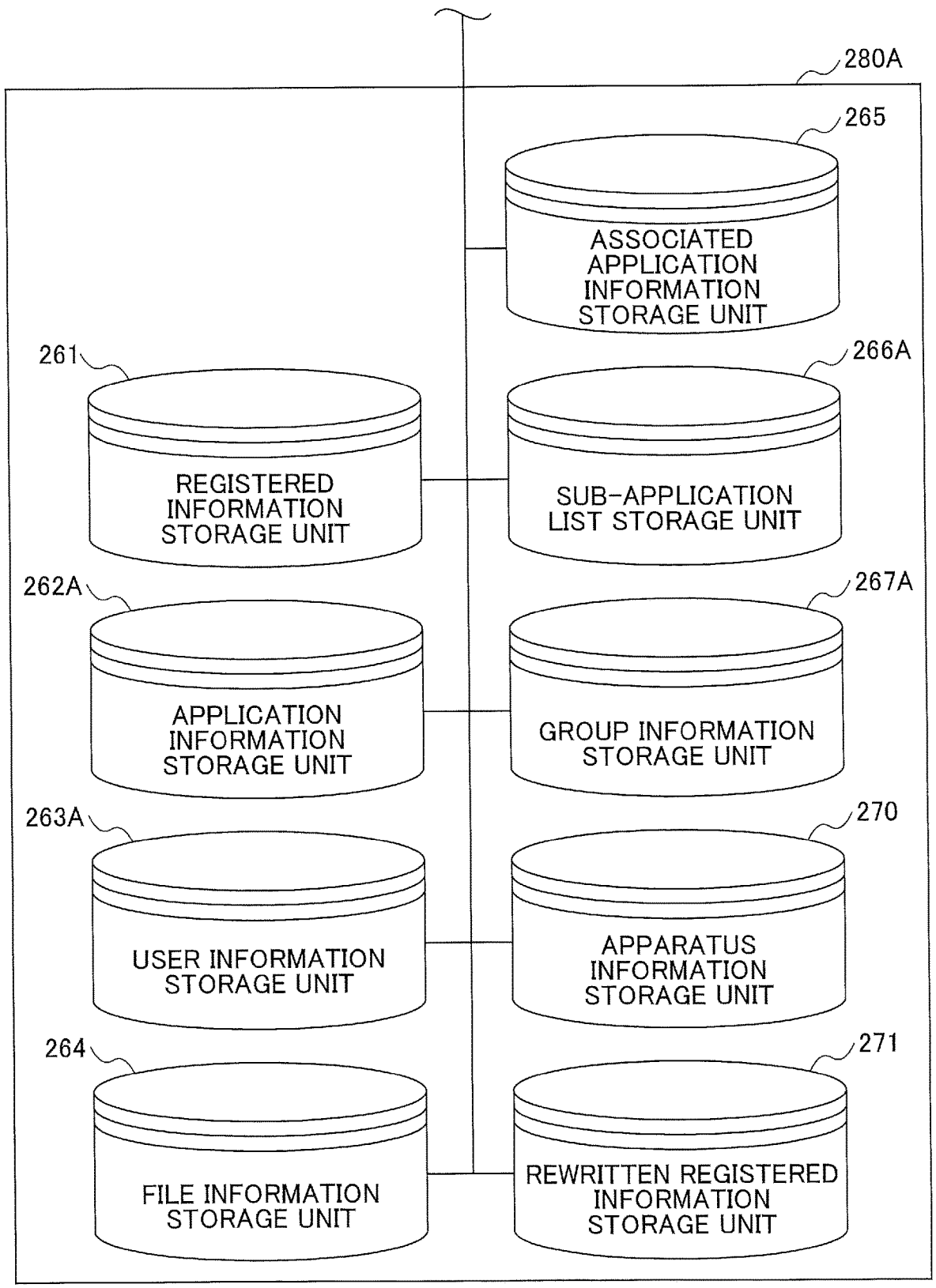
FIG. 21B is a diagram illustrating an information storage unit according to the second embodiment.

The browser unit 23 accesses the application associated with the browser ID among the applications that the server apparatus 200 has, in response to a redirect request corresponding to the access to the initial access URL. The browser unit 23 obtains, from the application, data (HTML data, scripts, or the like) of a request directed to the intermediary apparatus 20 to execute a process. Next, the information storage unit 280A will be described with reference to FIG. 21B. FIG. 21B is a diagram illustrating an information storage unit according to the second embodiment.

The information storage unit 280A of the present embodiment includes a registered information storage unit 261, an application information storage unit 262A, a user information storage unit 263A, a file information storage unit 264, an associated application information storage unit 265, a sub-application list storage unit 266A, a group information storage unit 267A, an apparatus information storage unit 270, and a rewritten registered information storage unit 271. Details of each storage unit will be described later.

Next, the information stored in storage units of the terminal apparatus 300 and the terminal apparatus 400 will be described with reference to FIG. 21C. FIG. 21C is a diagram illustrating the information stored in the storage units of the terminal apparatuses.

FIG. 21C illustrates an example of a storage unit 350 and a storage unit 450. The information stored in each of the storage unit 350 and the storage unit 450 includes a URL, an access token, and content as items.

The value of item "URL" indicates the server apparatus 200A. The value of the item "access token" indicates a registered ID and a user ID. Here, the registered ID indicates the registered ID previously embedded in a QR code displayed on the output apparatus 50. In other words, the registered ID included in the access token is an original registered ID as will be described below.

The value of the item "content" includes a user ID (user name), a passcode, and an e-mail address.

Next, each storage unit included in the information storage unit 280A of the server apparatus 200A will be described with reference to FIGS. 22-28. FIG. 22 is a diagram illustrating an example of the registered information storage unit according to the second embodiment.

The registered information stored in the registered information storage unit 261A according to the present embodiment is information that is provided before an operation of the information processing system 100A described below is performed. The registered information storage unit 261A includes, as items of information, a registered ID, an In application ID, an Out application ID, and a browser ID.

The value of the item "In application ID" is an application ID that identifies an input application that is associated with the registered ID. The value of the item "Out application ID" is an application ID that identifies an output application that is associated with the registered ID. The value of the item "browser ID" is identification information that identifies the browser unit 23 of the intermediary apparatus 20.

In the example of FIG. 22, a service identified by the registered ID "Tag_QR01" is associated with the In application ID "AP_QR" as an input application. A service identified by the registered ID "Tag_Presen" is associated with the In application ID "AP_Presen" as an input application and an Out application ID "AP_PhotoDoc" as an output application. The service identified by the registered ID "Tag_Presen" is also associated with the browser ID "BROWSER1".

FIG. 23 is a diagram illustrating an example of the application information storage unit according to the second embodiment. The application information storage unit 262A according to the present embodiment includes an application ID, an application type, a URL, and a corresponding browser as items of information, and the item "application ID" is associated with the other items.

In the present embodiment, the value of the item "corresponding browser" includes a browser ID of the browser unit 23 of the intermediary apparatus 20.

FIG. 24 is a diagram illustrating an example of the user information storage unit according to the second embodiment. The user information storage unit 263A includes a tenant ID, a user ID, a type, a name, a usable application, a usable browser, and a currently used browser as items of information.

The value of the item "usable browser" indicates a browser (the intermediary apparatus 20) that can be used by the user identified by the user ID. The value of the item "currently used browser" indicates a browser (the intermediary apparatus 20) currently used by the user identified by the user ID.

FIG. 25 is a diagram illustrating an example of the sub-application information storage unit according to the second embodiment. The sub-application list storage unit 266A according to the present embodiment has a sub-application ID, an application name, an"AP_QR", and an "AP_Presen" as items of information.

In the sub-application list storage unit 266A according to the present embodiment, sub-applications each being subordinate to an application identified by the application ID "AP_QR" and an application identified by the application ID "AP_Presen" are stored.

FIG. 26 is a diagram illustrating an example of the group information storage unit according to the second embodiment. The group information storage unit 267A according to the present embodiment includes a group ID, a group name, a countersign, a storage location, a corresponding browser, a user ID, and a participant as items of information.

The value of the item "corresponding browser" indicates identification information of the browser associated with the group ID.

FIG. 27 is a diagram illustrating an example of the apparatus information storage unit according to the second embodiment. The apparatus information storage unit 270 according to the present embodiment includes, as items of information, a tenant ID, a communication ID, address information, connection condition, a browser ID, a browser state, and a passcode.

The value of the item "communication ID" is identification information of the communication control unit 21 of each intermediary apparatus 20 disposed in the tenant identified by the tenant ID. When only one communication control unit 21 is provided by the intermediary apparatus 20, the communication ID may be identification information identifying the intermediary apparatus 20.

The value of the item "address information" is the local IP address of the intermediary apparatus 20. The value of the item "connection condition" indicates whether the communication control unit 21 identified by the communication ID is currently being connected to the server apparatus 200 (in a state in which a communication path has been established) or not being connected to the server apparatus 200 ("not connected").

The value of the item "browser ID" is identification information of the browser unit 23 corresponding to the communication control unit 21 identified by the communication ID. According to the present embodiment, the browser ID is identification information of the browser unit 23 included in the same intermediary apparatus 20 as the intermediary apparatus 20 including the communication control unit 21 identified by the communication ID.

The value of the item "browser state" is information indicating the startup state of the browser unit 23 identified by the browser ID. For example, when a target communication ID notified to the communication unit 210 is "Eg001-01", the connection condition corresponding to the communication ID in the apparatus information storage unit 270 is changed to "connected" as illustrated in FIG. 27.

The value of the item "passcode" is generated by the identifying information assigning unit 275 when a communication path with the intermediary apparatus 20 is established, and is associated with the browser ID (the intermediary apparatus 20). When there are a plurality of browser IDs associated with the communication ID, a passcode may be generated for each browser ID.

Figure 28:
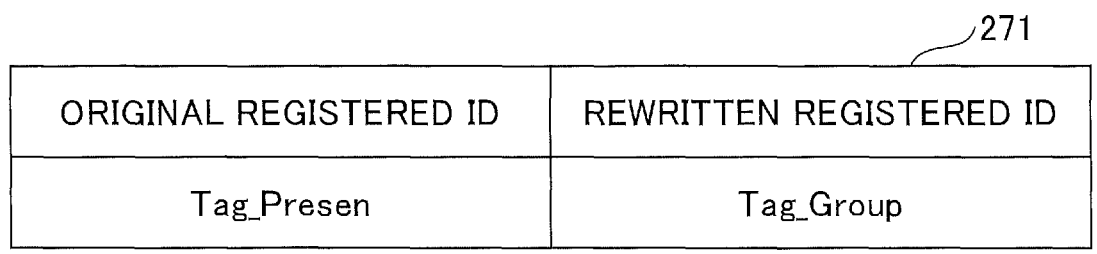
FIG. 28 is a diagram illustrating an example of a rewritten registered information storage unit according to the second embodiment.

FIG. 28 is a diagram illustrating an example of a rewritten registered information storage unit according to the second embodiment. The rewritten registered information stored in the rewritten registered information storage unit 271 according to the present embodiment is information in which a registered ID that is previously embedded in a QR code is associated with a registered ID that newly identifies a service that is associated with the QR code.

The rewritten registered information storage unit 271 according to the present embodiment has an original registered ID and a rewritten registered ID as items of information, and both are associated with each other.

The value of the item "original registered ID" indicates a registered ID previously embedded in a QR code. The value of item "rewrite registered ID" indicates a registered ID that identifies a service newly associated with the QR code.

Now, operation of the information processing system 100A according to the present embodiment will be described with reference to FIGS. 29A, 29B, 30A, 30B, and 30C.

Figure 29A:
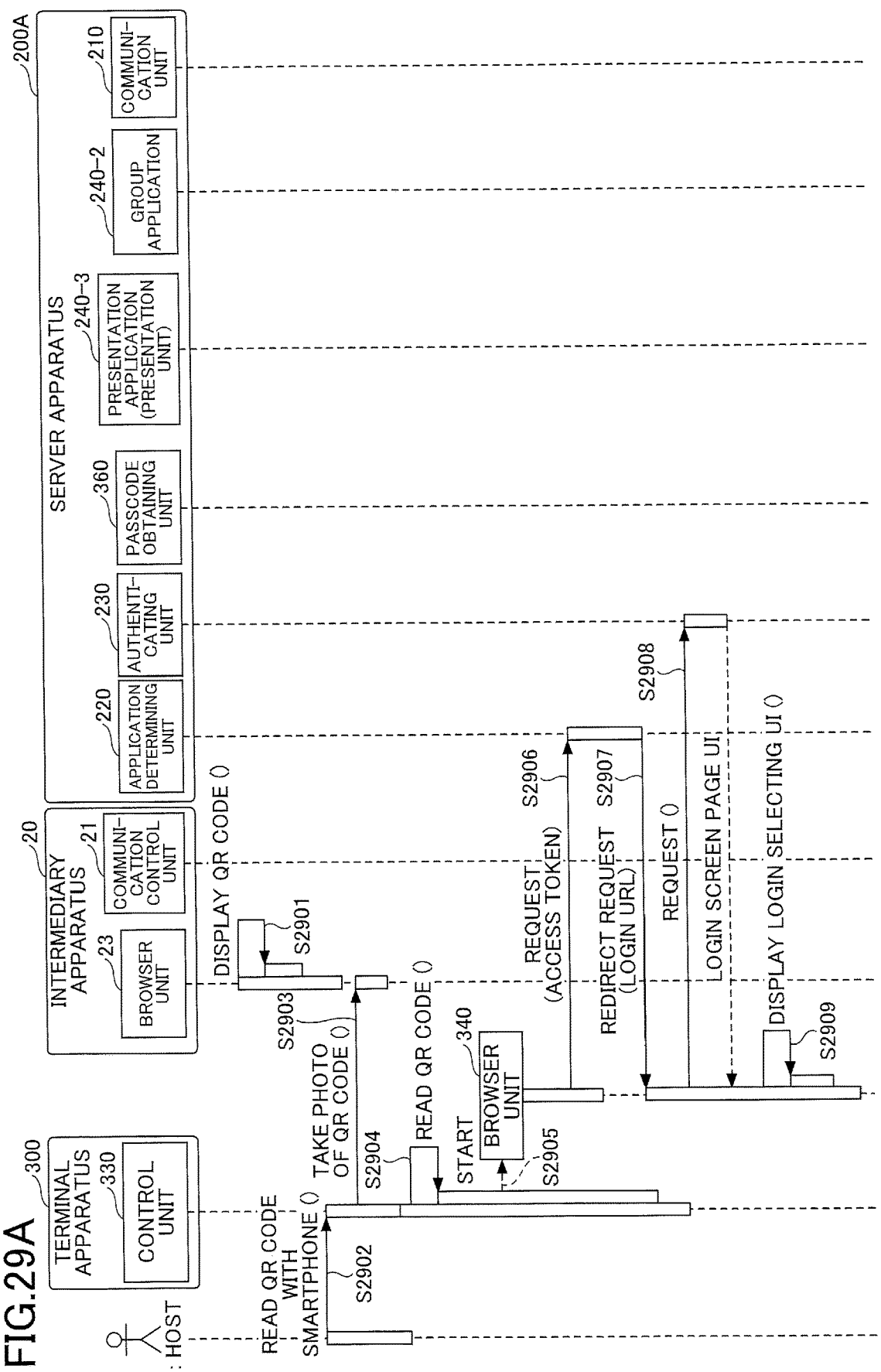
FIG. 29A is a first sequence diagram (a first section) illustrating an operation of the information processing system according to the second embodiment.
Figure 29B:
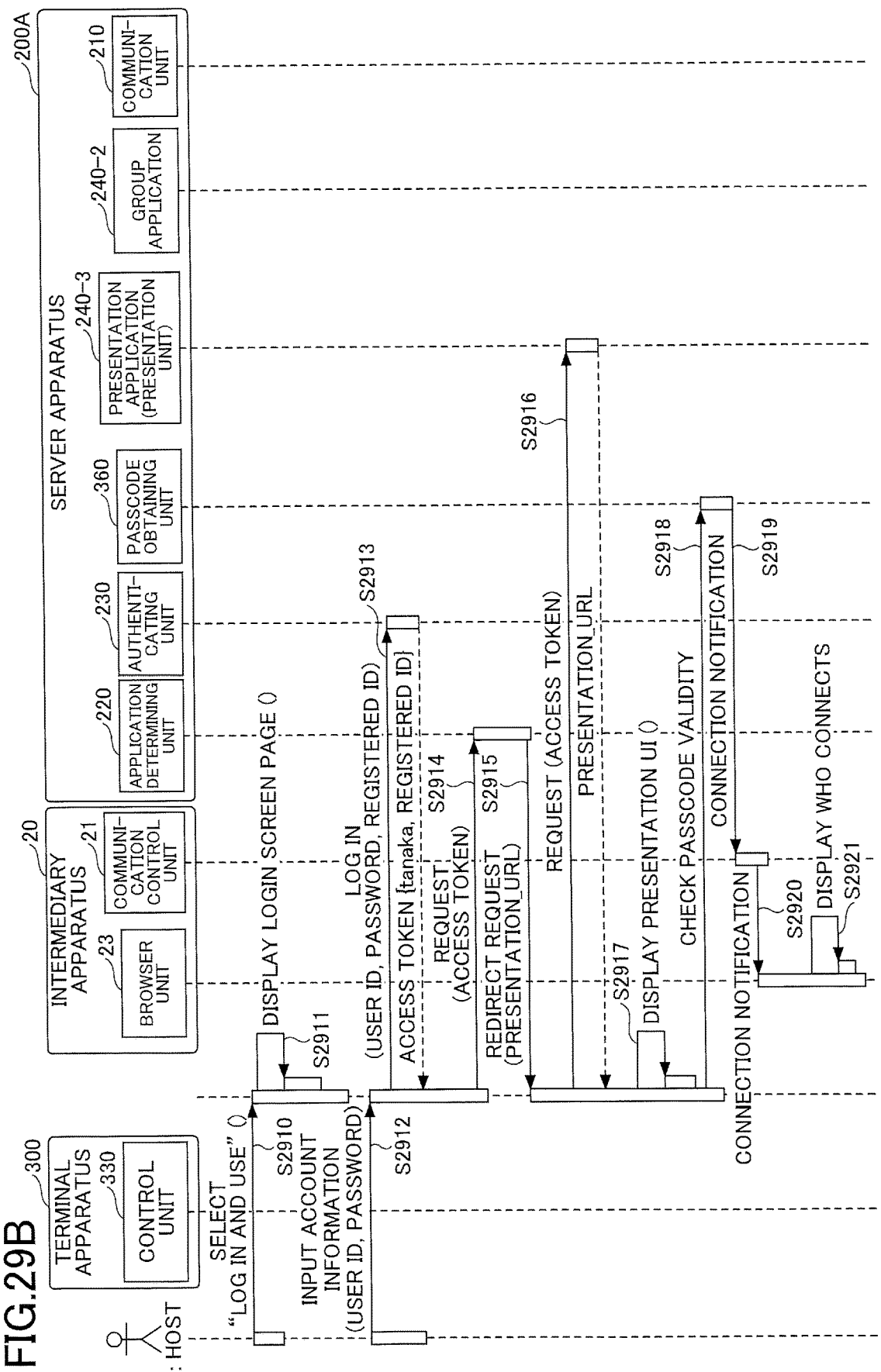
FIG. 29B is the first sequence diagram (a second section) illustrating an operation of the information processing system according to the second embodiment.

FIG. 29A is a first sequence diagram (a first section) illustrating an operation of the information processing system according to the second embodiment. FIG. 29B is the first sequence diagram (a second section) illustrating an operation of the information processing system according to the second embodiment. In FIGS. 29A and 29B, a procedure until the terminal apparatus 300 is connected with an intermediary apparatus 20 is illustrated.

In FIG. 29A, in the information processing system 100A according to the present embodiment, a QR code including a passcode assigned by the identifying information assigning unit 275 of the server apparatus 200A is displayed on an output apparatus 50 (step S2901). In the QR code, a passcode, an initial access URL, and a registered ID "Tag_Presen" associated with an application ID "AP_Presen" of the presentation application 240-3 are embedded. The application ID of the presentation application 240-3 is an example of third identification information specifying the presentation application 240-3.

The presentation application 240-3 is an input application included in the application group 240.

Accordingly, a QR code according to the present embodiment is an example of identifying information, which is generated differently for each intermediary apparatus 20, and is periodically changed.

In step S2902, when an operation for reading the QR code displayed on the output apparatus 50 is performed on the terminal apparatus 300 by the user in the information processing system 100A, the terminal apparatus 300 captures an image of the QR code (step S2903). In step S2904, the control unit 330 of the terminal apparatus 300 obtains the passcode, the initial access URL, the application ID of the presentation application 240-3, and the registered ID associated with the QR code, from the QR code.

Subsequently, in step S2905, the control unit 330 of the terminal apparatus 300 starts the browser unit 340.

Step S2906 of FIG. 29A through step S2915 of FIG. 29B are the same as step S1305 of FIG. 13A through step S1314 of FIG. 13B, except that the registered ID transmitted from the browser unit 340 in step S2913 is the registered ID of the presentation application 240-3.

In FIG. 29B, in step S2915, the browser unit 340 receives the redirect request directed to the presentation application 240-3, transmits a connection request directed to the presentation application 240-3 to the server apparatus 200, and receives the URL of the presentation application 240-3 from the server apparatus 200 (step S2916).

Subsequently, in step S2917, the browser unit 340 displays a screen page according to the URL of the presentation application 240-3.

Subsequently, the browser unit 340 determines the validity using the passcode read from the QR code. Specifically, in step S2918, the browser unit 340 transmits the access token stored in the storage unit 350 and the passcode obtained in step S2904 to the passcode obtaining unit 260 of the server apparatus 200A.

The passcode obtaining unit 260 identifies the browser ID corresponding to the registered ID "Tag_Presen" included in the access token by reading the registered information storage unit 261A, and identifies the browser ID corresponding to the passcode by reading the apparatus information storage unit 270 (see FIGS. 22 and 27). When the identified passcode is the same as the passcode received from the browser unit 340, the passcode obtaining unit 260 determines that the passcode is valid and transmits a connection notification to the communication control unit 21 of the intermediary apparatus 20, in step S2919.

The connection notification includes the browser ID associated with the passcode in the apparatus information storage unit 270 and the account information. Further, in the present embodiment, because the passcode is periodically changed, the passcode is determined as valid only for the terminal apparatus 300 which read the QR code from the output apparatus 50 within a certain period of time.

In step S2921, the communication control unit 21 receives the connection notification and then notifies the browser unit 23 of the account information. In step S2921, the browser unit 23 displays the account information of the person who requested the connection to the intermediary apparatus 20 on the output apparatus 50.

Thus, the terminal apparatus 300 and the intermediary apparatus 20 are connected together. Next, a procedure of associating a new service with a QR code will be described with reference to FIGS. 30A, 30B, and 30C.

Figure 30B:
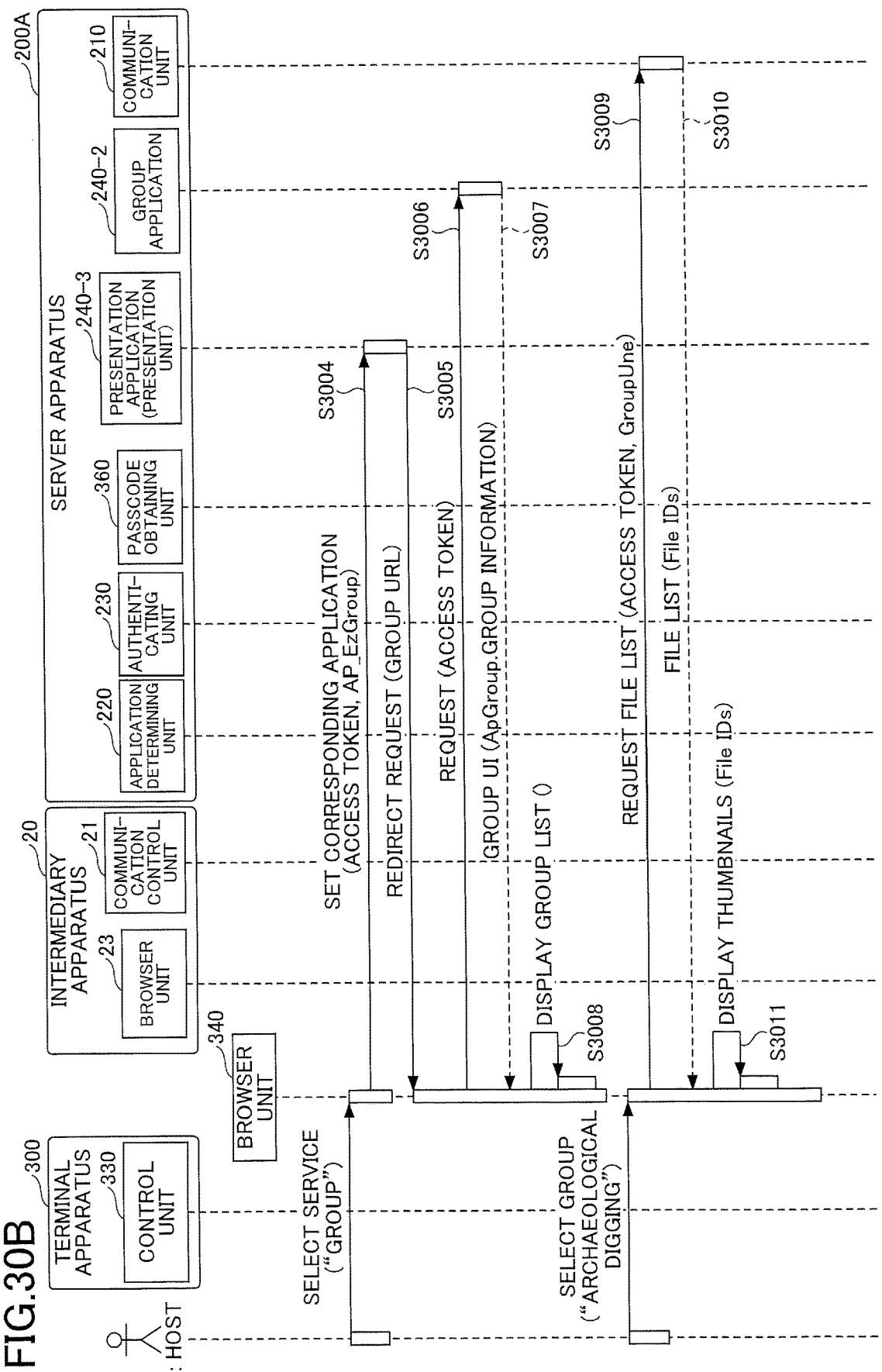
FIG. 30B is the second sequence diagram (a second section) illustrating an operation of the information processing system according to the second embodiment.
Figure 30C:
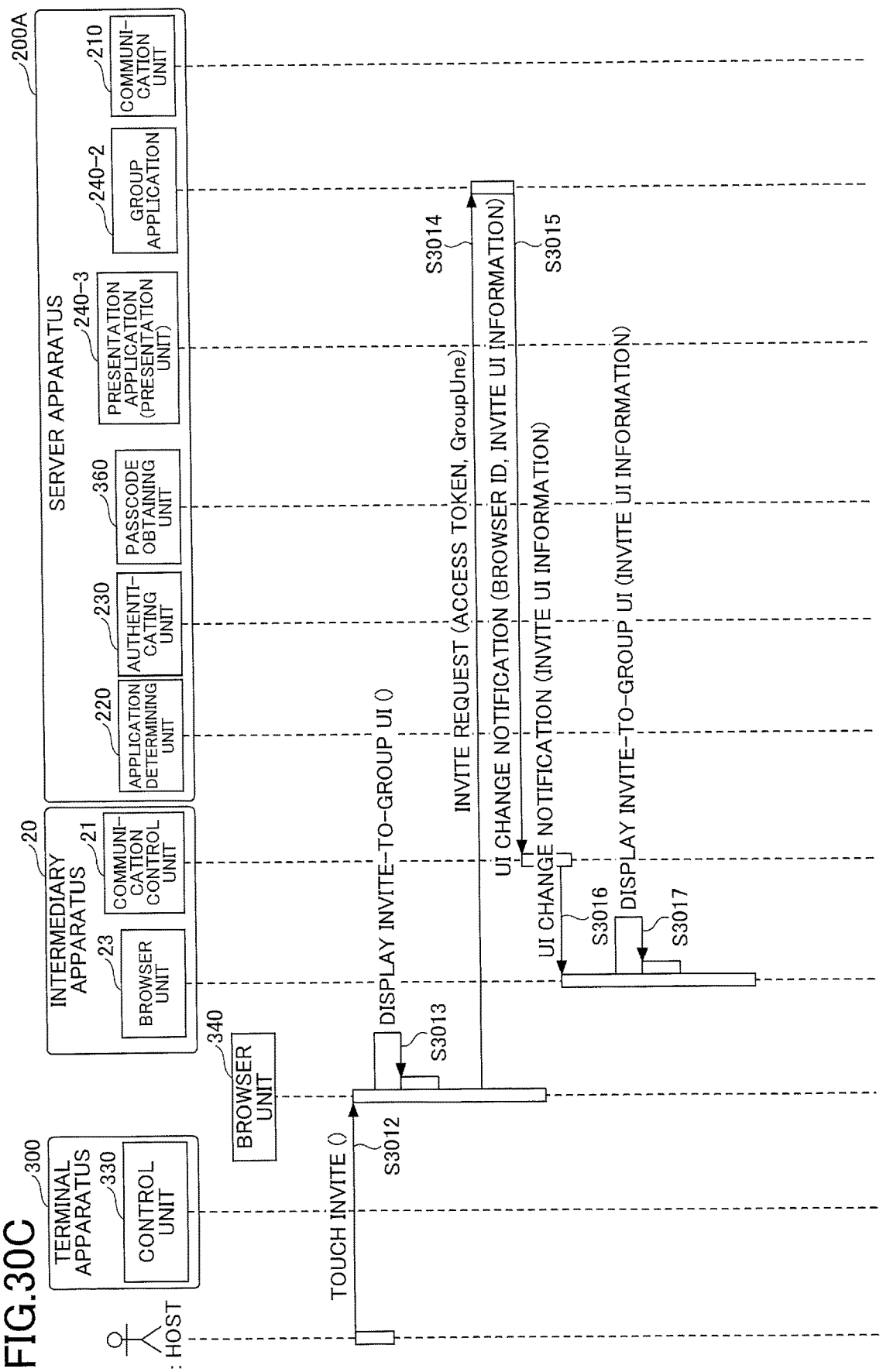
FIG. 30C is the second sequence diagram (a third section) illustrating an operation of the information processing system according to the second embodiment.

FIG. 30A is a second sequence diagram (a first section) illustrating an operation of the information processing system according to the second embodiment. FIG. 30B is the second sequence diagram (a second section) illustrating an operation of the information processing system according to the second embodiment. FIG. 30C is the second sequence diagram (a third section) illustrating an operation of the information processing system according to the second embodiment.

In FIG. 30A, the browser unit 340 of the terminal apparatus 300 transmits a request for obtaining a list of sub-applications to the presentation application 240-3 when the user's operation requesting a display of a menu screen page is received from the screen page displayed in step S2917 (step S3001).

In step S3002, the presentation application 240-3 transmits a list of sub-applications subordinate to the presentation application 240-3 to the browser unit 340 by reading the user information storage unit 263A and the sub-application list storage unit 266A.

Specifically, the presentation application 240-3 transmits a list of names of sub-applications, which are included in the usable applications of the user ID "tanaka@ . . . " in the sub-application list storage unit 266A and are subordinate to the application ID "AP_Presen" in the user information storage unit 263A, to the browser unit 340.

That is, in this case, the application name "group" of the application ID "AP_Group", the application name "sending" of the application ID "AP_Send", the application name "questionnaire survey" of the application ID "AP_Survey", the application name "roster generation" of the application ID "AP_Roster", and the application name "question receiving" of the application ID "AP_Question" of the application ID "AP_Question" are transmitted to the browser unit 340 (see FIGS. 8 and 11).

In step S3003, the browser unit 340 displays a service selecting screen page in response to receiving the list.

Subsequently, with reference to FIG. 30B, the browser unit 340 receives the user's selection of a service to be associated with the QR code and then transmits the application ID corresponding to the selected service and the access token to the presentation application 240-3 (step S3004). Specifically, the application ID "AP_Group" is transmitted to the presentation application 240-3 as the application ID corresponding to the selected service.

In step S3005, the presentation application 240-3 transmits a redirect request including the URL of the application ID "AP_Group" to the browser unit 340 by reading the application information storage unit 262A (see FIG. 23).

The presentation application 240-3 associates the registered ID "Tag_Group" with the registered ID "Tag_Presen" corresponding to the application ID "AP_Group", and stores, in the rewritten registered information storage unit 271, "Tag_Presen" as the original registered ID and "Tag_Group" as the rewritten registered ID.

In other words, the presentation application 240-3 associates the application ID of the presentation application 240-3 corresponding to registered ID "Tag_Presen" with the application ID of the group application 240-2 corresponding to the registered ID "Tag_Group".

In the present embodiment, through such a process of the presentation application 240-3, the QR code displayed on the output apparatus 50 is newly associated with the service implemented by the group application 240-2 corresponding to application ID "AP_Group".

Because steps S3006-S3008 in FIG. 30B are the same as steps S1327-S1329 in FIG. 13C, the duplicate description will be omitted.

Further, because steps S3009 and S3010 of FIG. 30B are the same as steps S1507 and S1508 of FIG. 15A, the duplicate description will be omitted.

Subsequent to step S3010, in step S3011, the browser unit 340 displays a screen page of list of thumbnails of stored document image data when the document image data are stored in the storage location.

Next, with reference to FIG. 30C, when the browser unit 340 receives the user's operation to invite participants (step S3012), the browser unit 340 displays a screen page to invite a participant to the group (step S3013).

Subsequently, in step S3014, the browser unit 340 transmits the access token and an invite request to the group application 240-2. The invite request includes the group ID of the selected group.

In step S3015, the group application 240-2 receives the invite request, then reads the group information storage unit 267A, and transmits the browser ID and an instruction, to change the screen page to a screen page of notifying an invite to the group, to the communication control unit 21 of the intermediary apparatus 20.

At this time, the group application 240-2 transmits a group name and a user ID to the intermediary apparatus 20 as information to be displayed on the screen page of notifying an invite to the group. The user ID is a user ID of the person who is the host of a conference and has created the group. In this example, the group name "archaeological digging" and the user ID "TANAKA" of the host are transmitted.

In step S3016, the communication control unit 21 of the intermediary apparatus 20 then transmits a screen page change notification to the browser unit 23. In step S3017, the browser unit 23 displays an invite-to-group screen page on the output apparatus 50.

Thus, the new service is associated with the QR code. Hereinafter, screen page transitions at the terminal apparatus 300 and the output apparatus 50 in the procedure illustrated in FIGS. 29A, 29B, 30A, 30B, and 30C will be described with reference to FIGS. 31A, 31B, 31C, 32A, and 32B.

Figure 31B:
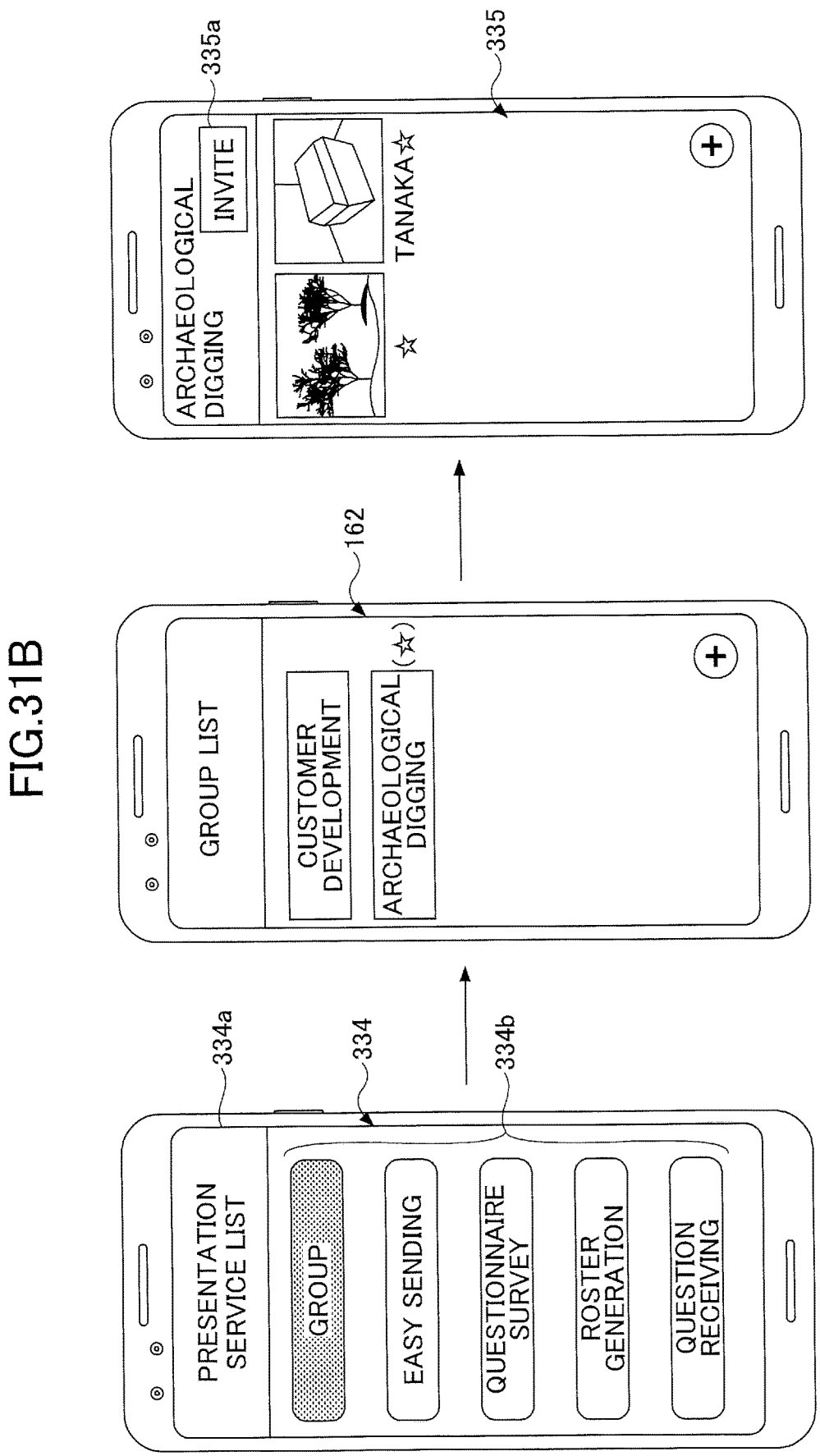
FIG. 31B is the diagram (a second section) illustrating another screen transition at the terminal apparatus (host) according to the second embodiment.

FIG. 31A is a first diagram illustrating a screen page transition at a terminal apparatus (host) according to the second embodiment. FIG. 31B is a second diagram illustrating a screen page transition at the terminal apparatus (host) according to the second embodiment. FIG. 31C is a third diagram illustrating a screen page transition at the terminal apparatus (host) according to the second embodiment.

The display 318 of the terminal apparatus 300 displays a screen page 331, a screen page 332, and a screen page 333 illustrated in FIG. 31A, a screen page 334, a screen page 162, and a screen page 335 illustrated in FIG. 31B, and a screen page 336 and a screen page 337 illustrated in FIG. 31C.

The screen page 331 is an example of a screen page displayed in step S2909 of FIG. 29A, and is similar to the screen page 141 of FIG. 14A, except that the QR code is not displayed. When the method of logging in and using the information processing system 100 is selected, the screen page 331 is then changed to the screen page 332.

The screen page 332 is a screen page displayed in step S2911 of FIG. 29B similar to the screen page 142 of FIG. 14A. When account information is input and a login is requested from the screen page 332, the screen page 332 is changed to the screen page 333.

The screen page 333 is an example of a screen page displayed in step S2917 of FIG. 29B. A button 333a for requesting a display of a menu screen page of the presentation application 240-3 and a button 333b for requesting a display of a screen page for selecting a material to be used in a presentation are displayed in the screen page 333. When the button 333a is operated by the user, the screen page 333 is changed to the screen page 334 illustrated in FIG. 31B.

The screen page 334 is an example of a screen page displayed in step S3003 of FIG. 30A. Information 334a indicating that the following is a menu of the presentation application 240-3 and a list of services 334b are displayed in the screen page 334. When "group" is selected, the screen page 334 is changed to the screen page 162. The screen page 162 is an example of a screen page displayed in step S3008 of FIG. 30B and is similar to the screen page 162 illustrated in FIG. 16A. In the screen page 162, when the group name "archaeological digging" is selected by the user, the screen page is changed to the screen page 335.

The screen page 335 is an example of a screen page displayed in step S3011 of FIG. 30B. The screen page 335 includes a button 335a to invite a participant to the group. The name of the host is displayed near the thumbnail image in the screen page 335. When the button 335a is operated by the user, the screen page 335 is changed to the screen page 336 illustrated by FIG. 31C.

The screen page 336 is an example of a screen page displayed in step S3013 of FIG. 30C. The screen page 336 includes information 336a indicating that a participant is being invited, a list of participants 336b, a button 336c for permitting participation in the group for each participant, and a button 336d for ending the invite.

When the button 336c associated with a participant's name is operated by the user at the screen page 336, the corresponding participant's participation in the group is permitted.

Specifically, the group application 240-2 registers the user IDs of permitted participants as participants corresponding to the group name "archaeological digging" in the group information storage unit 267A.

When the button 336d is operated by the user, the screen page 336 is changed to the screen page 337.

The screen page 337 is the first screen page with respect to the group name "archaeological digging". In the present embodiment, the document image data stored in the storage location corresponding to the group name "archaeological digging" can be displayed on the output apparatus 50 through the presentation application 240-3.

Figure 32B:
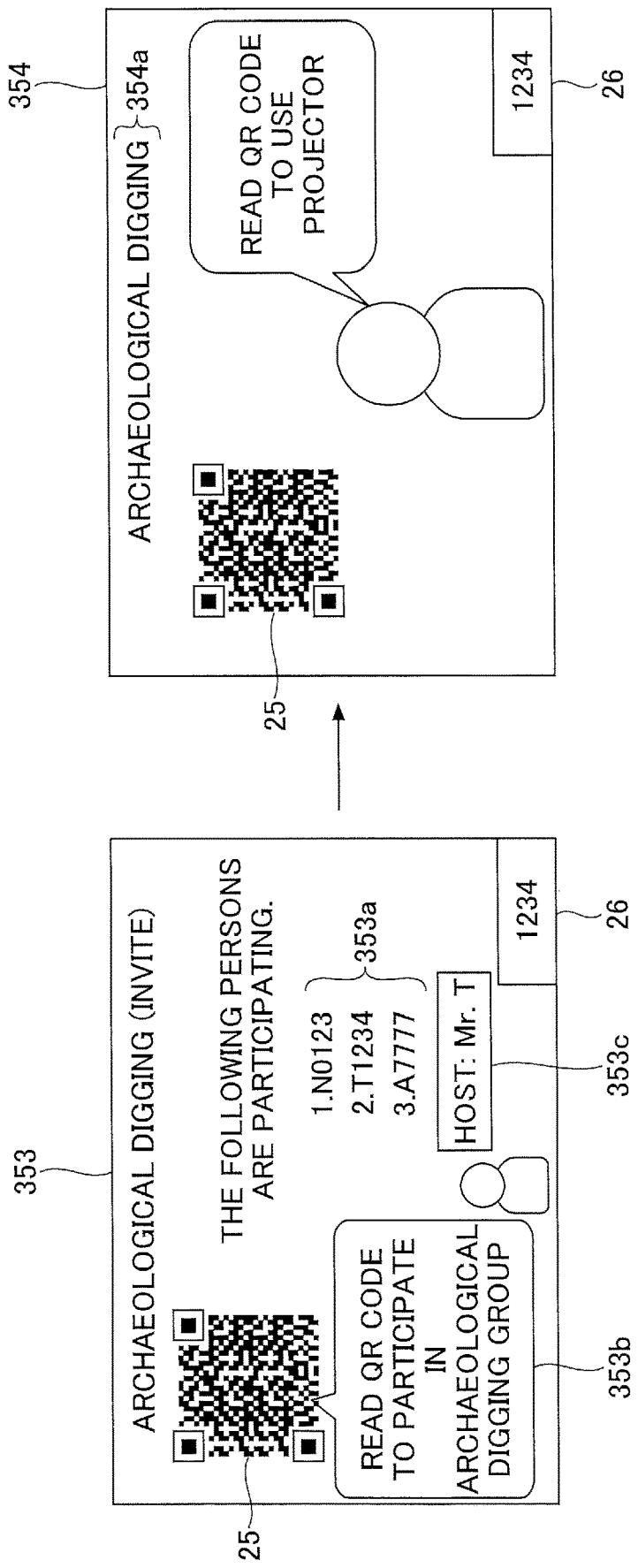
FIG. 32B is the diagram (a second section) illustrating another screen transition at the output apparatus according to the second embodiment.

FIG. 32A is a first diagram illustrating a screen page transition at the output apparatus according to the second embodiment. FIG. 32B is a second diagram illustrating a screen page transition at the output apparatus according to the second embodiment. A screen page 351 and a screen page 352 illustrated in FIG. 32A as well as a screen page 353 and a screen page 354 illustrated in FIG. 32B are displayed on the output apparatus 50.

The screen page 351 is an example of a screen page displayed on the output apparatus 50 in step S2901 of FIG. 29A. A two-dimensional code (a QR code) 25 and a passcode 26 are displayed in the screen page 351. When the terminal apparatus 300 is connected to the intermediary apparatus 20 associated with the output apparatus 50, the screen page 351 is changed to the screen page 352.

The screen page 352 is an example of a screen page displayed on the output apparatus 50 in step S2921 of FIG. 29C. The screen page 352 displays information 332a including the user name of the terminal apparatus 300 connected with the intermediary apparatus 20. The screen page 352 is changed to the screen page 353 illustrated in FIG. 32B when the group application 240-2 is associated with the two-dimensional code 25 and an invite of participants is started.

The screen page 353 is an example of a screen page displayed on the output apparatus 50 in step S3017 of FIG. 30C. The screen page 353 includes, in addition to the two-dimensional code 25 and the passcode 26, a list 353a of participants of the group, information 353b indicating that the two-dimensional code 25 and the group application 240-2 are associated together, and information 353c indicating the name of the host who has created the group. The screen page 353 is changed to the screen page 354 when the invite of participants is ended by the host.

In the screen page 354, the two-dimensional code 25 is displayed and is similar to the screen page 351. However, information 354a is displayed indicating that document image data to be used for a presentation is document image data stored at the storage location corresponding to the group name "archaeological digging".

Next, a procedure of participation in the group by the terminal apparatus 400 according to the present embodiment will be described with reference to FIGS. 33A, 33B, 33C, and 33D. The user of the terminal apparatus 400 is a participant who will participate in the group.

FIG. 33 is a third sequence diagram illustrating an operation of the information processing system according to the second embodiment. In step S3301, in the information processing system 100A, the browser unit 23 of the intermediary apparatus 20 displays an invite-to-group screen page on the output apparatus 50. Specifically, the screen page displayed on the output apparatus 50 is the screen page 353 of FIG. 32. The two-dimensional code (QR code) 25 is displayed in the screen page 353.

Because steps S3302-S3309 of FIG. 33 are the same as step S3002 of FIG. 30A through step S3009 of FIG. 30B, the duplicate description will be omitted.

Figure 33A:
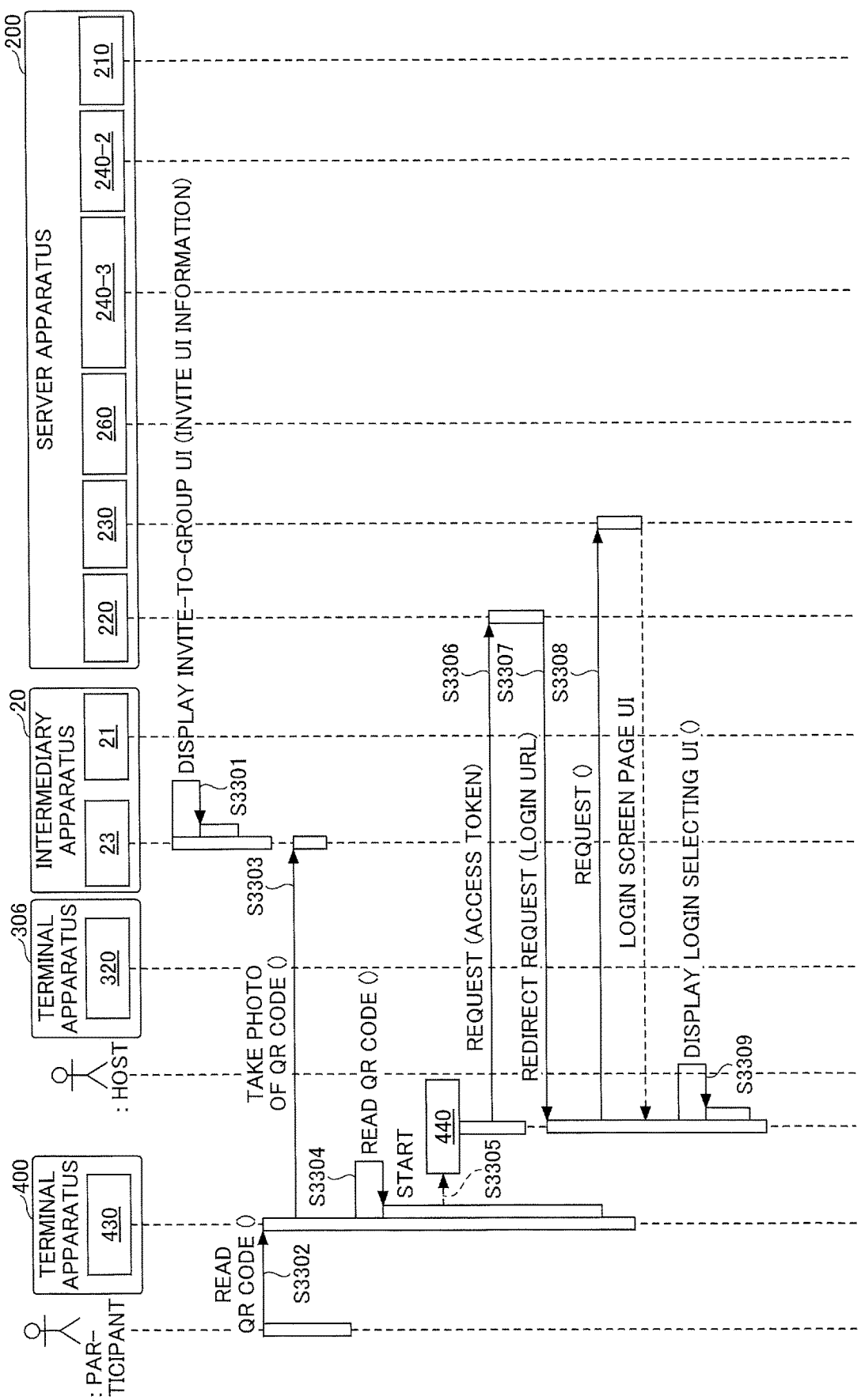
FIG. 33A is a third sequence diagram (a first section) illustrating an operation of the information processing system according to the second embodiment.
Figure 33B:
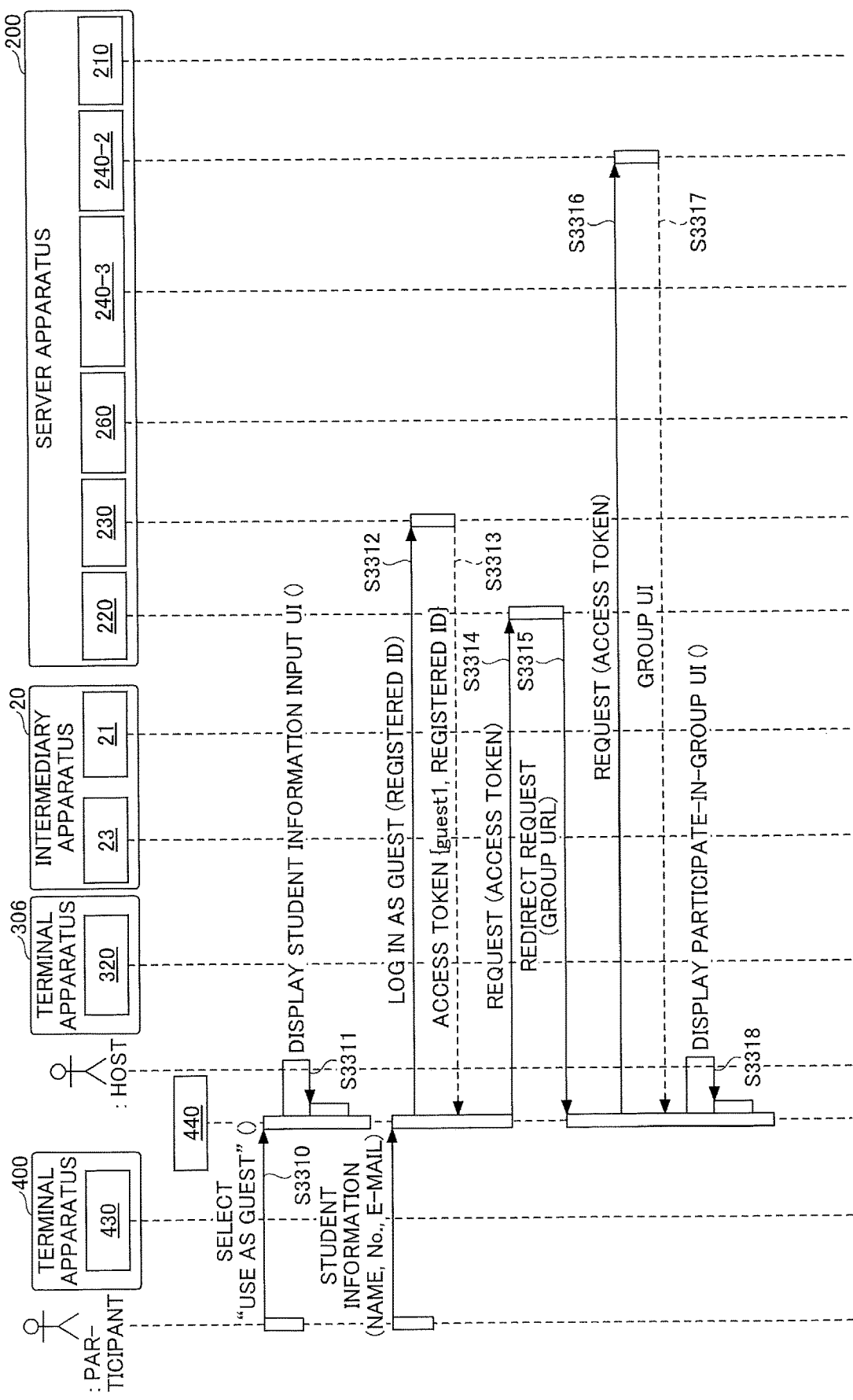
FIG. 33B is the third sequence diagram (a second section) illustrating an operation of the information processing system according to the second embodiment.

Because steps S3310-S3317 of FIG. 33B are the same as steps S1709-S1716 of FIG. 17A, the duplicate description will be omitted.

In step S3318, the browser unit 440 of the terminal apparatus 400 receives the group name and displays a participate-in-group screen page.

Figure 33C:
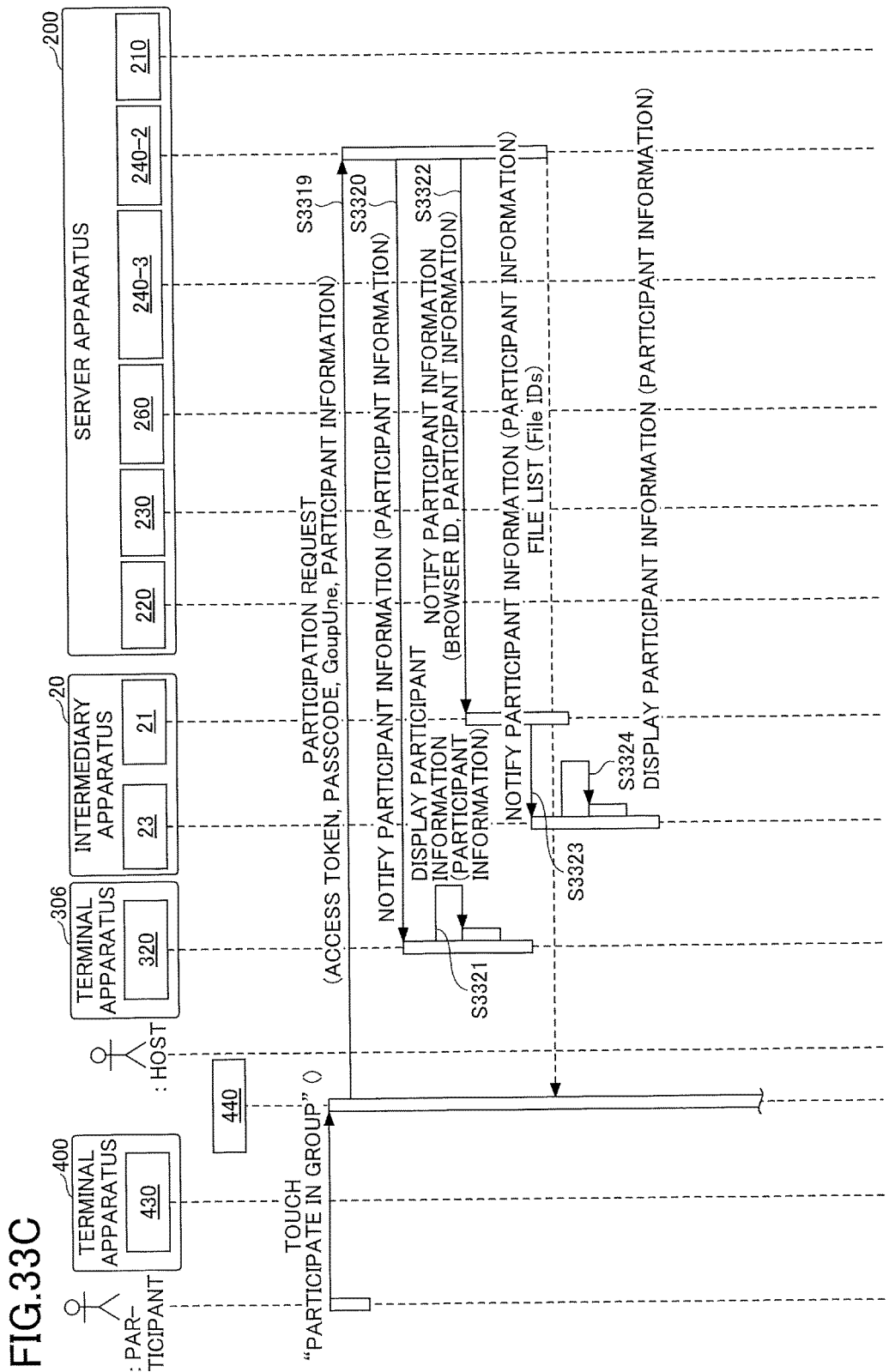
FIG. 33C is the third sequence diagram (a third section) illustrating an operation of the information processing system according to the second embodiment.

Subsequently, with reference to FIG. 33C, when the browser unit 440 receives the user's operation to indicate participation in the group, the browser unit 440 transmits a participation request to the group application 240-2 in step S3319. The participation request includes the access token, the passcode, the group ID, and participant information. The participation request may include a request for obtaining a list of document image data stored in the storage location corresponding to the group name.

The user information storage unit 263A according to the present embodiment does not include information indicating the name of a guest. For this reason, the browser unit 440 may obtain the name or the like included in the information stored in the storage unit 450 and transmit the name or the like to the group application 240-2.

In step S3320, the group application 240-2 receives the participation request, then reads the group information storage unit 267A, and transmits the participant information to the user (the host) of the terminal apparatus 300. The participant information may be obtained through polling by the browser unit 340 of the terminal apparatus 300.

Subsequently, in step S3321, the browser unit 340 of the terminal apparatus 300 displays the participant information. At this time, when the browser unit 340 receives the participant information, the browser unit 340 displays the participant's name as illustrated in the screen page 336 of FIG. 31C.

In step S3322, the group application 240-2 reads the group information storage unit 267A and transmits the participant information to the communication control unit 21 of the intermediary apparatus 20 identified by the browser ID associated with the group ID. In step S3323, the communication control unit 21 notifies the browser unit 23 of the IP address corresponding to the browser ID by reading the apparatus information storage unit 270. In step S3324, the browser unit 23 displays the participant information in a screen page of the output apparatus 50. In step S3324, the participant information may be displayed as illustrated in the screen page 353 of FIG. 32B.

Figure 33D:
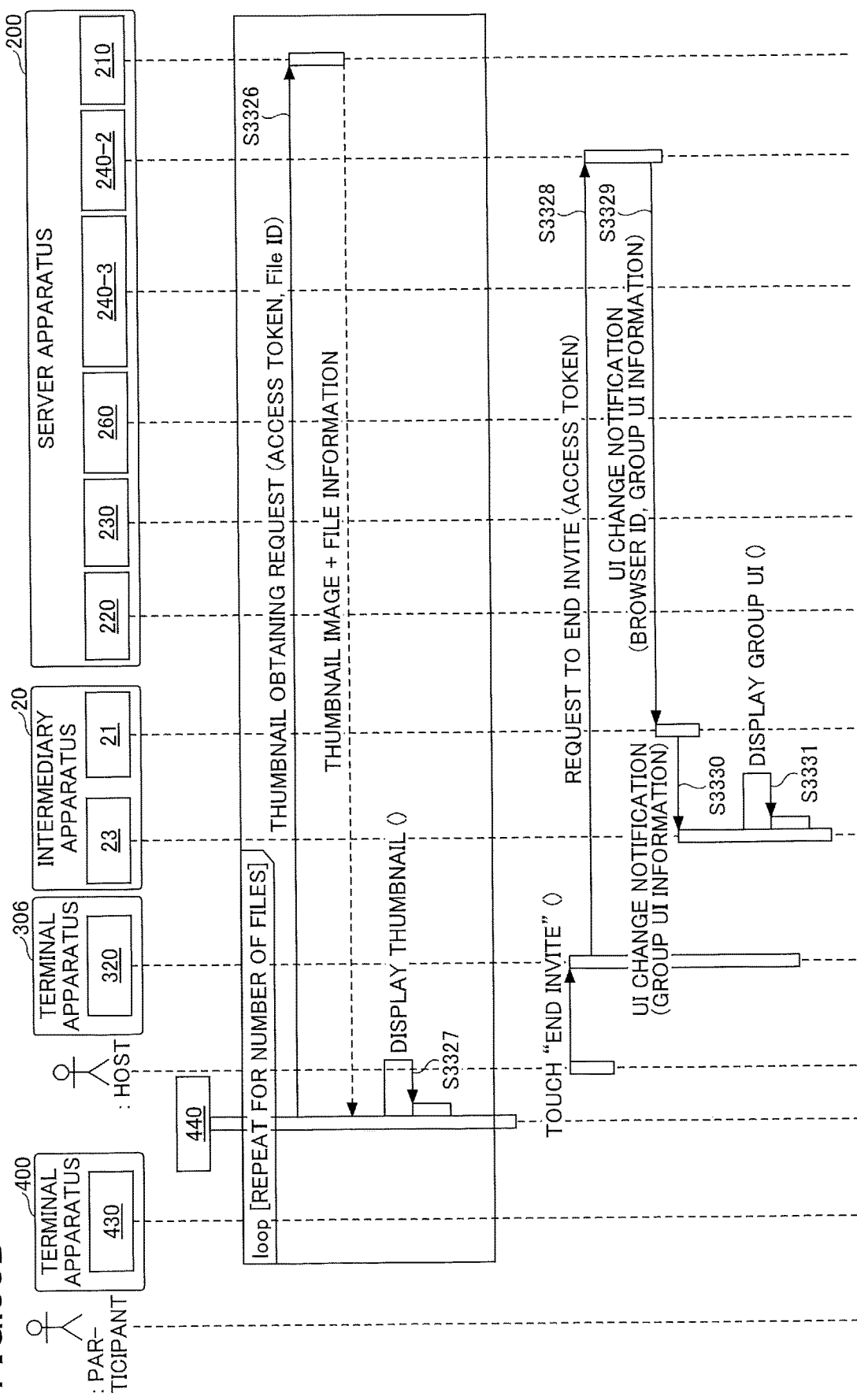
FIG. 33D is the third sequence diagram (a fourth section) illustrating an operation of the information processing system according to the second embodiment.

Next, with reference to FIG. 33D, the group application 240-2 transmits a list of file IDs of document image data, for accessing the storage location corresponding to the group name, to the browser unit 440 of the terminal apparatus 400, in response to a request to obtain a file list.

Because steps S3326 and S3327 of FIG. 33D are similar to steps S1723 and S1724 of FIG. 17B, the duplicate description will be omitted.

In step S3328, the browser unit 340 of the terminal apparatus 300 transmits an invite end instruction to the group application 240-2 together with the access token when an operation to end the invite is performed by the host.

In step S3329, the group application 240-2 receives the instruction and then transmits an instruction to change the display contents to the communication control unit 21 of the intermediary apparatus 20 by reading the group information storage unit 267A. The application 240-2 may include in the instruction to change the display contents, as the display contents after the change, the group name associated with the group ID in the group information storage unit 267A and the user ID (the name of the host).

In step S3330, the communication control unit 21 of the intermediary apparatus 20 notifies the browser unit 23 of the IP address corresponding to the browser ID by reading the apparatus information storage unit 270, and sends, to the browser unit 23, a display instruction including information of the display contents after the change.

In step S3331, the browser unit 23 receives the instruction and changes the display contents of the output apparatus 50 based on the display contents after the change. Specifically, the browser unit 23 causes the screen page 354 of FIG. 32B to be displayed on the output apparatus 50.

Figure 34A:
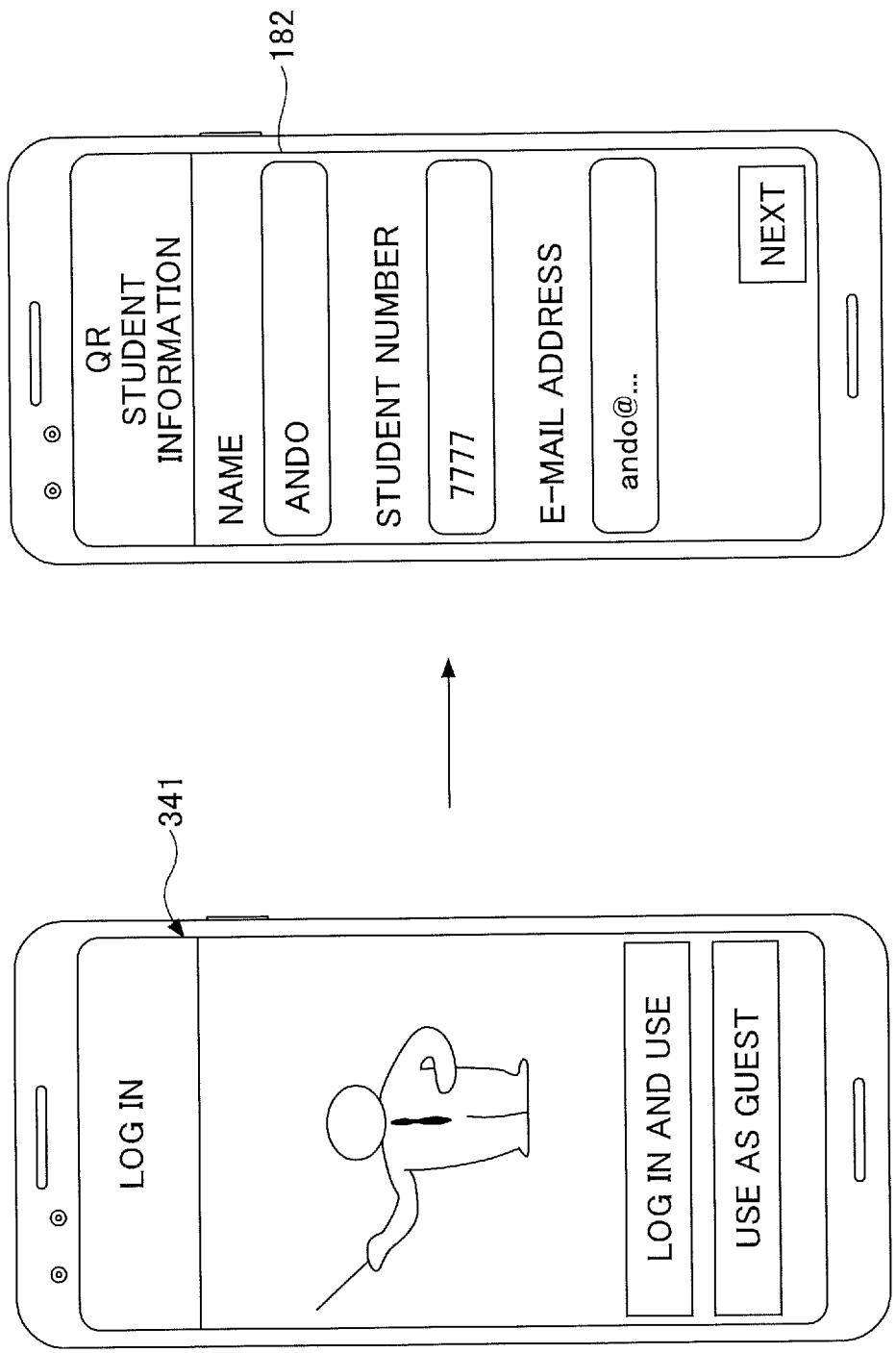
FIG. 34A is a diagram (a first section) illustrating a screen transition of a terminal apparatus (participant) according to the second embodiment.

Thus, participation in the group by the terminal apparatus 400 is implemented. Hereinafter, screen page transitions at the terminal apparatus 400 in the procedure illustrated in FIGS. 33A, 33B, 33C, and 33D will be described with reference to FIGS. 34A and 34B. FIG. 34A is a first diagram illustrating a screen page transition at the terminal apparatus (participant) according to the second embodiment. FIG. 34B is a second diagram illustrating a screen page transition at the terminal apparatus (participant) according to the second embodiment.

A screen page 341 and a screen page 182 illustrated in FIG. 34A as well as a screen page 342 and a screen page 343 illustrated in FIG. 34B are displayed on the display of the terminal apparatus 400.

The screen page 341 is an example of a screen page displayed in step S3309 of FIG. 33A, and is similar to the screen page 181 of FIG. 18A, except that a QR code is not displayed. When the method of using the information processing system 100 as a guest is selected, the screen page is changed to the screen page 182.

The screen page 182 is a screen page displayed in step S3311 of FIG. 33B. When account information is input and a login is requested from the screen page, the screen page is changed to the screen page 342 illustrated in FIG. 34B.

The screen page 342 is an example of a screen page displayed in step S3318 of FIG. 33B. A button 342a indicating to participate in the group is displayed in the screen page 342. The screen page 342 is changed to the screen page 343 when the button 342a is operated by the user.

The screen page 343 is an example of a screen page displayed in step S3327 of FIG. 33D. The screen page 343 displays a list of thumbnail images of images (photographs) indicated by document image data stored in the storage location corresponding to the group name "archaeological digging". In addition, information 343a indicating that the document image data stored in the storage location corresponding to the group name "archaeological digging" are used in a presentation is displayed in the screen page 343.

Further, a button 343b for uploading document image data stored in the terminal apparatus 400 to the storage location corresponding to the group name "archaeological digging" is displayed in the screen page 343. When the button 343b is operated by the user, the screen page 343 is changed to a screen page of a list of the document image data to be uploaded (for example, the screen page 185 of FIG. 18B).

Thus, according to the present embodiment, members participating in a conference at which a presentation is performed can be regarded as belonging to one group, and information can be shared within the group. In the present embodiment, when associating of a QR code, displayed on an output apparatus 50 provided in a conference room, with the group application 240-2 is ended, sharing of information is also stopped.

Thus, according to the present embodiment, for example, during a conference, all participants are regarded as belonging to one group and can share information; and each participant can freely perform a presentation using document image data stored in the participants' terminal apparatus. Further, according to the present embodiment, as a result of associating of a QR code with the group application 240-2 being canceled when a conference is ended, information is prevented from being shared by the participants' terminal apparatuses after the end of the conference.

Further, according to the present embodiment, for example, during a presentation, information stored in a terminal apparatus of a participant can be easily shared with other participants. In addition, according to the present embodiment, sharing of information can be canceled at any time.

In the present embodiment, a passcode (identifying information) displayed together with a QR code on an output apparatus 50 is periodically changed. Thus, according to the present embodiment, when a certain time elapses without an operation being performed by a user on an output apparatus 50, associating of the terminal apparatuses 300 and 400 with the output apparatus 50 is automatically canceled.

Therefore, for example, after an end of a conference, the information stored in the terminal apparatuses 300 and 400 is prevented from being erroneously displayed on the output apparatus 50, and confidentiality of the information of each terminal apparatus can be guaranteed.

Third Embodiment

A third embodiment will now be described with reference to the drawings. The third embodiment differs from the first embodiment in that a case where a QR code is read by the terminal apparatus (student terminal) 400 before a service is associated with the QR code by the terminal apparatus (teacher terminal) is taken into account. In the following description of the third embodiment, differences from the first embodiment are described, and the elements having the same functional structures as the first embodiment are given the same reference numerals as the reference numerals used in the description of the first embodiment, and the duplicate description is omitted.

A QR application 240-1A according to the present embodiment displays a waiting screen page on the terminal apparatus 400 when a QR code is read by the terminal apparatus 400 which has logged in as a guest before a service is associated with the QR code.

A state before a service is associated with a QR code means a state in which a sub-application ID is not associated with a registered ID "Tag_QR01" included in the QR code in the associated application information storage unit 265.

Figure 35:
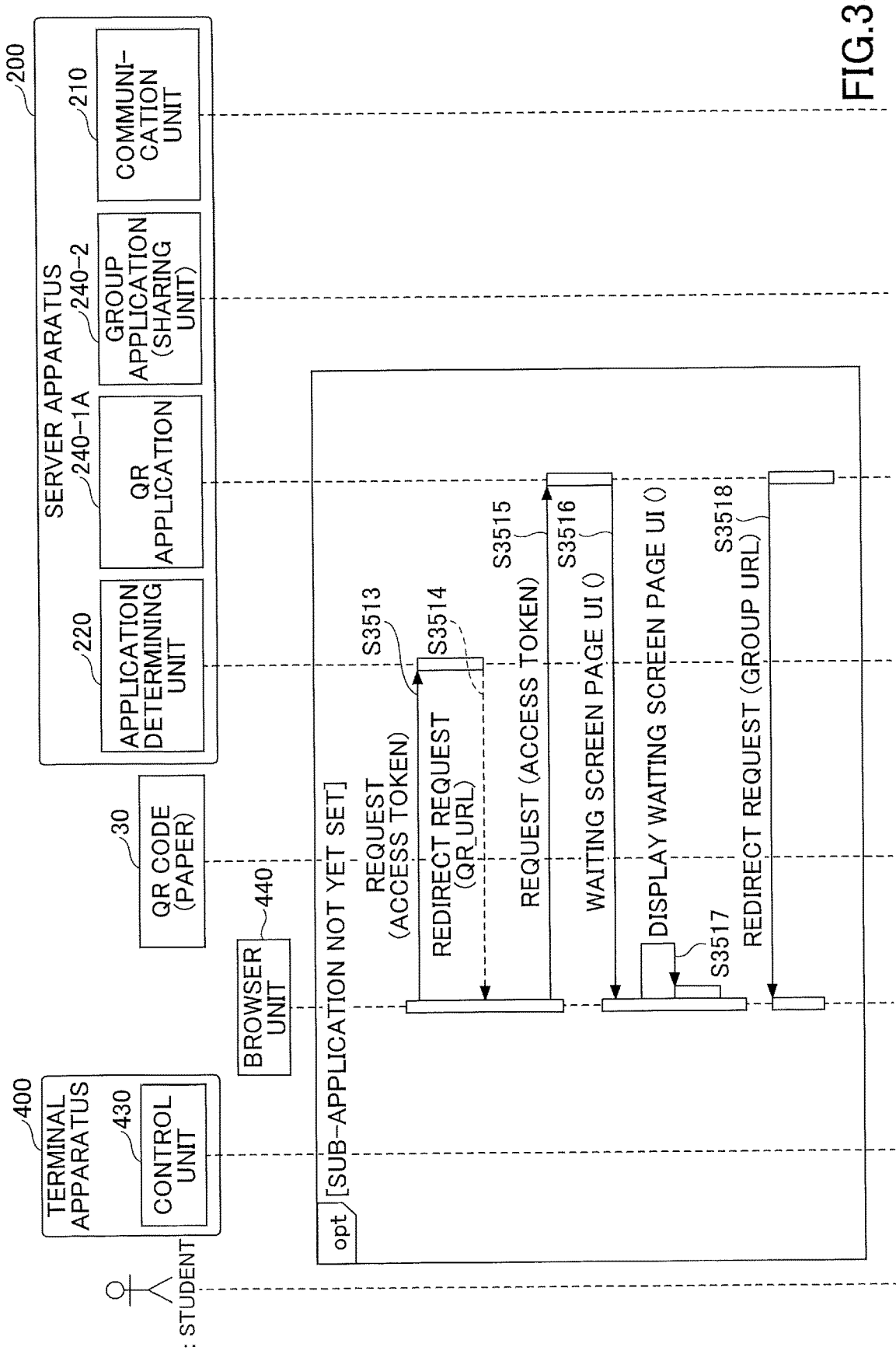
FIG. 35 is a sequence diagram illustrating an operation of an information processing system according to a third embodiment.

FIG. 35 is a sequence diagram (a first section) illustrating an operation of the information processing system according to the third embodiment. FIG. 35 illustrates a procedure for the student terminal 400 to participate in a group.

Step S3513 of FIG. 35 is executed after execution of step S1712 of FIG. 17A. That is, in a procedure in which the student terminal 400 participates in a group according to the present embodiment, steps S1301-S1308 of FIG. 13A are executed, and steps S1709-S1712 of FIG. 17A are then executed, and then, the process proceeds to step S3513.

In step S3513, the browser unit 440 transmits a connection request to the application determining unit 220 together with the access token.

In step S3514, when a service is not associated with the QR code, the application determining unit 220 transmits a redirect request directed to the QR application 240-1A to the browser unit 440 of the terminal apparatus 400.

In step S3515, the browser unit 440 transmits a request together with the access token to the QR application 240-1A in response to the redirect request from the application determining unit 220.

In step S3516, the QR application 240-1A determines from the access token that the user is a participant (a student) and a sub-application ID of the QR application 240-1A is not yet set, and transmits a URL of a waiting screen page to the browser unit 440.

In step S3517, the browser unit 440 displays the waiting screen page on the student terminal 400. In step S3518, the QR application 240-1A performs a redirect request directed to the URL of the sub-application identified by a sub-application ID to the browser unit 440 at a time when the registered ID "Tag_QR01" included in the QR code is associated with the sub-application ID.

In this regard, associating of the registered ID "Tag_QR01" with the sub-application ID is updated when the providing period of the QR code set by the teacher terminal 300 has elapsed.

The above-described procedure is an operation executed when the QR code is read by the student terminal 400 before the service (sub-application) is associated with the QR code.

The student terminal 400 may execute step S1713 of FIG. 17A through step S1724 of FIG. 17B after executing step S3518 of FIG. 35.

Figure 36A:
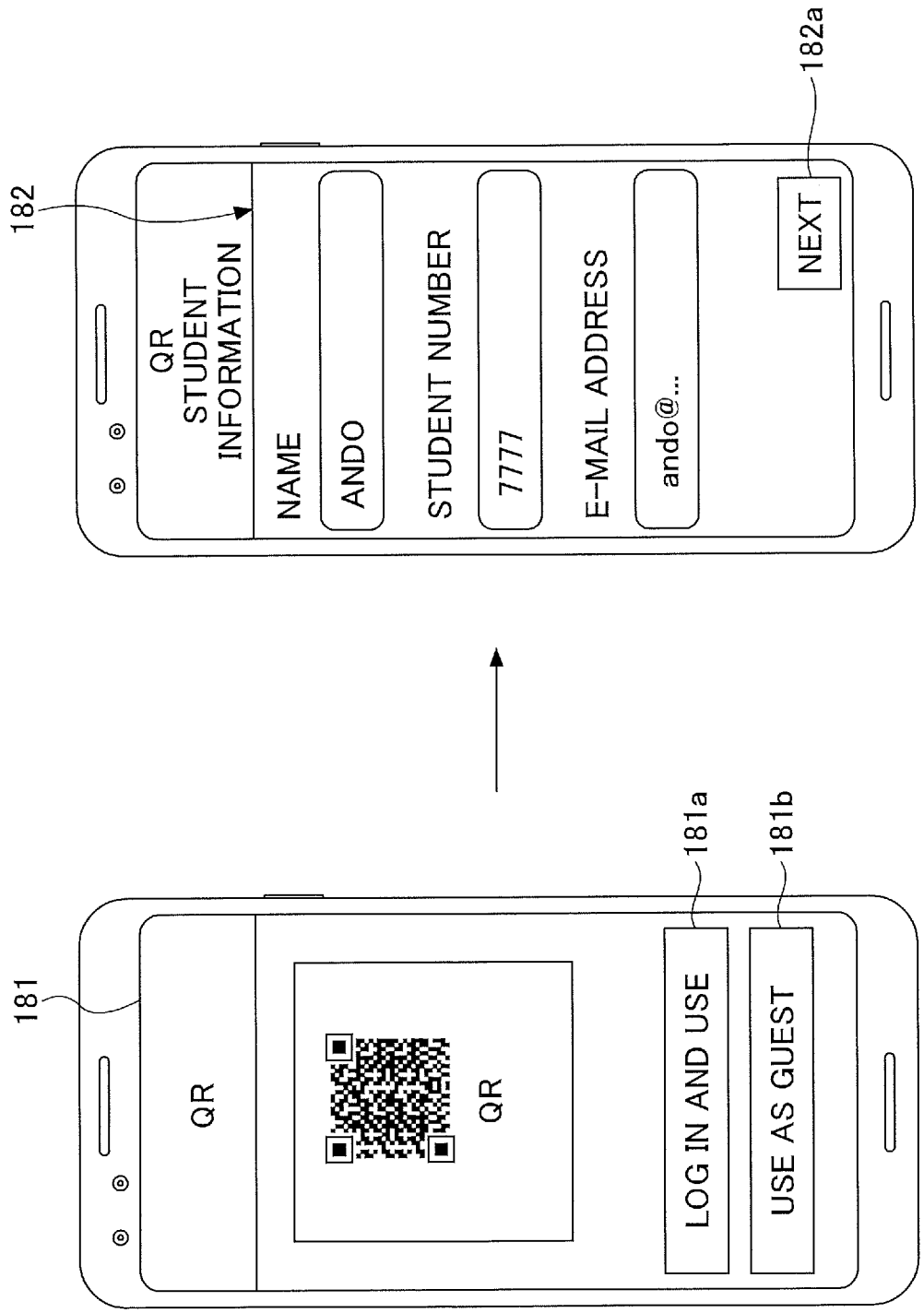
FIG. 36A is a diagram (a first section) illustrating a screen transition of a student terminal according to the third embodiment.

Next, screen page transitions at the student terminal 400 according to the present embodiment will be described with reference to FIGS. 36A and 36B. FIG. 36A is a first diagram illustrating a screen page transition at the student terminal according to the third embodiment. FIG. 36B is a second diagram illustrating a screen page transition at the student terminal according to the third embodiment.

FIGS. 36A and 36B illustrate screen page transitions at the student terminal 400 when the student terminal 400 reads a QR code before a service is associated with the QR code.

A screen page 181 and a screen page 182 illustrated in FIG. 36A as well as a screen page 183 and a screen page 186 illustrated in FIG. 36B are displayed on the display of the student terminal 400.

The screen page 181 and the screen page 182 illustrated in FIG. 36A are the same as the screen page 181 and the screen page 182 illustrated in FIG. 18A, respectively. In the present embodiment, when the operation button 182a for requesting a transmission of student information in the screen pager 182 is operated by the user and a service is not associated with the QR code, the screen page 182 is changed to the screen page 186 illustrated in FIG. 36B.

The screen page 186 is an example of a waiting screen page displayed in step S3517 of FIG. 35. A message 186a indicating that a service is not associated with the QR code and a message 186b requesting the user to wait are displayed in the screen page 186.

The message 186a specifically indicates that the application ID "AP_Group" identifying the group application 240-2 is not associated with the QR code that has been read and displayed in the screen page 181.

The screen page 186 is changed to the screen page 183 when the teacher terminal 300 associates the QR code displayed in the screen page 181 with the application ID "AP_Group". The screen page 183 is the same as the screen page 183 illustrated in FIG. 18A.

Thus, according to the present embodiment, when a QR code is read, regardless of whether a service is associated with the QR code, a plurality of terminal apparatuses that read the QR code can share information.

Each function of each of the above-described embodiments can be implemented by one or more processing circuits. As used herein, a "processing circuit" may be a processor programmed to perform each function by software, such as a processor implemented in electronic circuit, an application specific integrated circuit (ASIC), a digital signal processor (DSP), a field programmable gate array (FPGA), or a conventional circuit module designed to perform each function described above.

Apparatuses described in each embodiment are merely indicative of one of a plurality of computing environments for carrying out the embodiment disclosed herein.

In an embodiment of the present invention, a server apparatus 200 includes a plurality of computing devices, such as a server cluster. The plurality of computing devices are configured to communicate with each other via any type of communication link, including a network, shared memory, or the like, and perform processes disclosed herein. Similarly, a terminal apparatus may include a plurality of computing devices configured to communicate with each other. In addition, a server apparatus and a terminal apparatus can be configured to share disclosed process steps in any one of various combinations.

Although the information processing systems, information processing apparatuses, and information processing methods have been described with reference to the embodiments, the present invention is not limited to the embodiments and various variations and modifications can be made within the scope of the present invention.

What is claimed is:

1. An information processing system including an information processing apparatus, wherein
the information processing apparatus includes
circuitry configured to
provide a sharing service of enabling information to be shared by more than one terminal apparatuses, the more than one terminal apparatuses being included in the information processing system, the information processing apparatus being capable of communicating with the more than one terminal apparatuses, and the more than one terminal apparatuses being associated with a group,
receive first identification information from each of the more than one terminal apparatuses, and
associate the first identification information with the sharing service,
wherein
each of the more than one terminal apparatuses includes circuitry configured to obtain the first identification information from outside and transmit the first identification information to the information processing apparatus,
wherein
the circuitry of the information processing apparatus is further configured to, when having associated the first identification information with the sharing service,
associate, with the group, the more than one terminal apparatuses having received the first identification information from outside and having transmitted the first identification information, and
provide the sharing service of enabling information to be shared by the more than one terminal apparatuses that are associated with the group,
the first identification information received from each of the more than one terminal apparatuses is a same first identification information,
a providing period is set to the first identification information, and
the circuitry of the information processing apparatus is further configured to provide the sharing service to a terminal apparatus that obtains the first identification information during the providing period.

2. The information processing system according to claim 1, wherein
the circuitry of each of the more than one terminal apparatuses is further configured to obtain the first identification information by reading a code, and
the circuitry of the information processing apparatus is further configured to associate the first identification information with second identification information that is used to identify a function of providing the sharing service of enabling information to be shared by the more than one terminal apparatuses, the code including the second identification information.

3. The information processing system according to claim 2,
wherein
the circuitry of the information processing apparatus is further configured to
authenticate account information of a terminal apparatus based on a result of comparing the account information obtained from the terminal apparatus with user information stored in a memory, and
when the account information is authenticated, associate the first identification information included in the code read by the terminal apparatus with the second identification information.

4. The information processing system according to claim 3, wherein
the circuitry of the information processing apparatus is further configured to
in response to receiving an instruction to create a group from a terminal apparatus from which the first identification information is obtained, generate a group ID that is used to identify the group, and associate the group ID with the account information, and
when a terminal apparatus other than the terminal apparatus from which the first identification information is obtained obtains the code, associate user information, obtained from the terminal apparatus other than the terminal apparatus from which the first identification information is obtained, with the group ID, and store the user information associated with the group ID in a memory as group information.

5. The information processing system according to claim 4, wherein
the circuitry of the information processing apparatus is further configured to
permit the terminal apparatus, other than the terminal apparatus which reads the code and from which the first information is obtained, to access a storage location associated with the group ID.

6. The information processing system according to claim 5, wherein
the providing period is set to the code, and
the circuitry of the information processing apparatus is further configured to permit a terminal apparatus that reads the code during the providing period to access the storage location.

7. The information processing system according to claim 2, wherein
the circuitry of the information processing apparatus is further configured to
provide a service for performing a presentation, the code including third identification information that is used to identify the providing a service for performing a presentation, and
in response to receiving an instruction to associate the third identification information with the second identification information, associate the third identification information with the second identification information.

8. The information processing system according to claim 2, wherein
a function of the associating the first identification information with the sharing service is associated with a plurality of functions that provide a plurality of services different from each other, a function of providing the sharing service of enabling information to be shared by more than one terminal apparatuses being one of the plurality of functions, and
the circuitry of the information processing apparatus is further configured to, in response to the function of providing the sharing service of enabling information to be shared by more than one terminal apparatuses being selected from among the plurality of functions, associate the first identification information with the second identification information.

9. An information processing apparatus comprising circuitry configured to
provide a sharing service of enabling information to be shared by more than one terminal apparatuses, the information processing apparatus being capable of communicating with the more than one terminal apparatuses, and the more than one terminal apparatuses being associated with a group;
receive first identification information from each of the more than one terminal apparatuses; and
associate the first identification information with the sharing service,
wherein
the circuitry is further configured to, when having associated the first identification information with the sharing service,
associate, with the group, the more than one terminal apparatuses having received the first identification information from outside and having transmitted the first identification information, and
provide the sharing service of enabling information to be shared by the more than one terminal apparatuses that are associated with the group,
the first identification information received from each of the more than one terminal apparatuses is a same first identification information,
a providing period is set to the first identification information, and
the circuitry of the information processing apparatus is further configured to provide the sharing service to a terminal apparatus that obtains the first identification information during the providing period.

10. An information processing method comprising:
providing, by circuitry of an information processing apparatus, a sharing service of enabling information to be shared by more than one terminal apparatuses, the information processing apparatus being capable of communicating with the more than one terminal apparatuses, and the more than one terminal apparatuses being associated with a group,
receiving, by the circuitry, first identification info ration from each of the more than one terminal apparatuses, and
associating the first identification information with the sharing service,
wherein
the information processing method further comprises:
when having associated the first identification information with the sharing service, associating, by the circuitry, with the group, the more than one terminal apparatuses having received the first identification information from outside and having transmitted the first identification information, and providing, by the circuitry, the sharing service of enabling information to be shared by the more than one terminal apparatuses that are associated with the group, the first identification information received from each of the more than one terminal apparatuses is a same first identification information, a providing period is set to the first identification information, and the sharing service is provided to a terminal apparatus that obtains the first identification information during the providing period.

11. The information processing method according to claim 10, wherein each of the more than one terminal apparatuses obtains the first identification information by reading a code, and the first identification information is associated with second identification information that is used to identify a function of providing the sharing service of enabling information to be shared by the more than one terminal apparatuses, the code including the second identification information.

12. The information processing method according to claim 11, wherein account information of a terminal apparatus is authenticated based on a result of comparing the account information obtained from the terminal apparatus with user information stored in a memory, and when the account information is authenticated, the first identification information included in the code read by the terminal apparatus is associated with the second identification information.

13. The information processing method according to claim 12, wherein in response to receiving an instruction to create a group from a terminal apparatus from which the first identification information is obtained, a group ID is generated that is used to identify the group, and the group ID is associated with the account information, and when a terminal apparatus other than the terminal apparatus from which the first identification information is obtained obtains the code, user information, obtained from the terminal apparatus other than the terminal apparatus from which the first identification information is obtained, is associated with the group ID, and the user information associated with the group ID is stored in a memory as group information.

14. The information processing method according to claim 13, wherein the terminal apparatus, other than the terminal apparatus which reads the code and from which the first information is obtained, is permitted to access a storage location associated with the group ID.

15. The information processing method according to claim 14, wherein the providing period is set to the code, and a terminal apparatus that reads the code during the providing period is permitted to access the storage location.

* * * * *